(12) United States Patent
Hayashi et al.

(10) Patent No.: US 8,559,536 B2
(45) Date of Patent: Oct. 15, 2013

(54) TRANSMISSION DEVICE, RECEPTION DEVICE, AND OFDM TRANSMISSION METHOD

(75) Inventors: Kenichiro Hayashi, Kyoto (JP); Tomohiro Kimura, Osaka (JP)

(73) Assignee: Panasonic Corporation, Osaka (JP)

( * ) Notice: Subject to any disclaimer, the term of this patent is extended or adjusted under 35 U.S.C. 154(b) by 516 days.

(21) Appl. No.: 12/602,844

(22) PCT Filed: Jun. 19, 2008

(86) PCT No.: PCT/JP2008/001584
§ 371 (c)(1),
(2), (4) Date: Jun. 7, 2010

(87) PCT Pub. No.: WO2009/001528
PCT Pub. Date: Dec. 31, 2008

(65) Prior Publication Data
US 2010/0272199 A1    Oct. 28, 2010

(30) Foreign Application Priority Data

Jun. 22, 2007    (JP) .................................. 2007-164998

(51) Int. Cl.
*H04K 1/10*    (2006.01)
*H04L 27/28*    (2006.01)
(52) U.S. Cl.
USPC .......... 375/260; 375/295; 375/316; 370/206; 370/491
(58) Field of Classification Search
USPC .......... 375/259–260, 295, 316, 340; 370/206, 370/491, 500
See application file for complete search history.

(56) References Cited

U.S. PATENT DOCUMENTS

| | | | |
|---|---|---|---|
| 7,643,567 B2 * | 1/2010 | Egashira et al. | 375/260 |
| 2003/0086508 A1 * | 5/2003 | Magee | 375/340 |
| 2005/0201268 A1 | 9/2005 | Aoki et al. | |
| 2006/0062314 A1 | 3/2006 | Palin et al. | |

(Continued)

FOREIGN PATENT DOCUMENTS

| | | |
|---|---|---|
| JP | 2772286 | 4/1998 |
| JP | 2006-54706 | 2/2006 |

(Continued)

OTHER PUBLICATIONS

International Search Report issued Sep. 22, 2008 in International (PCT) Application No. PCT/JP2008/001584.

(Continued)

*Primary Examiner* — Jean B Corrielus
(74) *Attorney, Agent, or Firm* — Wenderoth, Lind & Ponack, L.L.P.

(57) ABSTRACT

SP signals to be transmitted from a first transmitting antenna are arranged in the same pattern as SP signals to be transmitted from a second transmitting antenna. The SP signals to be transmitted from the second transmitting antenna in one symbol are generated, such that the polarity of the SP signals are alternately inverted and non-inverted with respect to the SP signals to be transmitted from the first transmitting antenna in the same symbol. Thus, in the direction that the symbol number is incremented by 1 and the carrier number is incremented by 3, the polarity of SP signals transmitted from the second transmitting antenna are all inverted or non-inverted with respect to the polarity of corresponding SP signals transmitted from the first transmitting antenna.

9 Claims, 26 Drawing Sheets

(56) References Cited

U.S. PATENT DOCUMENTS

| | | | |
|---|---|---|---|
| 2008/0150514 A1* | 6/2008 | Codreanu et al. | 324/76.77 |
| 2008/0273621 A1* | 11/2008 | Manakkal et al. | 375/267 |
| 2009/0016461 A1 | 1/2009 | Jitsukawa et al. | |
| 2009/0175367 A1 | 7/2009 | Kishigami et al. | |
| 2011/0069793 A1* | 3/2011 | Manakkal et al. | 375/344 |

FOREIGN PATENT DOCUMENTS

| | | |
|---|---|---|
| RU | 2 292 654 | 1/2007 |
| WO | 99/01956 | 1/1999 |
| WO | 2005/041515 | 5/2005 |
| WO | 2007/035446 | 3/2007 |
| WO | 2007/108080 | 9/2007 |

OTHER PUBLICATIONS

Mitchell, J.D. et al., *A dual polarisation MIMO broadcast TV system*, BBC Research White Paper, BBC WHP 144 (Dec. 12, 2006).

Russian Office Action issued Mar. 26, 2012 in corresponding Russian Patent Application No. 2010101877, together with English translation.

Bernard Sklyar, "Digital Communications", Moscow—S. Petersburg-Kiev, pp. 685, 686, and 691, Fig. 11.14, 2003, together with English translation thereof.

Katsutoshi Ishikura et al., "A Study on a Frequency Offset Estimation Method for OFDM Communication Systems", Proceedings of the IEICE General Conference, B.5-73, p. 487, Mar. 7, 2007, together with verified English translation thereof.

Russian Decision on Grant dated Oct. 30, 2012 in corresponding Russian Patent Application No. 2010101877, together with English translation.

European Telecommunications Standards Institute "Digital Video Broadcasting (DVB); Framing structure, channel coding and modulation for digital terrestrial television", ETSI EN 300 744, Jul. 1999.

Transmission System for Digital Terrestrial Television Broadcasting ARIB STD B-31 Version 1.6, Nov. 2005.

\* cited by examiner

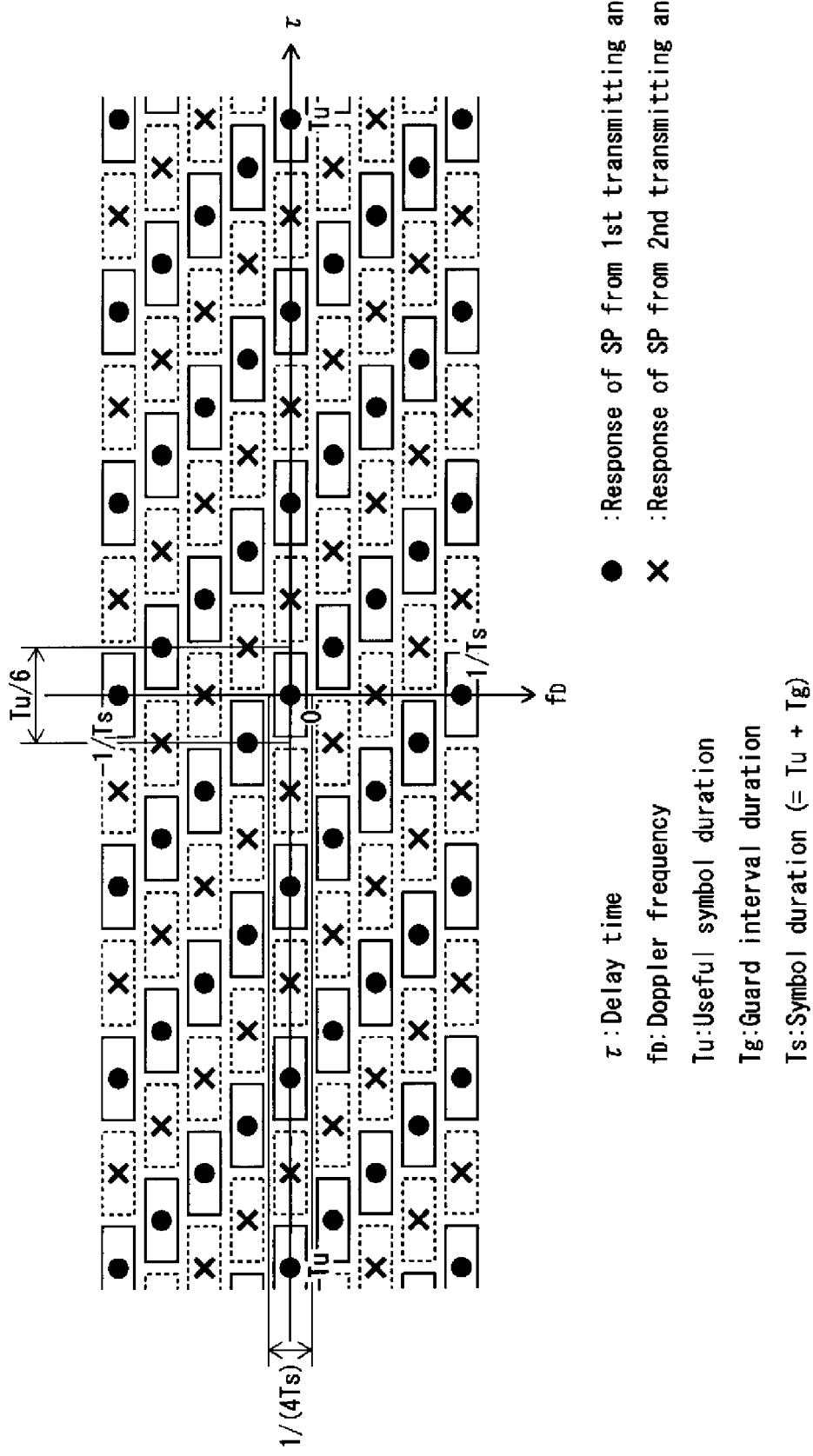

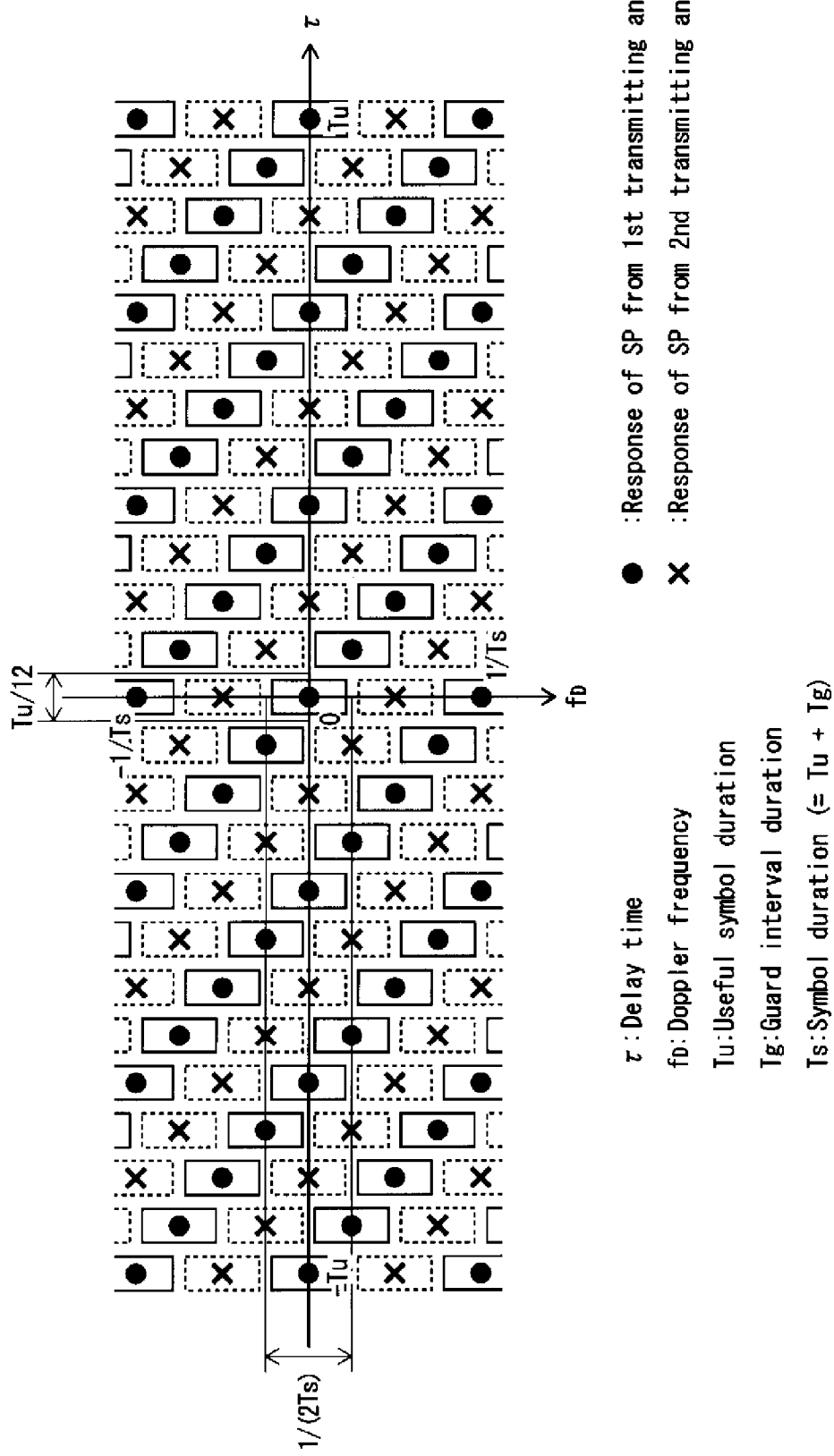

TRANSMISSION DEVICE, RECEPTION DEVICE, AND OFDM TRANSMISSION METHOD

TECHNICAL FIELD

The present invention relates to a data transmission technique using OFDM (Orthogonal Frequency Division Multiplexing) with pilot signals scattered on a carrier-symbol plane.

BACKGROUND ART

OFDM is a transmission method according to which a large number of mutually orthogonal carriers are modulated with digital data to be transmitted and the resulting modulated waves are multiplexed and transmitted. With an increase in the number of carriers used, the symbol duration increases as compared with a single-carrier transmission method at the same transmission rate. This makes the OFDM transmission more robust to the effect of multi-path propagation. In OFDM, in addition, a redundant duration called a guard interval is inserted between adjacent symbols to avoid the intersymbol interference that multi-path propagation would cause.

However, in a multi-path, the phases and amplitudes of the individual carries vary, so that the receiver needs to compensate (equalize) the distortion in phase and amplitude. In one scheme employed widely for the equalization, pilot signals (of which phase and amplitude are known to the receiver) are transmitted in some of the cells (i.e., the transmission units identified by combinations of the symbol number and the carrier number) contained in an OFDM signal. The receiver estimates the channel characteristics by using the pilot signals and equalizes the received signal by using the estimated channel characteristics.

For example, according to DVB-T (Digital Video Broadcasting Terrestrial) system, which is the standard for the broadcast transmission of digital terrestrial television in Europe, and ISDB-T (Integrated Services Digital Broadcasting Terrestrial) system in Japan, pilot signals called SPs (Scattered Pilots) are scattered on a carrier-symbol plane (hereinafter referred to as "k-n plane") in a pattern shown in FIG. 17 (See Non-Patent Documents 1 and 2 listed below). In each figure showing a signal arrangement pattern of SP signals, the vertical axis represents a time axis and "n" represents a symbol number, whereas the horizontal axis represents a frequency axis, and k represents a carrier number. In addition, an open circle represents a cell carrying an SP signal, whereas a black dot represents a cell carrying data. Data referred herein includes data representing video and audio information and also include control information, such as TPS (Transmission Parameter Signaling) in DVB-T and TMCC (Transmission Multiplexing Configuration Control) in ISDB-T. In each figure showing a signal arrangement pattern of SP signals on the k-n plane, the symbol numbers starts from 0 and the carrier numbers starts from 0.

Here, let Tu represents the useful symbol duration, Tg represents the guard interval duration, and Ts (=Tu+Tg) represents the symbol duration. Then, the interval between adjacent cells in the same carrier in the direction of the time axis is equal to Ts, and the interval between adjacent cells in the same symbol in the direction of the frequency axis is equal to 1/Tu.

In FIG. 17, SP signals in each symbol appear at an interval of 12 carriers and SP signals in each carrier appear at an interval of 4 symbols. The position of each SP signal is shifted by three carriers per symbol. That is, when $k_{SP}(n)$ denotes the carrier number of a cell containing an SP signal in a symbol having the symbol number n, this carrier number $k_{SP}(n)$ satisfies the following Equation 1, where mod is a modulus operator and p is an integer greater than or equal to 0.

$$k_{SP}(n)=3\times(n \bmod 4)+12\times p \quad \text{[Equation 1]}$$

Each SP signal is modulated based on the pseudo-random binary sequence $w_k$, and the amplitude and phase of the SP signal is determined depending exclusively on the carrier number k of the cell containing that SP signal and not on the symbol number n.

With reference to FIG. 18, the following describes the principles of the channel estimation and equalization performed by the receiver by using SP signals. FIG. 18 is a block diagram showing the structure of a typical receiver.

In a receiver 100, a signal received with a non-illustrated receiving antenna is subjected to predetermined processes by non-illustrated components including a tuner. The processed signal is supplied to a Fourier transform unit 101 where signal parts each containing a useful symbol duration Tu are clipped from the supplied signal and the Fourier transform is applied to the clipped signal parts to convert the clipped signal parts into a reception signal Y'(n, k). The converted reception signal Y'(n, k) is output to a division unit 106 and also to an SP extraction unit 102. The SP extraction unit 102 extracts a reception SP signal Y' (n, $k_{SP}(n)$) from the reception signal Y' (n, k) and outputs the extracted reception SP signal Y' (n, $k_{SP}(n)$) to a division unit 104.

An SP generation unit 103 generates a nominal SP signal Y(n, $k_{SP}(n)$), which is identical to an SP signal generated by the transmitter, and outputs the SP signal Y (n, $k_{SP}(n)$) to the division unit 104. The division unit 104 divides the reception SP signal Y' (n, $k_{SP}(n)$) by the SP signal Y (n, $k_{SP}(n)$) and outputs the division result as the channel response H' (n, $k_{SP}(n)$) to an interpolation unit 105. The interpolation unit 105 interpolates the channel response H' (n, $k_{SP}(n)$) on the k-n plane to estimate the channel response H'(n, k) for each cell and outputs the thus estimated channel response H'(n, k) to the division unit 106.

The division unit 106 divides the reception signal Y'(n, k) by the channel response H'(n, k) to estimate a transmission signal X'(n, k) and outputs the thus estimated transmission signal X'(n, k).

Through the above processes, the distortion in amplitude and phase of the transmission signal caused by multi-path is compensated using SP signals (See Patent Document 1, for example).

In addition, disclosed is the application of MIMO (Multiple Input Multiple Output) techniques, which employ multiple antennas at both the transmitter and receiver to achieve high-speed and high-capacity data transmission, to a digital terrestrial television broadcasting using SP signals, such as DVB-T (See Non-Patent Document 3, for example).

First, the following describes the overview of a MIMO transmission system in which the transmitter and the receiver both have two antennas, with reference to FIG. 19. FIG. 19 is a diagram showing such a MIMO transmission system.

A transmitter 200 transmits a first transmission signal and a second transmission signal from a first transmitting antenna 201 and a second transmitting antenna 202, respectively. The first transmission signal is obtained by applying the inverse Fourier transform to a first transmission signal Xc1(n, k), and the second transmission signal is obtained by applying the inverse Fourier transform to a second transmission signal Xc2 (n, k). Note that the first and second transmission signals are simultaneously transmitted respectively on the cells each having the symbol number n and the carrier number k.

A receiver 300 receives a first reception signal with a receiving antenna 301. The first reception signal contains the first transmission signal arrived via a channel Pc11 and the second transmission arrived via a channel Pc12. The receiver 300 applies the Fourier transform to the first reception signal to obtain a first reception signal Yc'1($n, k$). In addition, the receiver 300 receives a second reception signal with a receiving antenna 302. The second reception signal contains the second transmission signal arrived via a channel Pc22. The receiver 300 applies the Fourier transform to the second reception signal to obtain a second reception signal Yc'2 (n, k). The receiver 300 then conducts a predetermined process on the first reception signal Yc'1($n, k$) and the second reception signal Yc'2($n, k$) and outputs the first transmission signal Xc'1($n, k$) and the second transmission signal Xc'2($n, k$).

Here, let Hc11($n, k$), Hc12($n, k$), Hc21($n, k$), and Hc22 (n, k) respectively denote the channel responses of channels Pc11, Pc12, Pc21, and Pc22 at the cell having the symbol number n and the carrier number k. Let Nc1($n, k$) and Nc2($n, k$) denote the noise power contained in the first reception signal Yc'1($n, k$) and in the second reception signal Yc'2($n, k$), respectively. Then, the first reception signal Yc'1($n, k$) and the second reception signal Yc'2($n, k$) are expressed by Equation 2 shown below. The notation [ ] in Equation 2 represents a matrix.

$$\begin{bmatrix} Yc'1(n,k) \\ Yc'2(n,k) \end{bmatrix} = \begin{bmatrix} Hc11(n,k) & Hc12(n,k) \\ Hc21(n,k) & Hc22(n,k) \end{bmatrix} \begin{bmatrix} Xc1(n,k) \\ Xc2(n,k) \end{bmatrix} + \begin{bmatrix} Nc1(n,k) \\ Nc2(n,k) \end{bmatrix}$$

[Equation 2]

That is, once the channel responses of the channels Pc11, Pc12, Pc21, and Pc22 are estimated, the receiver 300 is able to separate and equalize the first transmission signal Xc'1 (n, k) and the second transmission signal Xc' 2($n, k$) by using Equation 3 shown below, where Hc'11($n, k$), Hc'12($n, k$), Hc'21($n, k$), and Hc'22($n, k$) are the channel responses estimated by the receiver 300. In Equation 3, the notation [ ] represents a matrix, and the notation [ ]$^{-1}$ represents the inverse matrix of [ ].

$$\begin{bmatrix} Xc'1(n,k) \\ Xc'2(n,k) \end{bmatrix} = \begin{bmatrix} Hc'11(n,k) & Hc'12(n,k) \\ Hc'21(n,k) & Hc'22(n,k) \end{bmatrix}^{-1} \begin{bmatrix} Yc'1(n,k) \\ Yc'2(n,k) \end{bmatrix}$$

[Equation 3]

Non-Patent Document 3 describes a technique for enabling separation and estimation of channel responses of two channels from two transmitting antennas to one receiving antenna, by transmitting SP signals arranged in the pattern shown in FIG. 17 from the first transmitting antenna and SP signals arranged in the pattern shown in FIG. 20 from the second transmitting antenna. In FIG. 20, a plus (+) sign indicates that the polarity of an SP signal transmitted from the second transmitting antenna is not inverted with respect to the polarity of a corresponding SP signal transmitted from the first transmitting antenna. On the other hand, a minus (−) sign indicates that the polarity of an SP signal transmitted from the second transmitting antenna is inverted with respect to the polarity of a corresponding SP signal transmitted from the first transmitting antenna.

That is, of the SP signals transmitted from the second transmitting antenna, the polarity of each SP signal having an even symbol number is not inverted and of each SP signal having an odd symbol number is inverted, with respect to the polarity of a corresponding SP signal transmitted from the first transmitting antenna.

The receiver observes, for each symbol where the symbol number n is an even number, components representing the sum of the channel responses of the two channels, one of which is from the first transmitting antenna to the receiving antenna and the other is from the second transmitting antenna to the receiving antenna (hereinafter, the former is referred to as "first channel response" and the latter as "second channel response"). On the other hand, for each symbol where the symbol number n is an odd number, components representing the difference between the first and second channel responses are observed. Therefore, the receiver can separate and estimate the first channel response by adding the sum components and the difference components, and the second channel response by subtracting the difference components from the sum components.

[Non-Patent Document 1]
"Digital Video Broadcasting (DVB); Framing structure, Channel coding and modulation for digital terrestrial television", ETSI EN 300 744 by European Telecommunications Standards Institutes

[Non-Patent Document 2]
"TRANSMISSION SYSTEM FOR DIGITAL TERRESTRIAL TELEVISION BROADCASTING", ARIB STD-B31 by Association of Radio Industries and Businesses

[Non-Patent Document 3]
"A DUAL POLARIZATION MIMO BROADCAST TV SYSTEM", BBC Research White Paper WHP 144 by J. D. Mitchell, P. N. Moss and M. J. Thorp

[Patent Document 1]
JP patent No. 2772286

The following now considers the range in which a channel response is duly estimated on condition that SP signals are arranged in the pattern shown in FIG. 17, which is used in the DVB-T system as well as in the ISDB-T system.

FIG. 21 is a schematic view of responses on the delay time-Doppler frequency plane (hereinafter referred to as the "$\tau$-$f_D$ plane") of SP signals arranged on the k-n plane in the pattern shown in FIG. 17. In other words, FIG. 21 show two-dimensional Fourier transform pairs of SP signals arranged on the k-n plane in the pattern shown in FIG. 17. In each figure showing SP signal responses and showing the estimatable ranges of channel responses, the horizontal axis represents a delay time axis (hereinafter referred to as the "$\tau$ axis") and corresponds to the delay time (T) of the impulse response of a channel. The vertical axis represents a Doppler frequency axis (hereinafter referred to as the "$f_D$ axis") and corresponds to the Doppler frequency ($f_D$) of the Doppler spectrum of a channel. In addition, a black dot represents a response of an SP signal on the $\tau$-$f_D$ plane.

As shown in FIG. 21, the minimum interval between SP signal responses on the $\tau$-$f_D$ plane in the $\tau$ axis direction is equal to Tu/12. It is because SP signals on the k-n plane are arranged to appear one for every 12 carriers in the same symbol. In other words, the sampling interval in the k axis direction is equal to 12/Tu. Further, the minimum interval between SP signal responses on the $\tau$-$f_D$ plane in the $f_D$ axis direction is equal to 1/(4Ts). It is because SP signals on the k-n plane are arranged to appear one for every 4 symbols in the same carrier. In other words, the sampling interval in the n axis direction is equal to 4Ts. Still further, the minimum interval between SP signal responses on the $\tau$-$f_D$ plane at the same Doppler frequency in the τ axis direction is equal to Tu/3. It is because the minimum interval between SP signals on the k-n plane in the k axis direction is equal to 3 carriers. Still further, the minimum interval between SP signal responses at the same delay time on the τ-$f_D$ plane in the $f_D$ axis direction is equal to 1/Ts. It is because the minimum interval between SP signals on the k-n plane in the n axis direction is equal to one symbol.

In the case where an impulse response of a channel has a delay spread, the response spreads in the τ axis direction as compared with a corresponding SP signal response. In the case where a Doppler spectrum of a channel has a frequency spread, the spectrum spreads in the $f_D$ axis direction as compared with a corresponding SP signal response.

FIG. 22 shows a region of the τ-$f_D$ plane in which the channel response H' (n, $k_{SP}$(n)) of an SP signal can be interpolated without causing aliasing distortion, on condition that the channel response H' (n, $k_{SP}$(n)) is first interpolated in the n axis direction and then in the k axis direction of the k-n plane. In FIG. 22, a black dot represents an SP signal response on the τ-$f_D$ plane, and a rectangle represents a channel response of the channel from the transmitting antenna to the receiving antenna.

From FIG. 22, it is known that a rectangular region having a width of Tu/3 in the τ axis direction and a width of 1/(4Ts) in the $f_D$ axis direction is the region in which the channel response is interoperated without causing aliasing distortion (hereinafter, referred to as "interpolatable region"). According to the DVB-T and ISDB-T systems, the length of the longest guard interval duration is Tu/4. With the guard interval duration equal to Tu/4, the spread of the impulse response of the channel equal to Tu/4 or less would not adversely affect the reception quality. It is because the inter-symbol interference is ensured to fall within the guard interval duration. The width of the interpolatable region in the τ axis direction is set to Tu/3 in order to allow a margin for practical filters and yet to ensure a correct estimation of a channel response without incurring the risk of inter-symbol interference.

As described above, in terms of the design details of a transmission system, the guard interval duration and the SP signal arrangement are closely related. That is, in order not to impair the tolerance to multi-path delay provided by insertion of guard interval durations, the minimum interval between SP signals on the k-n plane in the k axis direction needs to be shorter than a predetermined interval. In terms of the transmission efficiency, however, it is desirable to keep to a minimum the density of SP signals, which do not carry any useful information. That is, there is a trade-off between the guard interval duration and the SP signal arrangement.

FIG. 23 shows a region of the τ-$f_D$ plane in which the channel response H' (n, $k_{SP}$(n)) of an SP signal can be interpolated without causing aliasing distortion, on condition that the channel response H' (n, $k_{SP}$(n)) is interpolated only in the k axis direction and not in the n axis direction of the k-n plane. In FIG. 23, a black dot represents an SP signal response on the τ-$f_D$ plane, and a rectangle represents a channel response of the channel from the transmitting antenna to the receiving antenna.

From FIG. 23, it is known that a rectangular region having a width of Tu/12 in the τ axis direction and a width of 1/Ts in the $f_D$ axis direction is a region in which the channel response is interoperated without causing aliasing distortion (hereinafter, referred to as "interpolatable region").

The following now considers the range in which channel response is duly estimated with the SP signal arrangement disclosed in Non-Patent Document 3, which is used for a MIMO transmission system.

The process of inverting and not inverting the polarity of SP signals transmitted from the first transmitting antenna is equivalent to an arithmetic operation of multiplying individual SP signals transmitted from the first transmitting antenna, by the complex plane wave expressed by the left side of Equation 4 shown below. The complex plane wave has an equi-phase line parallel to the k axis direction on the k-n plane, and the cycle in the n axis direction is equal to 2n.

$$\exp\left(j2\pi\frac{1}{2}n\right) = \exp\left(j2\pi\frac{1}{2Ts}t\right) \qquad \text{[Equation 4]}$$

Note that in Equation 4, the right side is obtained by rewriting the left side using the relation n=(1/Ts)t.

Accordingly, the response of each SP signal transmitted from the second transmitting antenna is said to be shifted the response of a corresponding SP signal transmitted from the first transmitting antenna, by 1/(2Ts) in the $f_D$ axis direction on the τ-$f_D$ plane.

In view of the above, the responses of SP signals transmitted from the first transmitting antenna and the responses of SP signals from the second transmitting antenna are expressed on the same τ-$f_D$ plane as shown in FIG. 24. Note that a black dot represents a response of an SP signal transmitted from the first transmitting antenna, whereas a cross represents a response of an SP signal transmitted from the second transmitting antenna.

Note that the process of inverting and not inverting the polarity of SP signals transmitted from the first transmitting antenna shown in FIG. 20 is to invert the polarity of an SP signal transmitted from the first transmitting antenna at every third carrier in the frequency direction. In other words, the process may be construed to be equivalent to an arithmetic operation of multiplying individual SP signals transmitted from the first transmitting antenna, by the complex plane wave expressed by the left side of Equation 5 shown below. The complex plane wave has an equi-phase line parallel to the n axis on the k-n plane and the cycle in the k axis direction is equal to 6k.

$$\exp\left(-j2\pi\frac{1}{6}k\right) = \exp\left(-j2\pi\frac{Tu}{6}f\right) \qquad \text{[Equation 5]}$$

Note that in Equation 5, the right side is obtained by rewriting the left side using the relation k=Tuf. In addition, the phase term in Equation 5 is attached with a negative (−) sign. It is because the delay in the positive direction along the τ axis corresponds to the phase rotation exp(−j2πfτ) in the negative direction in proportion to the frequency f.

Based on the above understanding, it is said that the response of each SP signal transmitted from the second transmitting antenna is shifted the response of a corresponding SP signal transmitted from the first transmitting antenna, by Tu/6 in the τ axis direction on the τ-$f_D$ plane. It is thus apparent from that each response shown in FIG. 20 is equivalent to that obtained by shifting the response of a corresponding SP signal shown in FIG. 24 by 1/(2Ts) in the $f_D$ axis direction.

The receiver divides each received SP signal (i.e., a mixed SP signal which is a mixture of an SP signal transmitted from the first transmitting antenna and an SP signal transmitted from the second transmitting antenna) by the nominal SP signal. As a result of the division, the receiver obtains a channel response which is a mixture of a channel response of the channel from the first transmitting antenna to the receiving antenna (the first channel response) and a channel response of the channel from the second transmitting antenna to the receiving antenna (the second channel response).

The first channel response has the spreading from the black dots shown in FIG. 24, in accordance with the impulse response and Doppler spectrum. Similarly, the second channel response has the spreading from the crosses shown in FIG. 24, in accordance with the impulse response and Doppler spectrum.

FIG. 25 shows a region of the $\tau$-$f_D$ plane in which the first and second channel responses are interpolated without causing aliasing distortion and separated from each other without causing crosstalk therebetween, on condition that the channel response of each SP signal is interpolated first in the n axis direction and then in the k axis direction on the k-n plane. In FIG. 25, a black dot represents a response of an SP signal transmitted from the first transmitting antenna, whereas a cross represents a response of an SP signal transmitted from the second transmitting antenna. In addition, a rectangular with a solid line represents the first channel response, whereas a rectangular with a broken line represents the second channel response.

From FIG. 25, it is known that a rectangular region having a width of Tu/6 in the $\tau$ axis direction and a width of 1/(4Ts) in the $f_D$ axis direction is what is hereinafter referred to as "interpolatable & separable region". In the interpolatable & separable region, the first and second channel responses are interoperated without causing aliasing distortion and separated without causing crosstalk therebetween.

FIG. 26 shows a region of the $\tau$-$f_D$ plane in which the first and second channel responses are interpolated without causing aliasing distortion and separated from each other without causing crosstalk therebetween, on condition that the channel response of each SP signal is interpolated in the k axis direction only and not in the n axis direction on the k-n plane. In FIG. 26, a black dot represents a response of an SP signal transmitted from the first transmitting antenna, whereas a cross represents a response of an SP signal transmitted from the second transmitting antenna. In addition, a rectangular with a solid line represents the first channel response, whereas a rectangular with a broken line represents the second channel response.

From FIG. 26, it is known that a rectangular region having a width of Tu/12 in the $\tau$ axis direction and a width of 1/(2Ts) in the $f_D$ axis direction is what is hereinafter referred to as "interpolatable & separable region". In the interpolatable & separable region, the first and second channel responses are interoperated without causing aliasing distortion and separated without causing crosstalk therebetween.

From a comparison of the interpolatable region shown in FIG. 22 with the interpolatable & separable region shown in FIG. 25, it is shown that the width Tu/6 of the interpolatable & separable region in the $\tau$ axis direction is a half of the width Tu/3 of the interpolatable region in the $\tau$ axis direction. As mentioned above, it is preferable to set the $\tau$-axis direction width in which correct estimation of the first and second channel responses is ensured in a manner not to impair the tolerance to multi-path delay provided by insertion of guard interval durations. However, the SP signal transmission method described in Non-Patent Document 3 is associated with the following problem, even without considering any margin to be allowed for practical filters used for interpolation and separation. That is, in the case where the guard interval duration is longer than Tu/6, specifically where the guard interval duration is equal to Tu/4 for example, the tolerance to multi-path delay achieved by the insertion of guard intervals is impaired and thus the first and second channel responses may not be correctly estimated.

In addition, from a comparison of the interpolatable region shown in FIG. 23 with the interpolatable & separable region shown in FIG. 26, it is shown that the width 1/(2Ts) of the interpolatable & separable region in the $f_D$ axis direction is a half of the width 1/Ts of the interpolatable region in the $f_D$ axis direction. As clarified above, the SP signal transmission method according to Non-Patent Document 3 has a problem in the ability of following the time variation of a channel.

In view of the problems noted above, the present invention aims to provide a transmitter, a receiver, and an OFDM transmission method each of which achieves the following advantages, in the case where a plurality of pilot signals are transmitted from a plurality of transmitting antennas. The transmitter, receiver, and OFDM transmission method according to the present invention ensure correct estimation of a channel response involving a delay spread to the comparable to the case where pilot signals are transmitted from a single transmitting antenna or ensure the ability to follow the time variation of a channel to the extent comparable to the case where pilot signals are transmitted from a single transmitting antenna.

SUMMARY OF THE INVENTION

In order to achieve the above aim, a transmitter according to one aspect of the present invention has first to $M^{th}$ transmitting antennas (where M is an integer equal to or greater than 2) and is for transmitting an OFDM signal obtained by modulating a plurality of carriers per symbol duration. The OFDM signal contains pilot signals scattered on a carrier-symbol plane. On the carrier-symbol plane, k denotes a carrier number, n denotes a symbol number, $\Delta k$ denotes an interval between pilot signals in a same symbol, $\Delta n$ denotes an interval between pilot signals in a same carrier, and p denotes an integer greater than or equal to 0. $n_S$ and $k_S$ each denotes a nonzero integer, and m denotes an integer satisfying $1 \leq m \leq M$. When $2 \leq m \leq M$, neither $(m-1) n_s$ nor $(m-1) k_s$ is equal to an integral multiple of M. The carrier number $k_P(n)$ of a carrier that transmits a pilot signal in a symbol with the symbol number n satisfies Equation 6.

$$k_P(n) = \frac{\Delta k}{\Delta n} \times (n \bmod \Delta n) + \Delta k \times p \qquad \text{[Equation 6]}$$

The transmitter includes a generating unit operable to generate a plurality of pilot signals as $m^{th}$ pilot signals for an $M^{th}$ antenna (where $1 \leq m \leq M$), such that a phase difference between a phase of each $M^{th}$ pilot signal and a phase of a reference pilot signal is equal to a value given by Equation 7.

$$j2\pi \left[ \frac{(m-1)n_s}{M \Delta n} n - \frac{(m-1)k_s}{M \Delta k} k \right] \qquad \text{[Equation 7]}$$

The transmitter further includes a transmitter operable to transmit, from the $m^{th}$ transmitting antenna, an OFDM signal containing the $m^{th}$ pilot signals generated by the generating unit.

ADVANTAGEOUS EFFECTS OF INVENTION

According to the above-described aspects of the present invention, it is ensured that the responses of pilot signals appearing at the same Doppler frequency on the $\tau$-$f_D$ plane are all transmitted from only one of the first to $M^{th}$ transmitting antennas, and also that the responses of pilot signals appearing at the same delay time on the $\tau$-$f_D$ plane are all transmitted from only one of the first to $M^{th}$ transmitting antennas. By virtue of this, the transmitter transmits pilot signals from the first to $M^{th}$ transmitting antennas to ensure that the receiver is able to estimate the channel responses as long as the delay spread of the pilot signals is the same level that can be accurately estimated when pilot signals are transmitted from a single transmitting antenna, or able to follow the channel's time variability with the accuracy that would be achieved when pilot signals are transmitted from a single transmitting antenna.

BRIEF DESCRIPTION OF DRAWINGS

FIG. 25 is a schematic view showing a region in which the channel responses are separated and estimated, on condition that SP signals arranged in the patterns shown in FIGS. 17 and 20 are used; and FIG. 26 is another schematic view showing a region in which the channel responses are separated and estimated, on condition that SP signals arranged in the patterns shown in FIGS. 17 and 20 are used.

REFERENCE SINGS LIST

Figure 1:
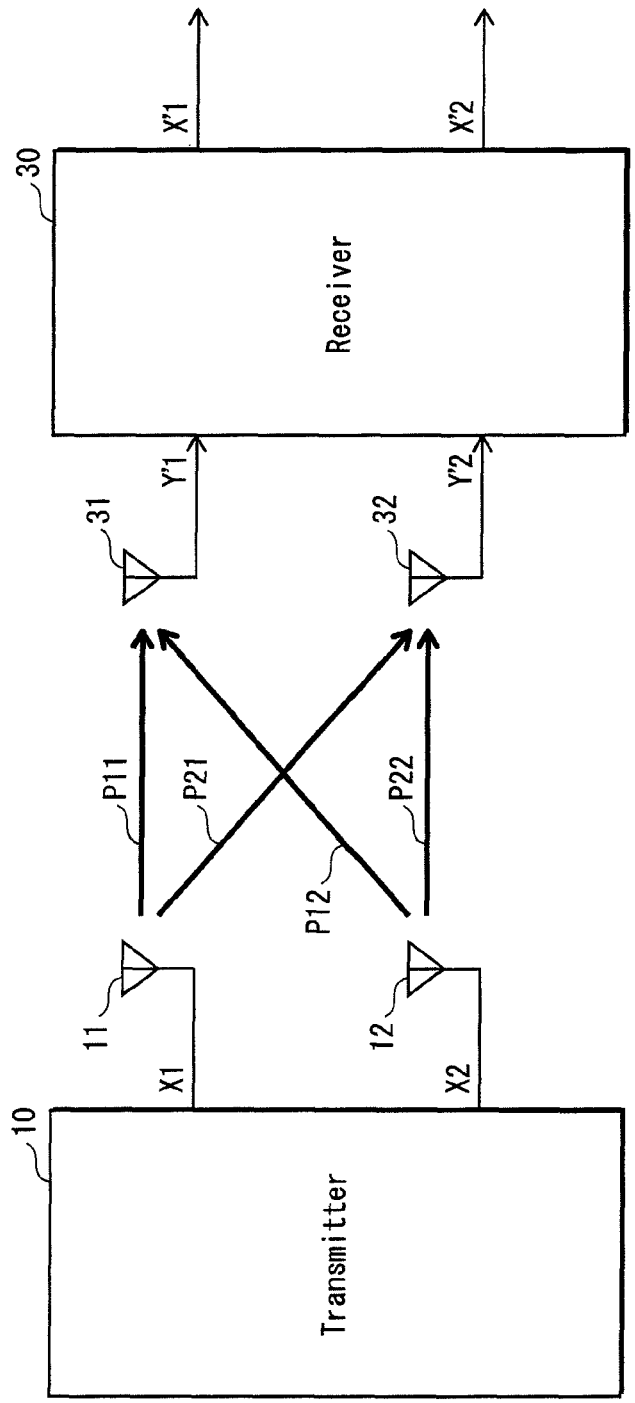
FIG. 1 is a diagram showing the configuration of a MIMO transmission system according to a first embodiment of the present invention.

10 Transmitter
11 First Transmitting Antenna
12 Second Transmitting Antenna
13 SP Generation Unit
14 Complex Plane Wave Generation Unit
15 Multiplication Unit
30 Receiver
31 First Receiving Antenna
32 Second Receiving Antenna
35, 38 Channel Separation & Estimation Unit
51, 61 SP Extraction Unit
52 SP Generation Unit
53, 63 Division Unit
54, 57, 64, 67 Interpolation Unit
55 Complex Plane Wave Generation Unit
56, 66 Multiplication Unit

DETAILED DESCRIPTION OF THE INVENTION

One aspect of the present invention provides a first transmitter having first to $M^{th}$ transmitting antennas (where M is an integer equal to or greater than 2) and for transmitting an OFDM signal obtained by modulating a plurality of carriers per symbol duration. The OFDM signal contains pilot signals scattered on a carrier-symbol plane. On the carrier-symbol plane, k denotes a carrier number, n denotes a symbol number, $\Delta k$ denotes an interval between pilot signals in a same symbol, $\Delta n$ denotes an interval between pilot signals in a same carrier, and p denotes an integer greater than or equal to 0. $n_S$ and $k_S$ each denotes a nonzero integer, and m denotes an integer satisfying 1≤m≤M. When 2≤m≤M, neither (m−1) $n_s$ nor (m−1)$k_s$ is equal to an integral multiple of M. The carrier number $k_P(n)$ of a carrier that transmits a pilot signal in a symbol with the symbol number n satisfies Equation 8.

$$k_P(n) = \frac{\Delta k}{\Delta n} \times (n \bmod \Delta n) + \Delta k \times p \qquad \text{[Equation 8]}$$

The first transmitter includes a generating unit operable to generate a plurality of pilot signals as $m^{th}$ pilot signals for an $m^{th}$ antenna (where 1≤m≤M), such that a phase difference between a phase of each $m^{th}$ pilot signal and a phase of a reference pilot signal is equal to a value given by Equation 9.

$$j2\pi\left[\frac{(m-1)n_s}{M\Delta n}n - \frac{(m-1)k_s}{M\Delta k}k\right] \qquad \text{[Equation 9]}$$

The first transmitter further includes a transmitter operable to transmit, from the $m^{th}$ transmitting antenna, an OFDM signal containing the $m^{th}$ pilot signals generated by the generating unit.

According to the above-described aspects of the present invention, it is ensured that the responses of pilot signals appearing at the same Doppler frequency on the $\tau$-$f_D$ plane are all transmitted from only one of the first to $M^{th}$ transmitting antennas, and also that the responses of pilot signals appearing at the same delay time on the $\tau$-$f_D$ plane are all transmitted from only one of the first to $M^{th}$ transmitting antennas. By virtue of this, the first transmitter transmits pilot signals from the first to $M^{th}$ transmitting antennas in a manner that the receiver is able to estimate the channel responses involving a delay spread to the extent that would be expected when pilot signals are transmitted from a single transmitting antenna or to follow the channel's time variability with the accuracy that would be achieved when pilot signals are transmitted from a single transmitting antenna.

Another aspect of the present invention provides a second transmitter consistent with the first transmitter, wherein the generating unit includes: a reference signal generating unit operable to generate a plurality of first pilot signals, each first pilot signal being the reference pilot signal; and a multiplication unit operable to generate the $m^{th}$ pilot signals where 2≤m≤M, each $m^{th}$ pilot signal being generated by multiplying the reference pilot signal by a complex plane wave expressed by Equation 10 on the carrier-symbol plane.

$$\exp\left\{j2\pi\left[\frac{(m-1)n_s}{M\Delta n}n - \frac{(m-1)k_s}{M\Delta k}k\right]\right\} \qquad \text{[Equation 10]}$$

Yet another aspect of the present invention provides a third transmitter consistent with the first transmitter, wherein the generating unit includes: a reference signal generating unit operable to generate a plurality of first pilot signals, each first pilot signal being the reference signal; and a phase rotation unit operable to generate the $m^{th}$ pilot signals where 2≤m≤M, each $m^{th}$ pilot signal being generated by rotating the phase of the reference pilot signal by the value given by Equation 9.

Yet another aspect of the present invention provides a fourth transmitter consistent with the first transmitter, wherein M is equal to 2. The generating unit includes: a reference signal generating unit operable to generate a plurality of first pilot signals, each first pilot signal being the reference signal; and a polarity inversion unit operable to generate a plurality of second pilot signals such that polarities of the second pilot signals are each alternately inverted and not inverted in a carrier direction with respect to a polarity of a corresponding reference signal in a same symbol.

According to the above-described aspects of the present invention, a means for readily generating the first to $m^{th}$ sets of pilot signals is provided.

Yet another aspect of the present invention provides a fifth transmitter consistent with the first transmitter, wherein M is equal to 2, $\Delta n$ is equal to 4, $\Delta k$ is equal to 12, $n_S$ is equal to 1, and $k_S$ is equal to 1.

Yet another aspect of the present invention provides a sixth transmitter consistent with the first transmitter, wherein M is equal to 2, $\Delta n$ is equal to 4, $\Delta k$ is equal to 12, $n_S$ is equal to 1, and $k_s$ is equal to −3.

The above-described aspects of the present invention are directly applicable, for example, to the DVB-T system or the ISDB-T system.

Yet another aspect of the present invention provides a first receiver for receiving an OFDM signal transmitted from a transmitter having a plurality of first to $M^{th}$ transmitting antennas (where M is an integer greater than or equal to 2). The OFDM signal is obtained by modulating a plurality of carriers per symbol duration. The OFDM signal contains a plurality of pilot signals scattered on a carrier-symbol plane. On the carrier-symbol plane, k denotes a carrier number, n denotes a symbol number, $\Delta k$ denotes an interval between pilot signals in a same symbol, $\Delta n$ denotes an interval between pilot signals in a same carrier, and p denotes an integer greater than or equal to 0. $n_S$ and $k_S$ each denotes a nonzero integer, and m denotes an integer satisfying 1≤m≤M. When 2≤m≤M, neither (m−1) $n_s$ nor (m−1) $k_s$ is equal to an integral multiple of M. The carrier number $k_P(n)$ of a carrier that transmits a pilot signal in a symbol with the symbol number n satisfies Equation 11.

$$k_P(n) = \frac{\Delta k}{\Delta n} \times (n \bmod \Delta n) + \Delta k \times p \qquad \text{[Equation 11]}$$

A plurality of pilot signals transmitted from an $m^{th}$ one of the transmitting antennas (where m is an integer satisfying 1≤m≤M) are $M^{th}$ pilot signals, such that a phase difference between a phase of each $M^{th}$ pilot signal and a phase of a reference pilot signal is equal to a value given by Equation 12.

$$j2\pi\left[\frac{(m-1)n_s}{M\Delta n}n - \frac{(m-1)k_s}{M\Delta k}k\right] \qquad \text{[Equation 12]}$$

The first receiver includes: a receiving antenna with which the OFDM signal from the transmitter is received; a response estimation unit operable to estimate a channel response of each of first to $M^{th}$ channels respectively from the first to $M^{th}$ antennas to the receiving antenna, the estimation being carried out based on Equation 12 and pilot signals contained in the OFDM signal received with the receiving antenna; and a signal estimation unit operable to estimate first to $M^{th}$ transmission signals based on the received OFDM signal and the estimated channel responses of the first to $M^{th}$ transmission channels, the first to $M^{th}$ transmission signals corresponding to first to $M^{th}$ OFDM signals transmitted respectively from the first to $M^{th}$ transmitting antennas.

According to the above-described aspects of the present invention, it is ensured that the responses of pilot signals appearing at the same Doppler frequency on the $\tau$-$f_D$ plane are all transmitted from only one of the first to $M^{th}$ transmitting antennas, and also that the responses of pilot signals appearing at the same delay time on the $\tau$-$f_D$ plane are all transmitted from only one of the first to $M^{th}$ transmitting antennas. By virtue of this, when pilot signals are transmitted from the first to $M^{th}$ transmitting antennas, the receiver is able to estimate the channel responses involving a delay spread to the extent that would be expected when pilot signals are transmitted from a single transmitting antenna or to follow the channel's time variability with the accuracy that would be achieved when pilot signals are transmitted from a single transmitting antenna.

Yet another aspect of the present invention provides a second receiver consistent with the first receiver, wherein the response estimation unit is operable to extract pilot signals from the OFDM signal received with the receiving antenna, divide each extracted pilot signal by the reference pilot signal, and estimate the channel response of the first channel based on a result of each division, and further operable to estimate the channel response of $m^{th}$ channel where $2 \leq m \leq M$, based on the result of each division and Equation 12.

According to the above-described aspect of the present invention, the channel response of the $m^{th}$ channel is readily estimated.

Yet another aspect of the present invention provides a first OFDM transmission method for transmitting an OFDM signal from a transmitter having first to $M^{th}$ transmitting antennas (where M is an integer greater than or equal to 2). The OFDM signal is obtained by modulating a plurality of carries per symbol duration. The OFDM signal contains pilot signals scattered on a carrier-symbol plane. On the carrier-symbol plane, k denotes a carrier number, n denotes a symbol number, $\Delta k$ denotes an interval between pilot signals in a same symbol, $\Delta n$ denotes an interval between pilot signals in a same carrier, and p denotes an integer greater than or equal to 0. $n_S$ and $k_S$ each denotes a nonzero integer, and m denotes an integer satisfying $1 \leq m \leq M$. When $2 \leq m \leq M$, neither $(m-1)n$, nor $(m-1)k$, is equal to an integral multiple of M. The carrier number $k_P(n)$ of a carrier that transmits a pilot signal in a symbol with the symbol number n satisfies Equation 13.

$$k_p(n) = \frac{\Delta k}{\Delta n} \times (n \bmod \Delta n) + \Delta k \times p \quad \text{[Equation 13]}$$

The first OFDM transmission method includes the step of generating a plurality of pilot signals as $m^{th}$ pilot signals for an $m^{th}$ antenna (where $1 \leq m \leq M$), such that a phase difference between a phase of each $M^{th}$ pilot signal and a phase of a reference pilot signal is equal to a value given by Equation 14.

$$j2\pi \left[ \frac{(m-1)n_s}{M\Delta n} n - \frac{(m-1)k_s}{M\Delta k} k \right] \quad \text{[Equation 14]}$$

The first OFDM transmission method further includes the step of transmitting, from the $m^{th}$ transmitting antenna, an OFDM signal containing the $m^{th}$ pilot signals generated in the generating step.

According to the above-described aspects of the present invention, it is ensured that the responses of pilot signals appearing at the same Doppler frequency on the $\tau$-$f_D$ plane are all transmitted from only one of the first to $M^{th}$ transmitting antennas, and also that the responses of pilot signals appearing at the same delay time on the $\tau$-$f_D$ plane are all transmitted from only one of the first to $M^{th}$ transmitting antennas. By virtue of this, the transmitter transmits pilot signals from the first to $M^{th}$ transmitting antennas in a manner that the receiver is able to estimate the channel responses involving a delay spread to the extent that would be expected when pilot signals are transmitted from a single transmitting antenna or to follow the channel's time variability with the accuracy that would be achieved when pilot signals are transmitted from a single transmitting antenna.

The following describes embodiments of the present invention, with reference to the accompanying drawings.

First Embodiment

First, a first embodiment of the present invention is described with reference to the drawings. In the following description, a useful symbol duration is denoted by Tu, and a guard interval duration is denoted by Tg, and a symbol duration is denoted by Ts(=Tu+Tg), similarity to the description of a conventional examples given above.

<MIMO Transmission System>

A MIMO transmission system according to the present embodiment is described with reference to FIG. 1. FIG. 1 is a diagram showing the configuration of the MIMO transmission system according to the present embodiment.

The MIMO transmission system 1 shown in FIG. 1 includes: a transmitter 10 having two transmitting antennas 11 and 12; and a receiver 30 having two receiving antennas 31 and 32.

The transmitter 10 transmits a first transmission signal and a second transmission signal from a first transmitting antenna 11 and a second transmitting antenna 12, respectively. The first transmission signal is obtained by applying the inverse Fourier transform to a first transmission signal X1(n, k), whereas the second transmission signal is obtained by applying the inverse Fourier transform to a second transmission signal X2(n, k). The first and second transmission signals are simultaneously transmitted respectively on the cells each having a symbol number n and a carrier number k. Note that each the first and second transmission signals transmitted from the first and second transmitting antenna 11 and 12 is a signal generated by modulating multiple mutually orthogonal carriers with data to be transmitted as well as with other data, followed by multiplexing of the resultant modulated waves.

The receiver 30 receives with the receiving antenna 31 a first reception signal containing the first transmission signal arrived via a channel P11 and the second transmission signal arrived via a channel P12 and applies the Fourier transform to the first reception signal to obtain a first reception signal Y'1(n, k). In addition, the receiver 30 receives with the receiving antenna 32 a second reception signal containing the first transmission signal arrived via a channel P21 and the second transmission signal arrived via a channel P22 and applies the Fourier transform to the second reception signal to obtain a second transmission signal Y'2(n, k). The receiver 30 then conducts a predetermined process on the first reception signal Y1'(n, k) and the second reception signal Y2'(n, k) and outputs a first transmission signal X1'(n, k) and a second transmission signal X2'(n, k).

<SP Signals>

Before the detailed description of the transmitter 10 and the receiver 30 shown in FIG. 1, a description is given of the description of SP signals transmitted from the first transmitting antenna 11 and SP signals transmitted from the second transmitting antenna 12.

Figure 17:
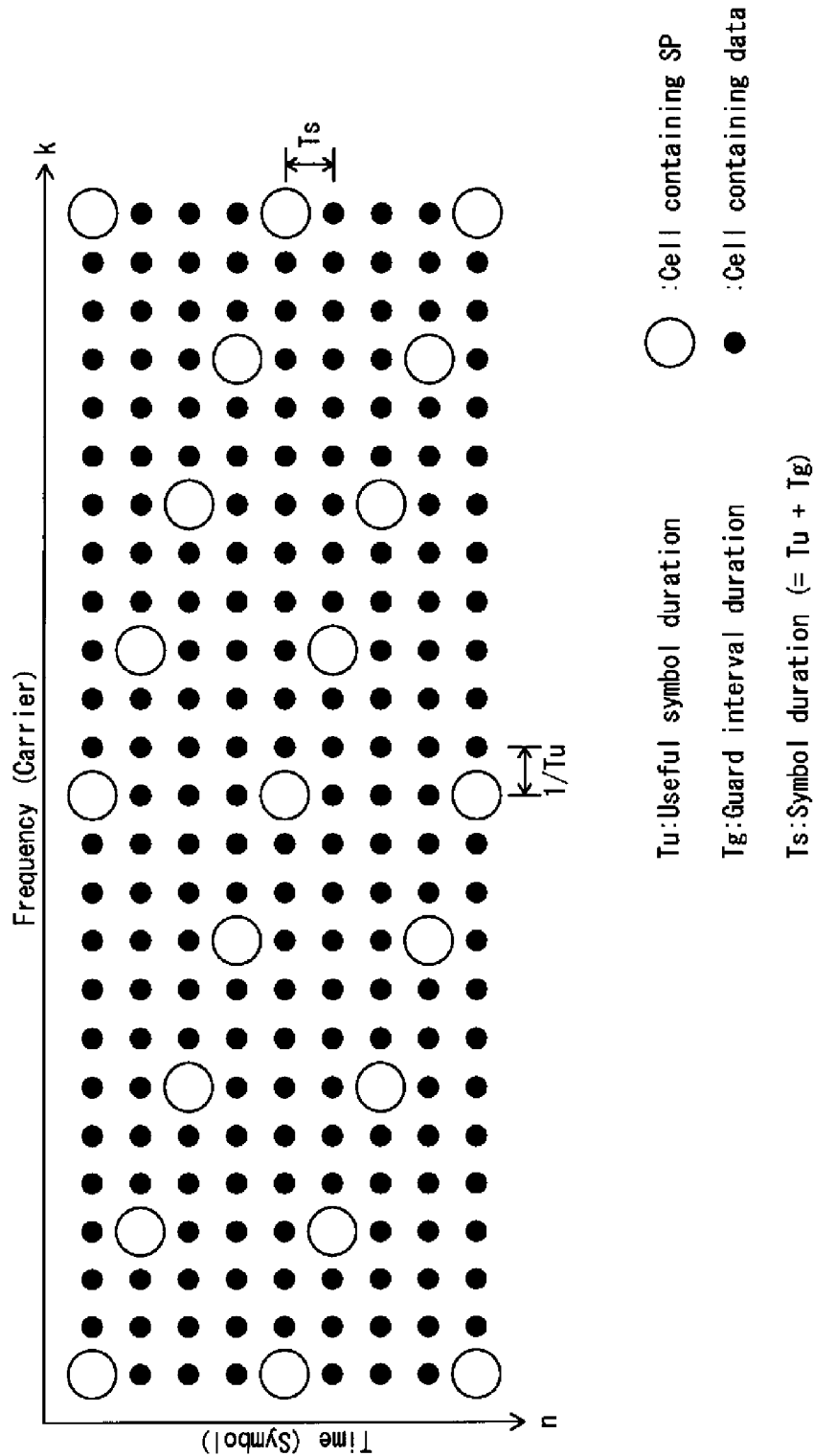
FIG. 17 is a view showing a pattern of SP signal arrangement used in a DVB-T or ISDB-T system.
Figure 18:
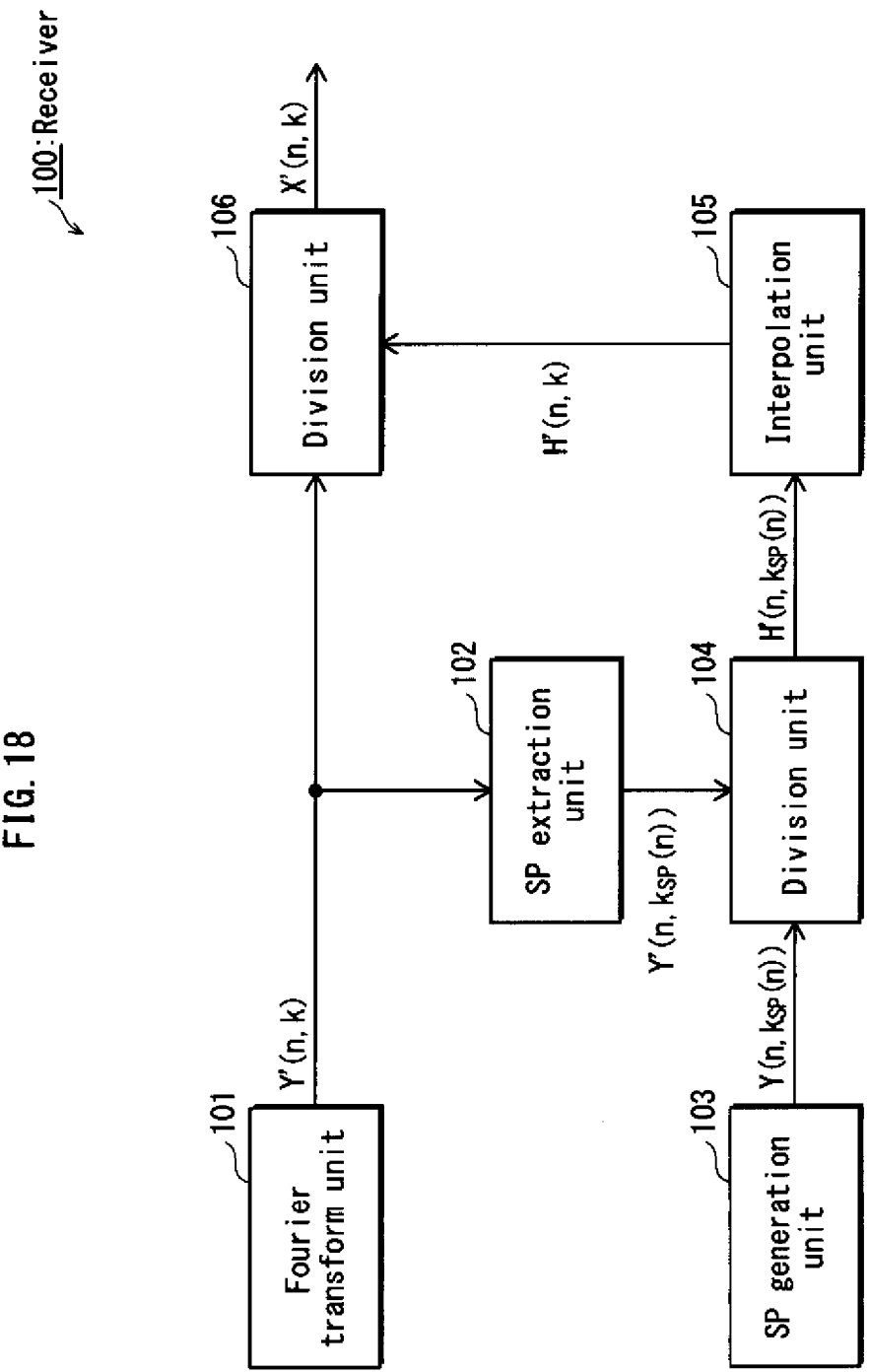
FIG. 18 is a diagram showing the structure of a conventional receiver, for illustrating the principles of channel estimation and reception signal equalization performed by the receiver.
Figure 19:
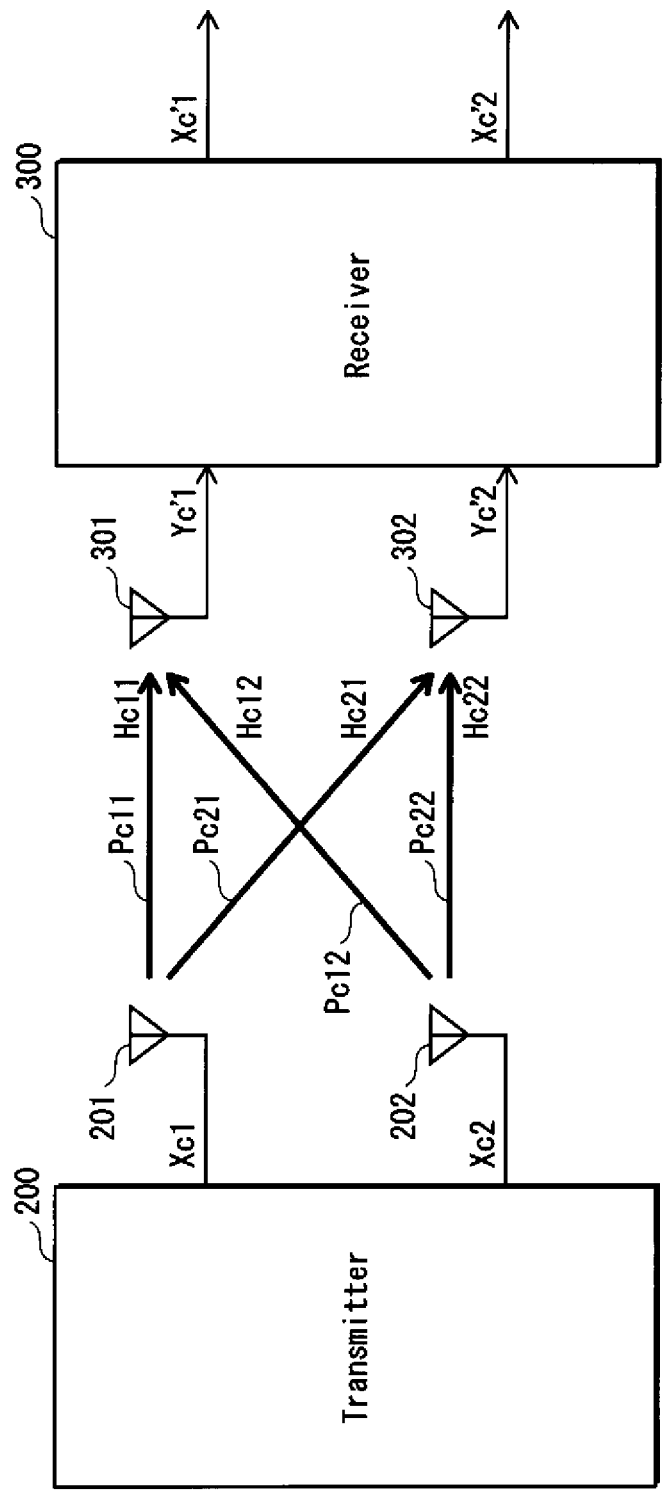
FIG. 19 is a diagram showing the structure of a conventional MIMO transmission system, for illustrating the principles of a MIMO transmission method.

The SP signals transmitted from the first transmitting antenna 11 are arranged in the pattern shown in FIG. 17 mentioned above. The value of the complex number of each SP signal allocated to a cell is equal to the complex number of a typical SP signal allocated to a corresponding cell in the DVB-T and ISDB-T systems.

Figure 2:
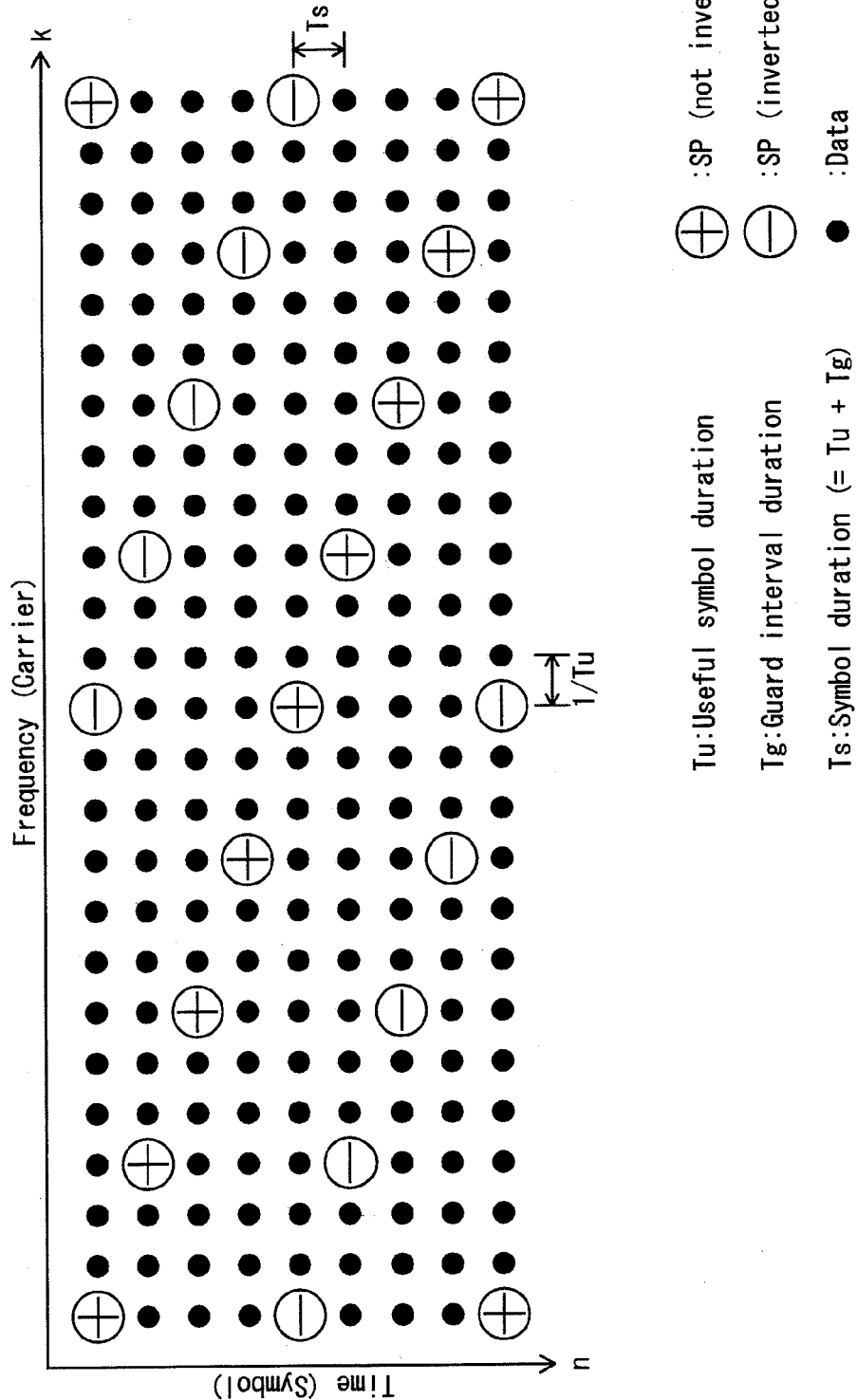
FIG. 2 is a schematic view showing the arrangement pattern and polarity reversal of SP signals transmitted from a second transmitting antenna 12 shown in FIG. 1.

In contrast, the SP signals transmitted from the second transmitting antenna 12 are arranged in the pattern shown in FIG. 2. Note that a plus (+) sign in FIG. 2 indicates that the polarity of each SP signal transmitted from the second transmitting antenna 12 in a cell represented by a plus (+) sign is not inverted with respect to the polarity of an SP signal transmitted from the first transmitting antenna 11 in a corresponding cell having the same symbol number and the same carrier number. On the other hand, a minus (−) sign in FIG. 2 indicates that the polarity of each SP signal transmitted from the second transmitting antenna 12 in a cell represented by a minus (−) sign is inverted with respect to the polarity of an SP signal transmitted from the first transmitting antenna 11 in a corresponding cell with the same symbol number and the same carrier number.

As shown in FIGS. 17 and 2, the SP signals transmitted from the first transmitting antenna 11 are arranged in the same pattern as the SP signals transmitted from the second transmitting antenna 12. In addition, both the patterns of SP signal arrangement satisfy that the carrier number $k_{SP}(n)$ of a cell transmitting an SP signal in the symbol having the symbol number n satisfies Equation 1 described above.

The SP signals transmitted from the second transmitting antenna 12 in one symbol are alternately inverted and not inverted in polarity, with respect to the SP signals transmitted from the first transmitting antenna 11 in the same symbol. In the direction that the symbol number is incremented by 1 and the carrier number is incremented by 3, the polarity of SP signals transmitted from the second transmitting antenna 12 are all inverted or non-inverted with respect to the polarity of corresponding SP signals transmitted from the first transmitting antenna 11.

The process of inverting or not inverting the polarity of SP signals transmitted from the first transmitting antenna 11 is equivalent to an arithmetic operation of multiplying individual SP signals transmitted from the first transmitting antenna 11 by the complex plane wave expressed by the left side of Equation 15 shown below. The complex plane wave has a cycle equal to 8n in the n axis direction and a cycle equal to 24k in the k axis direction on the k-n plane.

$$\exp\left[j2\pi\left(\frac{1}{8}n - \frac{1}{24}k\right)\right] = \exp\left[j2\pi\left(\frac{1}{8}t - \frac{Tu}{24}f\right)\right] \quad \text{[Equation 15]}$$

Note that in Equation 15, the right side is obtained by rewriting the left side using the relation $n=(1/Ts)t$ and $k=Tuf$.

Accordingly, the response of each SP signal transmitted from the second transmitting antenna 12 is said to be shifted the response of a corresponding SP signal to be transmitted from the first transmitting antenna 11, by Tu/24 in the $\tau$ axis direction and $1/(8Ts)$ in the $f_D$ axis direction on the $\tau$-$f_D$ plane.

Figure 3:
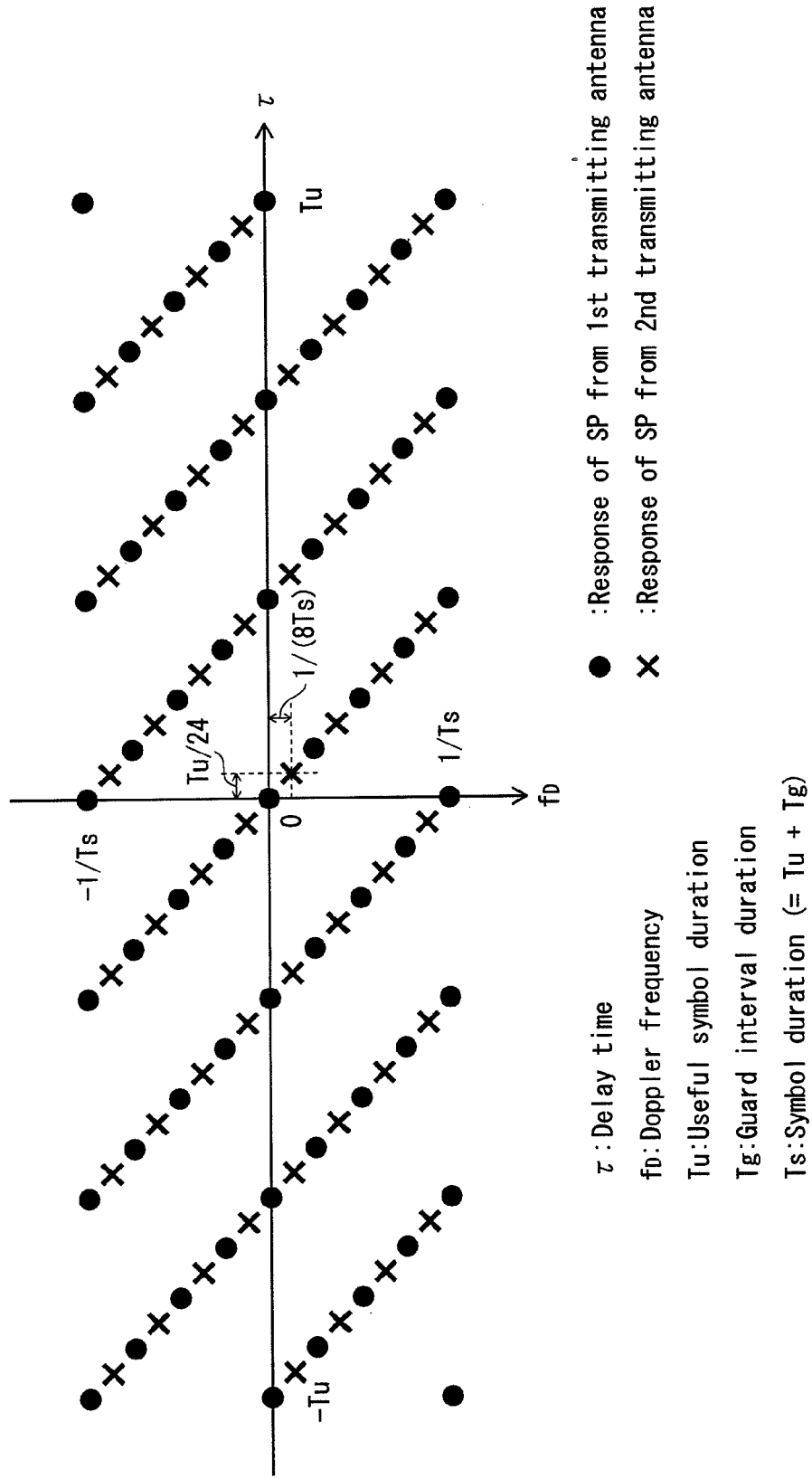
FIG. 3 is a schematic view showing, on a $\tau$-$f_D$ plane, responses of SP signals transmitted from a first transmitting antenna 11 and the second transmitting antenna 12 shown in FIG. 1.

In view of the above, the responses of SP signals transmitted from the first transmitting antenna 11 and the responses of SP signals transmitted from the second transmitting antenna 12 are expressed on the same $\tau$-$f_D$ plane as shown in FIG. 3. Note that a black dot in FIG. 3 represents a response of an SP signal transmitted from the first transmitting antenna 11, whereas a cross represents a response of an SP signal transmitted from the second transmitting antenna 12.

The receiver 30 divides each received SP signal by the nominal SP signal to obtain a mixed channel response which is a mixture of a channel response of the channel from the first transmitting antenna 11 to one of the receiving antennas (either the first receiving antenna 31 or the second receiving antenna 32) and a channel response of the channel from the second transmitting antenna 12 to the one of the receiving antennas (the former channel response is referred as the "channel response related to the first transmitting antenna 11" and the latter is referred to as the "channel response related to the second transmitting antenna 12").

However, the channel response related to the first transmitting antenna 11 has the spreading from the black dots shown in FIG. 3, in accordance with the impulse response and Doppler spectrum. Similarly, the channel response related to the second transmitting antenna 12 has the spreading from the crosses shown in FIG. 3, in accordance with the impulse response and Doppler spectrum.

Figure 4:
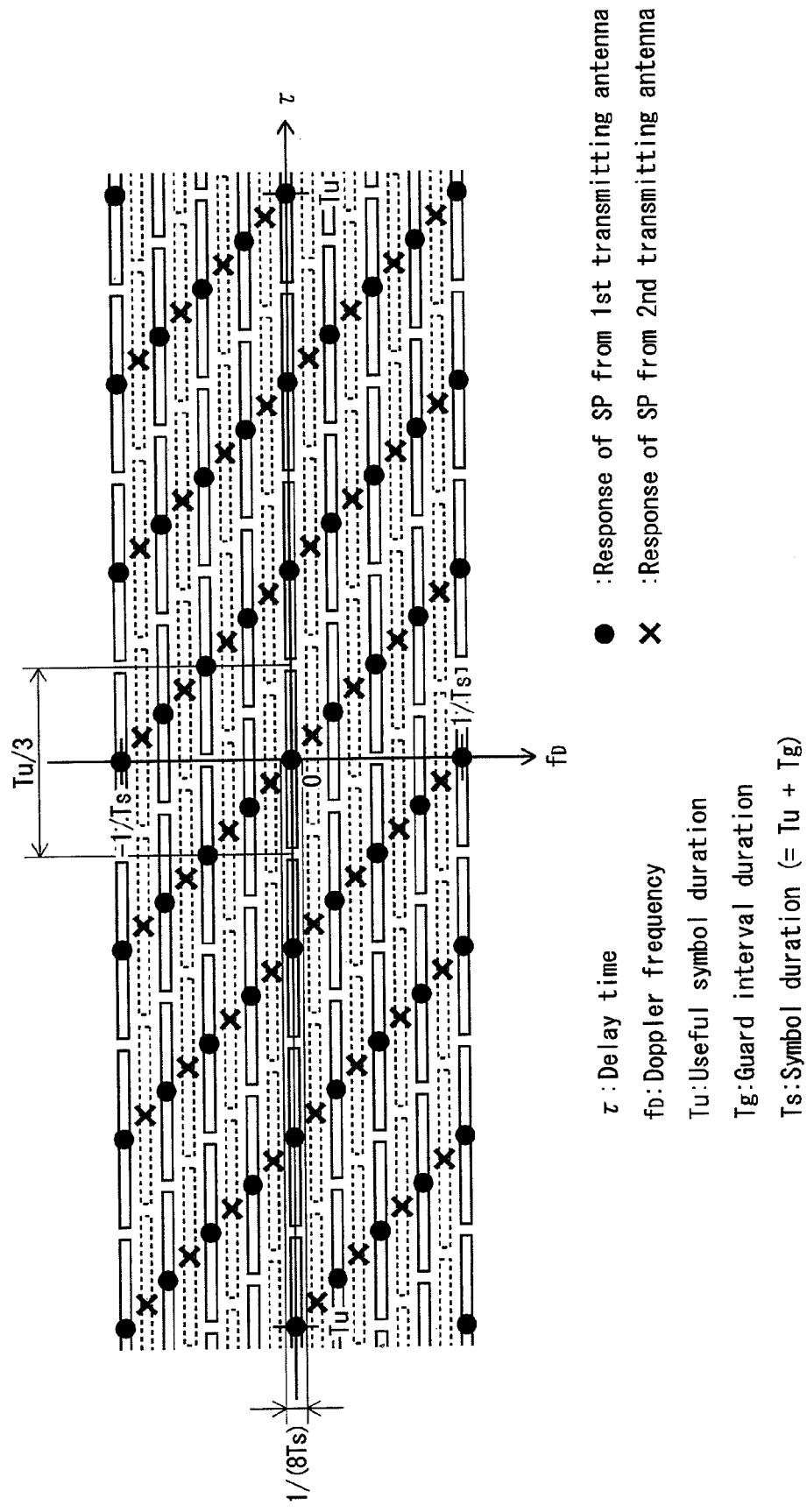
FIG. 4 is a schematic view showing a region in which the channel responses are separated and estimated, on condition that SP signals arranged the patterns shown in FIGS. 17 and 2 are used.

FIG. 4 shows a region of the $\tau$-$f_D$ plane in which the channel response related to the first transmitting antenna 11 and the channel response related to the second transmitting antenna 12 are interpolated without causing aliasing distortion and separated from each other without causing crosstalk therebetween, on condition that the channel response of SP signals are interpolated first in the n axis direction and then in the k axis direction on the k-n plane. In FIG. 4, a black dot represents a response of an SP signal transmitted from the first transmitting antenna 11, whereas a cross represents of an SP signal transmitted from the second transmitting antenna 12. In addition, a rectangular with a solid line represents the channel response related to the first transmitting antenna 11, whereas a rectangular with a broken line represents the channel response related to the second transmitting antenna 12.

From FIG. 4, it is known that a rectangular region having a width of Tu/3 in the $\tau$ axis direction and a width of $1/(8Ts)$ in the $f_D$ axis direction is what is hereinafter referred to as an "interpolatable & separable region". In the interpolatable & separable region, the channel response related to the first transmitting antenna 11 and the channel response related to the second transmitting antenna 12 are interoperated without causing aliasing distortion and separated from each other without causing crosstalk.

Figure 22:
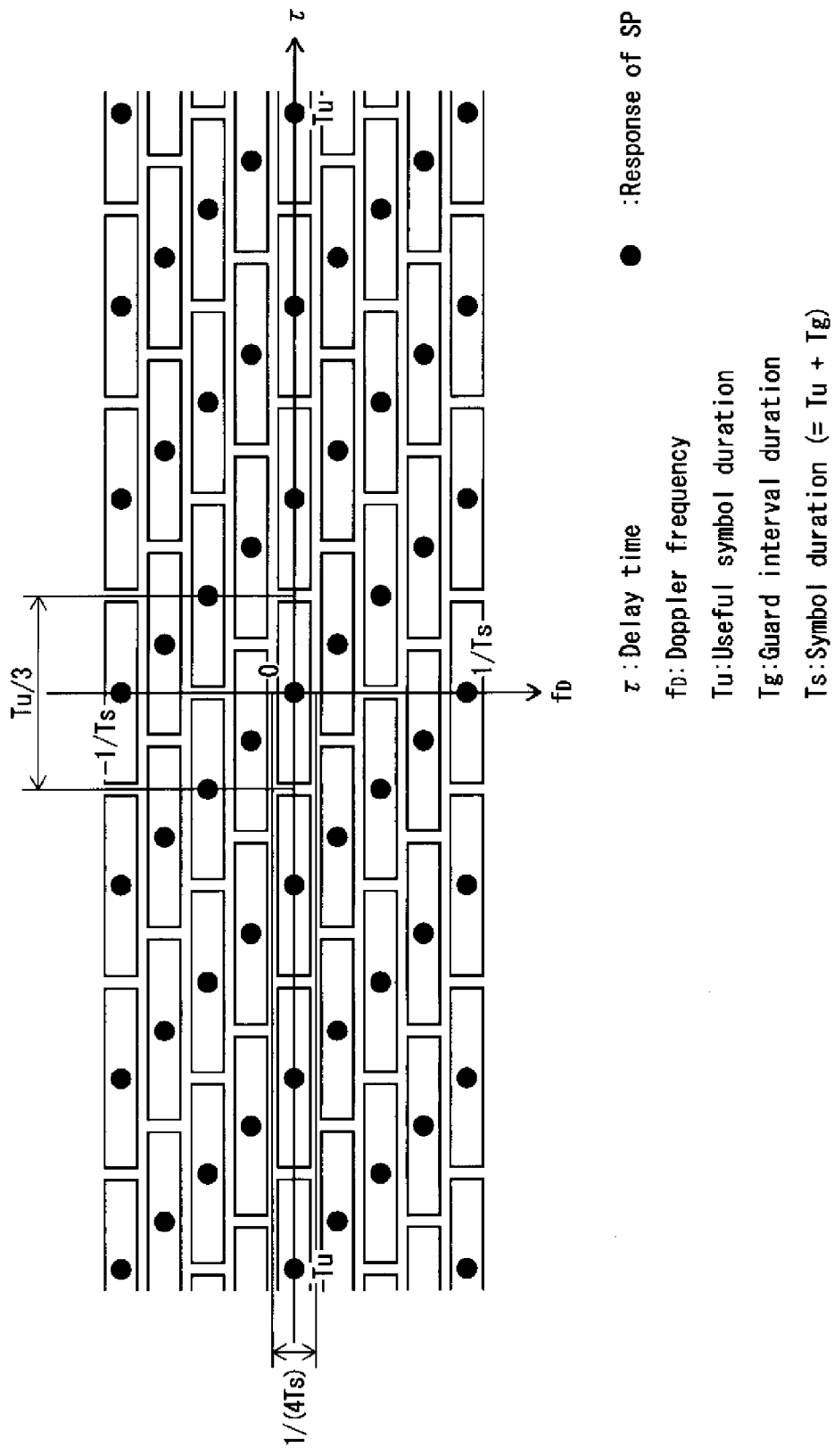
FIG. 22 is a schematic view showing a region in which the channel responses are separated and estimated, on condition that SP signals arranged the pattern shown in FIG. 17 are used.

From a comparison of FIG. 4 with FIG. 22, the following is noted on condition that SP signals transmitted from the first transmitting antenna 11 are arranged in the pattern shown in FIG. 17 and that SP signals transmitted from the second transmitting antenna 12 are arranged in the pattern shown in FIG. 2. Here, the width of the interpolatable & separable region in the $\tau$ axis direction is Tu/3, which is equal to the width of the interpolatable region in the $\tau$ axis direction shown in FIG. 17. As mentioned above, the interpolatable region shown in FIG. 17 is a region in which the channel response of SP signals are transmitted from a single transmitting antenna is interoperated without causing aliasing distortion. As described above, the width in the $\tau$ axis direction in which correct estimation of both the channel responses related to the first and second transmitting antennas 11 and 12 is ensured is set so as not to impair the tolerance to multi-path delay provided by insertion of guard interval durations.

Figure 5:
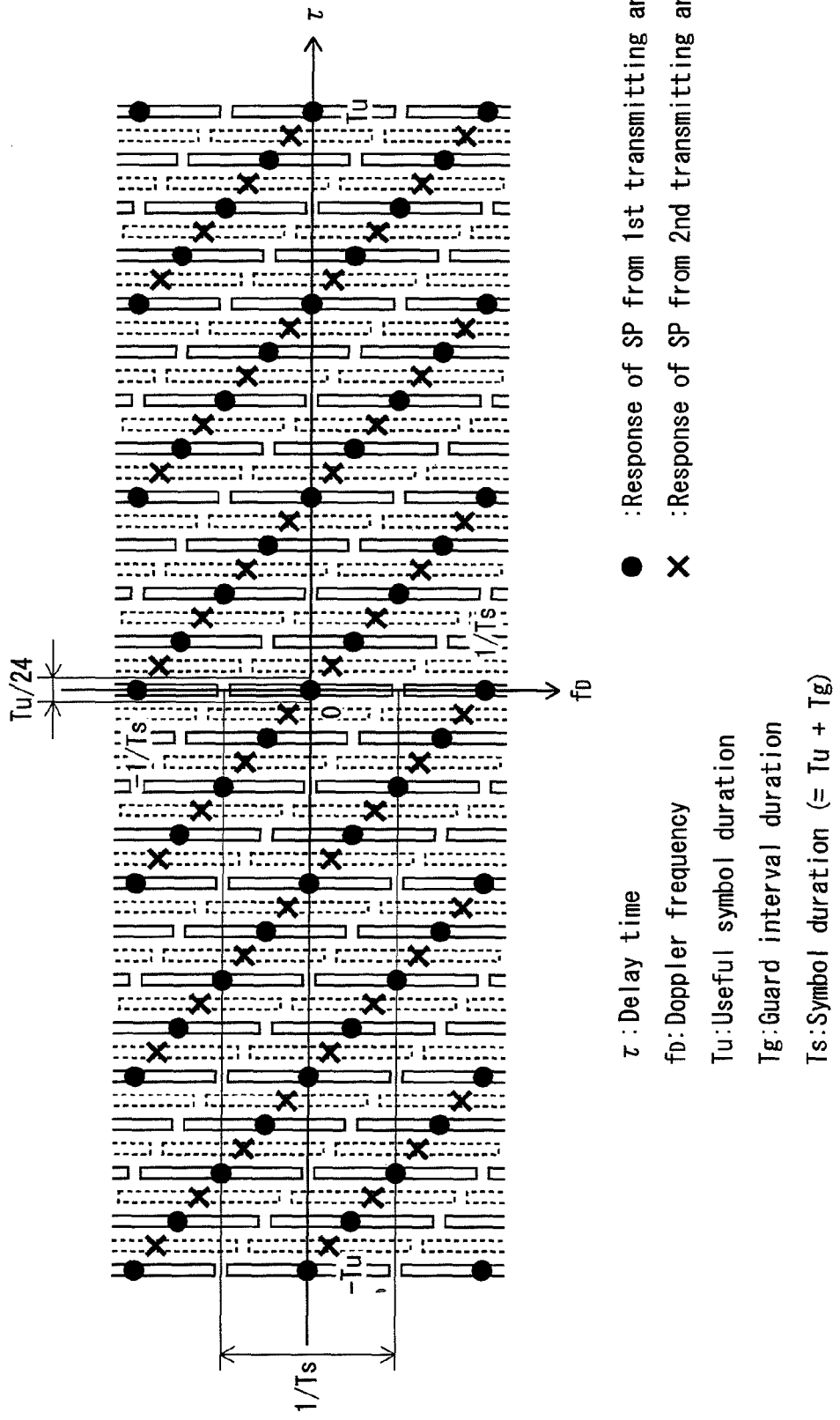
FIG. 5 is another schematic view showing a region in which the channel responses are separated and estimated, on condition that SP signals arranged the patterns shown in FIGS. 17 and 2 are used.

FIG. 5 shows a region of the $\tau$-$f_D$ plane in which the channel response related to the first transmitting antenna 11 and the channel response related to the second transmitting antenna 12 are interpolated without causing aliasing distortion and separated from each other without causing crosstalk therebetween, on condition that the channel response of SP signals are interpolated only in the k axis direction and not in the n axis direction on the k-n plane. In FIG. 5, a black dot represents a response of an SP signal transmitted from the first transmitting antenna 11, whereas a cross represents a response of an SP signal transmitted from the second transmitting antenna 12. In addition, a rectangular with a solid line represents the channel response related to the first transmitting antenna 11, whereas a rectangular with a broken line represents the channel response related to the second transmitting antenna 12.

From FIG. 5, it is known that a rectangular region having a width of Tu/24 in the τ axis direction and a width of 1/Ts in the $f_D$ axis direction is what is hereinafter referred to as an "interpolatable & separable region". In the interpolatable & separable region, the channel response related to the first transmitting antenna 11 and the channel response related to the second transmitting antenna 12 are interoperated without causing aliasing distortion and separated from each other without causing crosstalk therebetween.

Figure 23:
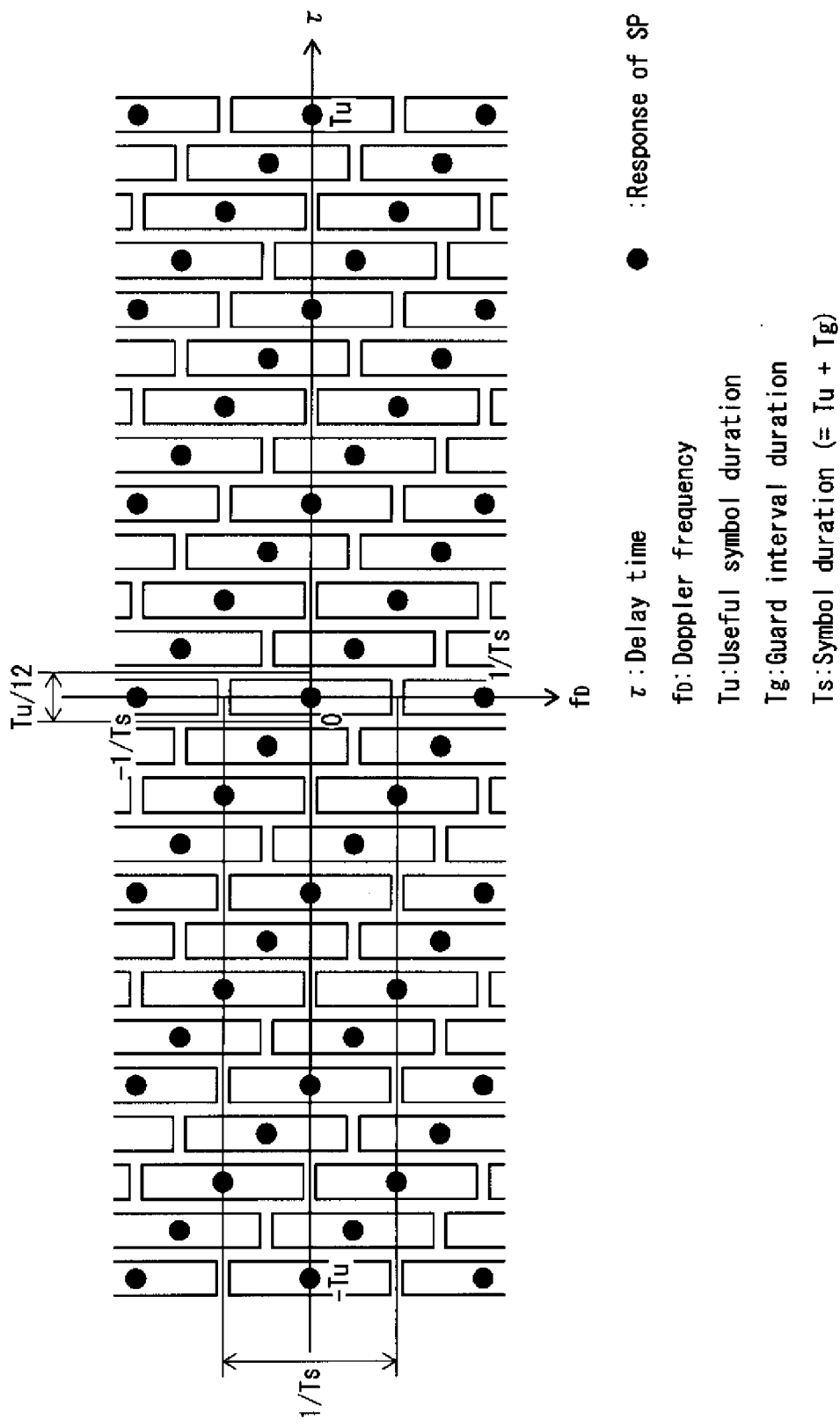
FIG. 23 is another schematic view showing a region in which the channel responses are separated and estimated, on condition that SP signals arranged the pattern shown in FIG. 17 are used.

From a comparison of FIG. 5 with FIG. 23, the following is noted on condition that SP signals transmitted from the first transmitting antenna 11 are arranged in the pattern shown in FIG. 17 and that SP signals transmitted from the second transmitting antenna 12 are arranged in the pattern shown in FIG. 2. Here, the width of the interpolatable & separable region in the $f_D$ axis direction is 1/Ts, which is equal to the width of the interpolatable region in the $f_D$ axis direction shown in FIG. 17. As mentioned above, the interpolatable region shown in FIG. 17 is a region in which the channel response of SP signals transmitted from a single transmitting antenna is interoperated without causing aliasing distortion. That is, the $f_D$ axis-direction width of a region in which correct estimation is ensured for both the channel response related to the first transmitting antenna 11 and the channel response related to the second transmitting antenna 12 is not impaired at all. In other words, the ability of following the channel's time variability is not impaired.

Figure 24:
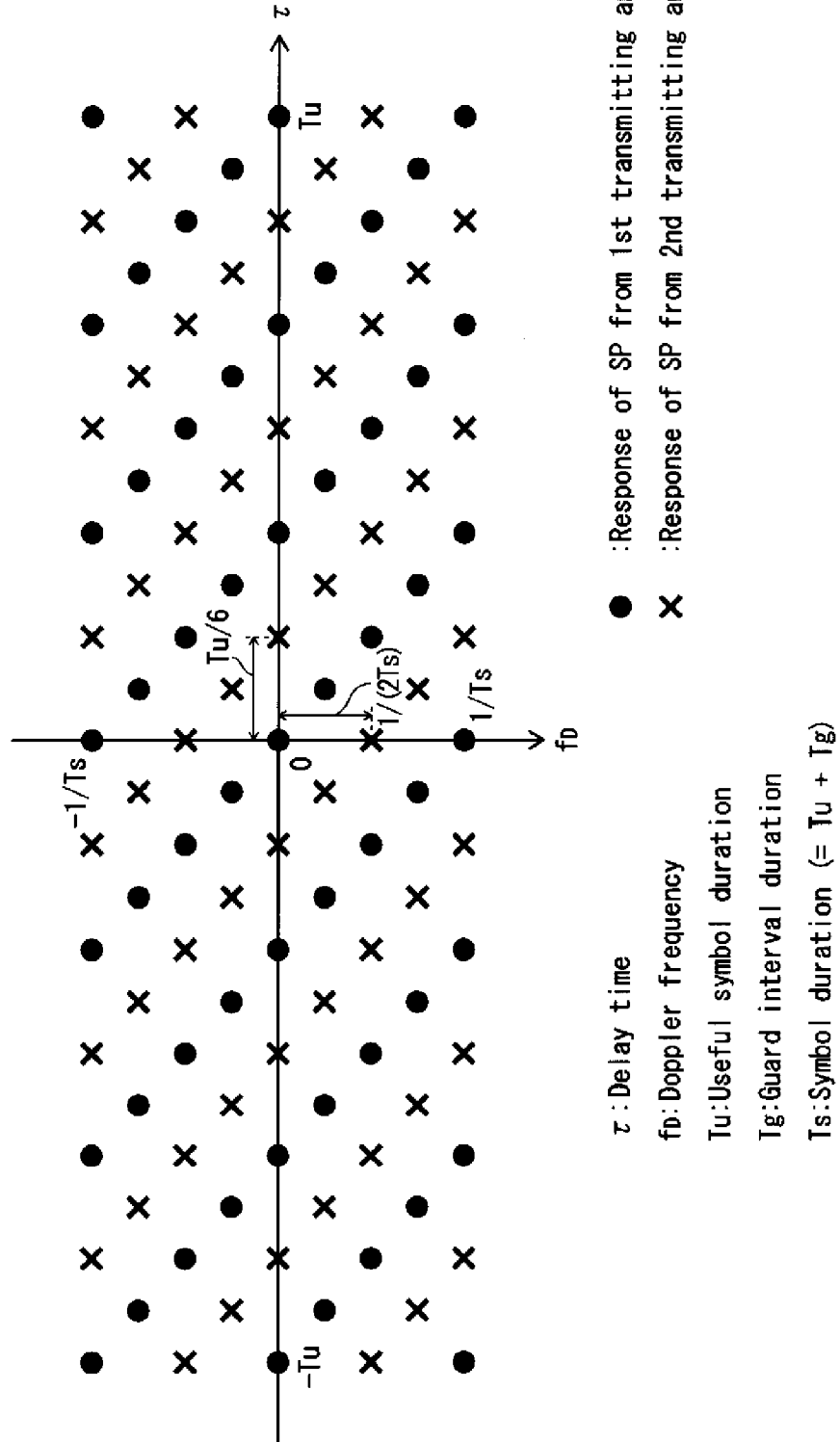
FIG. 24 is a schematic view showing, on a $\tau$-$f_D$ plane, responses of SP signals transmitted from a first transmitting antenna and a second transmitting antenna according to a conventional technique.

Further, FIG. 24 and FIG. 3 are compared.

In FIG. 24, the responses appearing at the same Doppler frequency are a mixture of the responses of SP signals transmitted from the first transmitting antenna and the responses of SP signals transmitted from the second transmitting antenna. Therefore, the impulse responses of the respective channels share the same region in the τ axis direction. Also, the responses appearing at the same delay time are a mixture of the responses of SP signals transmitted from the first transmitting antenna and the responses of SP signals transmitted from the second transmitting antenna. Therefore, the Doppler spectrums of the respective channels share the same region in the $f_D$ axis direction.

In FIG. 3, in contrast, the responses appearing at the same Doppler frequency are exclusively of the responses of SP signals transmitted from either of the first transmitting antenna 11 and the second transmitting antenna 12. Therefore, the impulse responses of the respective channels are allowed to occupy mutually different regions in the τ axis direction. Also, the responses appearing at the same delay time are exclusively of the responses of SP signals transmitted from either of the first transmitting antenna 11 and the second transmitting antenna 12. Therefore, the Doppler spectrums of the respective channels are allowed to occupy mutually different regions in the $f_D$ axis direction.

The difference noted above is derived from the difference in the shift direction and shift amount of SP signals on the τ-$f_D$ plane, in other words from the difference in the direction and frequency of the equi-phase lines of SP signals on the k-n plane.

Figure 20:
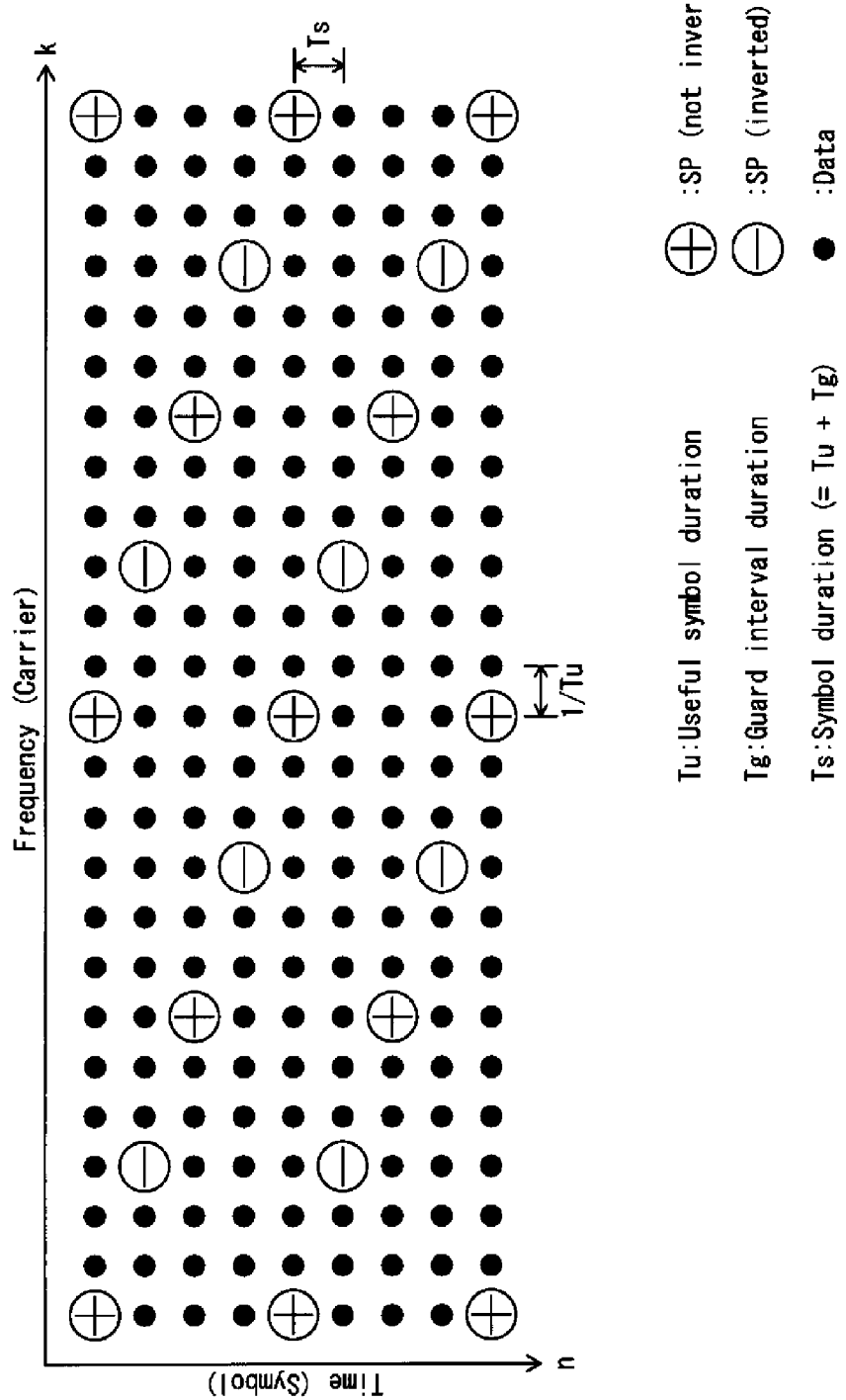
FIG. 20 is a schematic view showing the arrangement pattern and polarity reversal of SP signals transmitted from a second transmitting antenna 12 according to a conventional technique.
Figure 21:
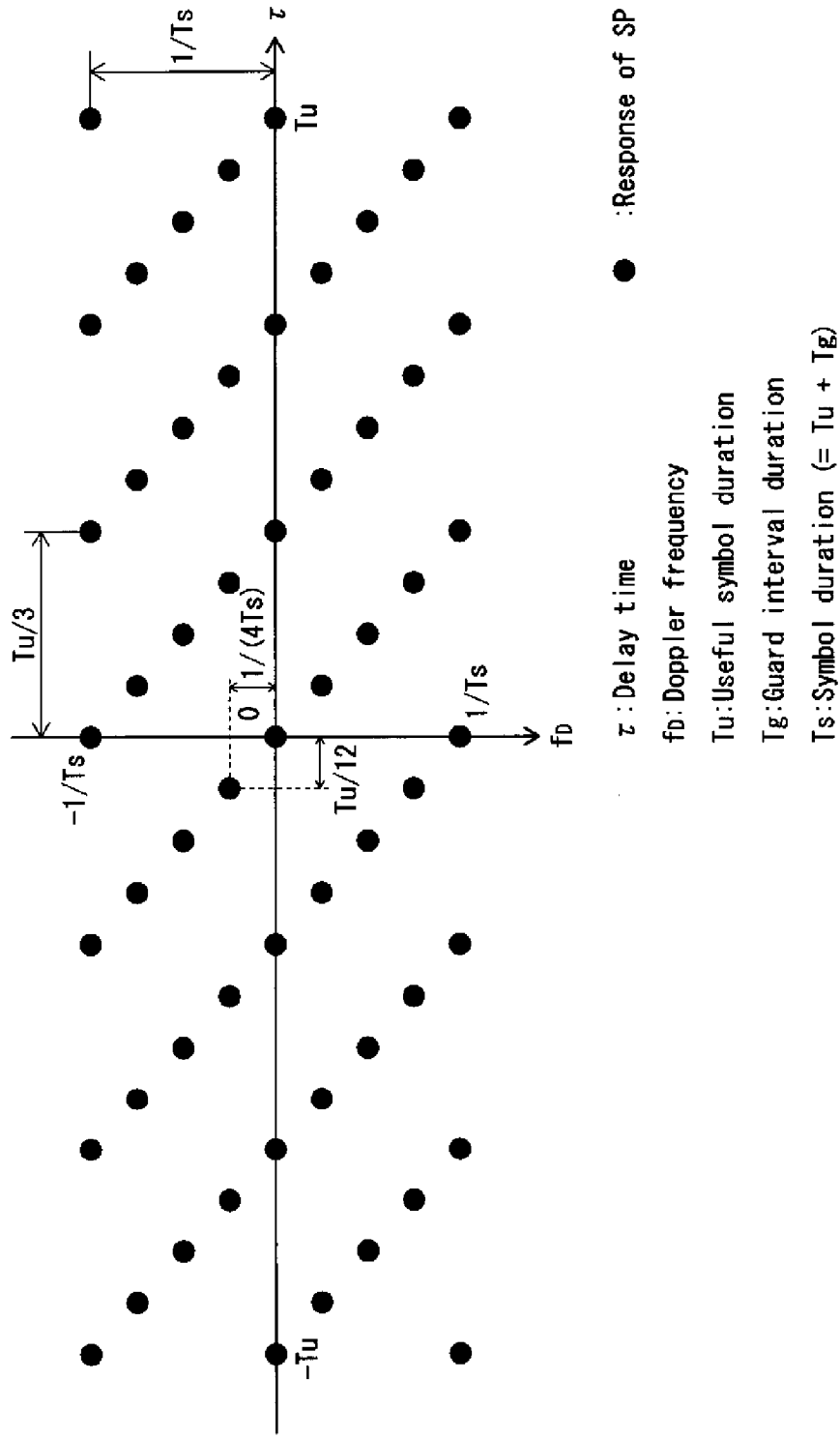
FIG. 21 is a schematic view showing, on a $\tau$-$f_D$ plane, SP signals arranged in the pattern shown in FIG. 17.

As described above, according to the present embodiment that uses the two SP signal arrangements shown in FIGS. 17 and 2, the interpolatable & separable region is extended widthwise in the τ or $f_D$ axis direction, as compared with the interpolatable & separable region in the conventional case where the two SP signal arrangements shown in FIGS. 17 and 20 are used. As described above, the interpolatable & separable region refers to a region in which the channel response related to the first transmitting antenna 11 and the channel response related to the second transmitting antenna 12 are interpolated without causing aliasing distortion and separated from each other without causing crosstalk therebetween.

<Structure of Transmitter 10>

Figure 6:
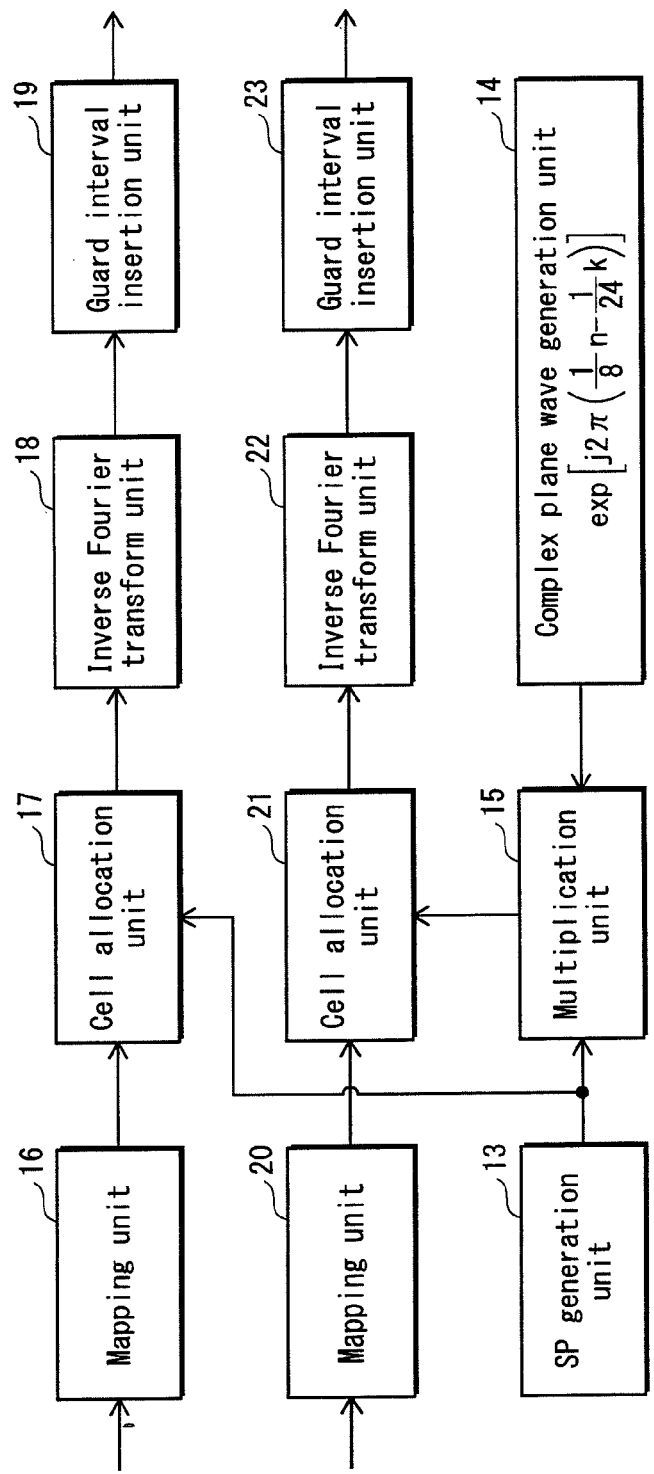
FIG. 6 is a diagram showing the structure of a transmitter 10 shown in FIG. 1.

With reference to FIG. 6, the following describes the structure of the transmitter 10 shown in FIG. 1. FIG. 6 is a diagram showing the structure of the transmitter 10 shown in FIG. 1.

As described above, the transmitter 10 has the first transmitting antenna 11 and the second transmitting antenna 12. Additionally, the transmitter 10 has an SP generation unit 13, a complex plane wave generation unit 14, a multiplication unit 15, a mapping unit 16, a cell allocation unit 17, an inverse Fourier transform unit 18, a guard interval insertion unit 19, a mapping unit 20, a cell allocation unit 21, an inverse Fourier transform unit 22, and a guard interval insertion unit 23.

[SP Generation Unit 13]

The SP generation unit 13 generates SP signals modulated based on the pseudo-random binary sequence $w_k$. The SP generation unit 13 outputs the generated SP signals to the cell allocation unit 17 and also to the multiplication unit 15. The SP signals output to the cell allocation unit 17 are used as SP signals to be transmitted from the first transmitting antenna 11. The amplitude and phase of each SP signal is determined only by the carrier number k of the cell to which the SP signal is allocated and thus independently of the symbol number n.

[Complex Plane Wave Generation Unit 14]

The complex plane wave generation unit 14 generates a complex plane wave expressed by Equation 16 below and outputs the generated complex plane wave to the multiplication unit 15.

$$\exp\left[j2\pi\left(\frac{1}{8}n - \frac{1}{24}k\right)\right] \quad \text{[Equation 16]}$$

In Equation 16, n represents the symbol number and k represents the carrier number.

[Multiplication Unit 15]

The multiplication unit 15 multiplies an SP signal received from the SP generation unit 13 by the complex plane wave received from the complex plane wave generation unit 14 and outputs the result of the multiplication to the cell allocation unit 21 where the result of the multiplication is used as an SP signal to be transmitted from the second transmitting antenna 12. Note that the process of the multiplication performed by the multiplication unit 15 is equivalent to the process of shifting the SP signal received from the SP generation unit 13, by Tu/24 in the τ axis direction and by 1/(8Ts) in the $f_D$ axis direction on the τ-$f_D$ plane. It goes without saying that an SP signal and a complex plane wave used in a multiplication of that SP signal are of a pair having the same symbol number and the same carrier number.

[Mapping Unit 16]

The mapping unit 16 receives data on which a predetermined process has been conducted. The mapping unit 16 maps data composed of a predetermined number of bits at a predetermined bit unit onto a predetermined constellation and outputs data resulting from the mapping to the cell allocation unit 17.

Note that the mapping units 16 and 20 may use any of various types of constellations, such as constellations for PSK (Phase Shift Keying), QAM (Quadrature Amplitude Modulation), and APSK (Amplitude Phase Shift Keying).

[Cell Allocation Unit 17]

The cell allocation unit 17 allocates SP signals input from the SP generation unit 13 (i.e., SP signals transmitted from the first transmitting antenna 11) to cells specified by Equation 1 mentioned above, and allocates data input from the mapping unit 16 to the other cells. As a result of the allocation in this manner, the cell allocation unit 17 constitutes frames and output a frame signal relating to the frames to the inverse Fourier transform unit 18.

[Inverse Fourier Transform Unit 18]

The inverse Fourier transform unit 18 applies, symbol by symbol, the inverse Fourier transform to the modulated symbols (i.e., data output from the mapping unit 16 and SP signals output from the SP generation unit 13) allocated to the cells corresponding to the carriers included in the frame signal input from the cell allocation unit 17, thereby to carry out the OFDM modulation. As a result of the OFDM modulation, the inverse Fourier transform unit 18 generates a modulated signal having a useful symbol duration Tu into which multiple mutually orthogonal carriers are modulated and multiplexed. The modulated signal having the useful symbol duration Tu is then output to the guard interval insertion unit 19.

[Guard Interval Insertion Unit 19]

The guard interval insertion unit 19 generates a signal having a guard interval duration Tg (hereinafter, the signal is referred to as "guard interval signal"), based on the modulated signal of the useful symbol duration Tu input from the inverse Fourier transform unit 18. The guard interval insertion unit 19 then inserts the guard interval signal to the modulated signal having the useful symbol duration Tu and outputs the resulting modulated signal (hereinafter, referred to as "OFDM signal"). The OFDM signal output from the guard interval insertion unit 19 is subjected to predetermined processes, including digital-to-analog conversion, frequency conversion to the transmission band, and amplification, and then transmitted as the first transmission signal from the first transmitting antenna 11.

Note that each guard interval signal inserted to the modulated signal by the guard interval insertion units 19 and 23 corresponds to a guard interval part of a signal obtained by cyclically and continually repeating a modulated signal of the useful symbol duration Tu. In one specific example given for the purpose of description, the guard interval signal is a signal having the duration Tg and identical to a latter part of the modulation signal of the useful symbol duration Tu. Alternatively, the guard interval signal may be a signal modulated based on a predetermined pseudo-random binary sequence or a zero-amplitude signal.

[Mapping Unit 20]

The mapping unit 20 receives data on which a predetermined process has been conducted. The mapping unit 20 maps data composed of a predetermined number of bits at a predetermined bit unit onto a predetermined constellation and outputs data resulting from the mapping to the cell allocation unit 21.

[Cell Allocation Unit 21]

The cell allocation unit 21 allocates the multiplication result input from the multiplication unit 15 (i.e., an SP signal transmitted from the second transmitting antenna 12) to cells specified by Equation 1 mentioned above, and data input from the mapping unit 20 to the other cells. As a result of the allocation in this manner, the cell allocation unit 21 constitutes frames and output a frame signal relating to the frames to the inverse Fourier transform unit 22.

[Inverse Fourier Transform Unit 22]

The inverse Fourier transform unit 22 applies, symbol by symbol, the inverse Fourier transform to the modulated symbols (i.e., data output from the mapping unit 20 and the multiplication result output from the multiplication unit 15) allocated to the cells corresponding to the carriers included in the frame signal input from the cell allocation unit 21, thereby to carry out the OFDM modulation. As a result of the OFDM modulation, the inverse Fourier transform unit 22 generates a modulated signal having a useful symbol duration Tu into which multiple mutually orthogonal carriers are modulated and multiplexed. The modulated signal having the useful symbol duration Tu is then output to the guard interval insertion unit 23.

[Guard Interval Insertion Unit 23]

The guard interval insertion unit 23 generates a signal having a guard interval duration Tg (hereinafter, the signal is referred to as "guard interval signal"), based on the modulated signal having the useful symbol duration Tu input from the inverse Fourier transform unit 22. The guard interval insertion unit 23 then inserts the guard interval signal to the modulated signal having the useful symbol duration Tu and outputs the resulting modulated signal (hereinafter, referred to as "OFDM signal"). The OFDM signal output from the guard interval insertion unit 23 is subjected to predetermined processes, including digital-to-analog conversion, frequency conversion to the transmission band, and amplification, and then transmitted as the second transmission signal from the second transmitting antenna 12 as the second transmission signal.

<Operations of Transmitter 10>

With reference to FIG. 6, the following describes operations of the transmitter having the structure described above.

The SP generation unit 13 generates SP signals and outputs the generated SP signals to the cell allocation unit 17 and also to the multiplication unit 15. The SP signals output to the cell allocation unit 17 are used as SP signals to be transmitted from the first transmitting antenna 11. In addition, the complex plane wave generation unit 14 generates the complex plane wave expressed by Equation 16 and outputs the generated complex plane wave to the multiplication unit 15. The multiplication unit 15 multiplies each SP signal received from the SP generation unit 13 by the complex plane wave received from the complex plane wave generation unit 14 and outputs the result of the multiplication to the cell allocation unit 21 where the received multiplication result is used as an SP signal to be transmitted from the second transmitting antenna 12.

The mapping unit 16 conducts the mapping process on the input data and outputs the mapped data to the cell allocation unit 17. The cell allocation unit 17 organizes frames by allocating SP signals input from the SP generation unit 13 (i.e., an SP signal to be transmitted from the first transmitting antenna 11) as well as data input from the mapping unit 16 to cells constituting the frames. The cell allocation unit 17 then outputs a frame signal relating to the frames to the inverse Fourier transform unit 18. The inverse Fourier transform unit 18 applies the inverse Fourier transform symbol by symbol to the frame signal received from the cell allocation unit 17, thereby generating a modulated signal of each useful symbol duration Tu. The guard interval insertion unit 19 inserts a signal of the guard interval duration Tg (guard interval signal) to the modulated signal of each useful symbol duration Tu to generate a modulated signal (OFDM signal) in which the symbol duration Tu and the guard interval signal repeatedly appear.

The guard interval insertion unit 19 then outputs the OFDM signal, which is then subjected to a predetermined process and transmitted from the first transmitting antenna 11 as the first transmission signal.

In parallel with the above processing, the following processing is also performed.

The mapping unit 20 conducts a mapping process on the input data and outputs the mapped data to the cell allocation unit 21. The cell allocation unit 21 organizes frames by allocating SP signals input from the SP generation unit 15 (i.e., an SP signal transmitted from the second transmitting antenna 12) as well as data input from the mapping unit 20 to cells constituting the frame. The cell allocation unit 20 outputs a frame signal relating to the frames to the inverse Fourier transform unit 22. The inverse Fourier transform unit 22 applies the inverse Fourier transform symbol by symbol to the frame signal received from the cell allocation unit 21, thereby generating a modulated signal of each useful symbol duration Tu. The guard interval insertion unit 23 inserts a signal of a guard interval duration Tg (guard interval signal) to the modulated signal of each useful symbol duration Tu to generate a modulated signal (OFDM signal) in which the symbol duration Tu and the guard interval signal repeatedly appear. The guard interval insertion unit 23 then outputs the OFDM signal, which is then subjected to a predetermine process and transmitted from the second transmitting antenna 12 as the second transmission signal. Note that the second transmission signal is output in synchronism with the first transmission signal to ensure that cells having the same symbol number and the same carrier number of the two transmission signals are simultaneously transmitted.

<Structure of Receiver 30>

Figure 7:
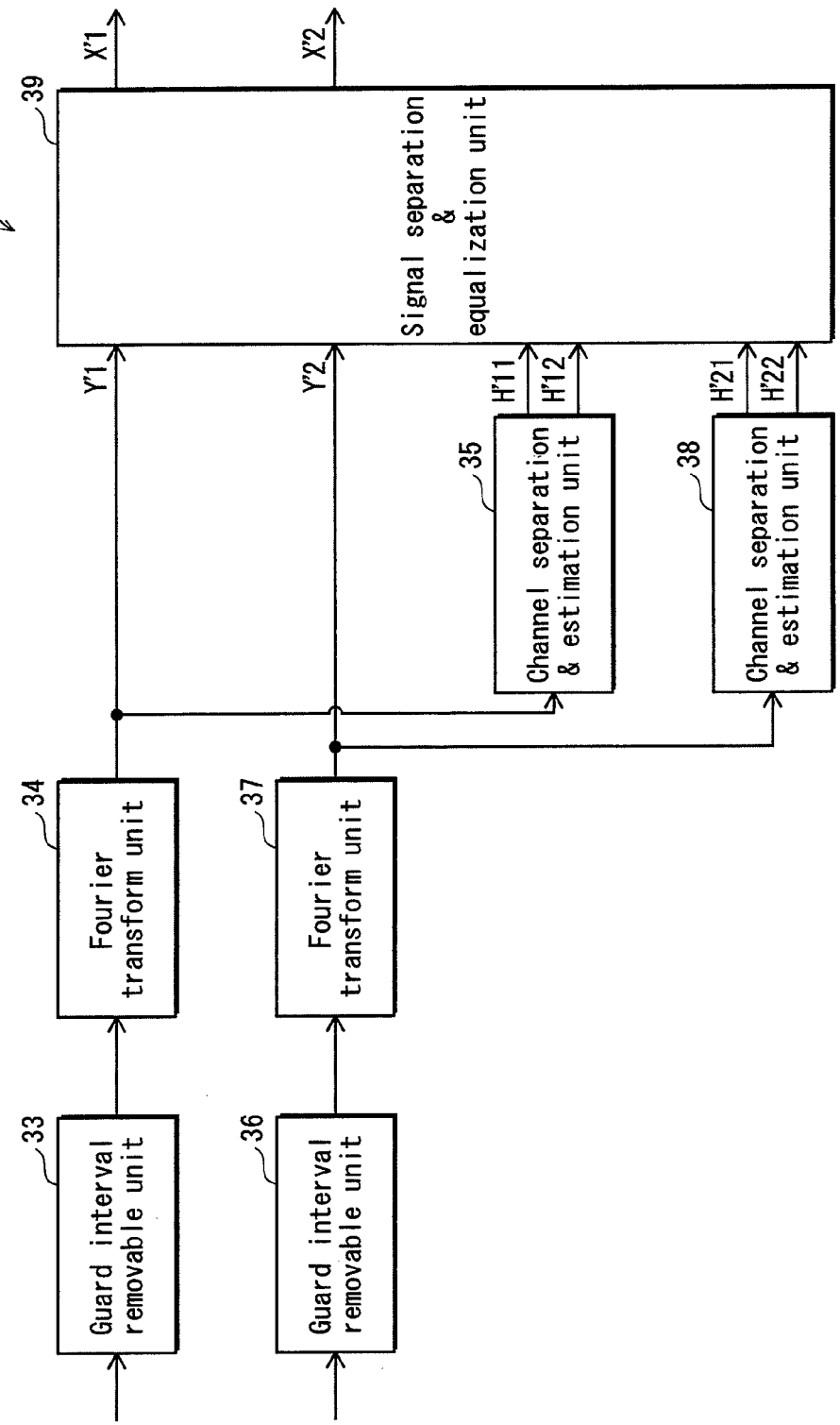
FIG. 7 is a diagram showing the structure of a receiver 30 shown in FIG. 1.

With reference to FIG. 7, the following describes the structure of the receiver 30 shown in FIG. 1. FIG. 7 is a diagram showing the structure of the receiver 30 shown in FIG. 1.

As described above, the receiver 30 has the first receiving antenna 31 and the second receiving antenna 32. Additionally, the receiver 30 has a guard interval removable unit 33, a Fourier transform unit 34, a channel separation & estimation unit 35, a guard interval removable unit 36, a Fourier transform unit 37, a channel separation & estimation unit 38, and a signal separation & equalization unit 39.

[Guard Interval Removable Unit 33]

The first receiving antenna 31 receives a first reception signal from the transmitter 10. The first reception signal is a mixed signal of the first transmission signal (OFDM signal) transmitted from the first transmitting antenna 11 and the second transmission signal (OFDM signal) transmitted from the second transmitting antenna 12. The first reception signal received with the first receiving antenna 31 is subjected to a predetermined process and then input to the guard interval removable unit 33.

The guard interval removable unit 33 removes the guard interval durations from the received first reception signal and outputs the first reception signal remaining after the removable of the guard interval durations to the Fourier transform unit

[Fourier Transform Unit 34]

The Fourier transform unit 34 receives the first reception signal from the guard interval removable unit 33. The Fourier transform unit 34 applies the Fourier transform to each signal part carrying a useful symbol duration Tu thereby to carry out the OFDM demodulation (frequency separation) and outputs the first reception signal Y'1($n$, $k$) obtained as a result of the OFDM demodulation to the signal separation & equalization unit 39 and also to channel separation & estimation unit 35.

[Channel Separation & Estimation Unit 35]

The channel separation & estimation unit 35 separates and estimates the channel response H'11($n$, $k$) of the channel P11 and the channel response H'12($n$, $k$) of the channel P12, with the use of the first reception signal Y'1($n$, $k$) received from the Fourier transform unit 34. The channel separation & estimation unit 35 then outputs the channel responses H'11 (n, k) and H'12($n$, $k$) to the signal separation & equalization unit 39.

[Guard Interval Removable Unit 36]

The second receiving antenna 32 receives a second reception signal from transmitter 10. The second reception signal is a mixed signal of the first and second transmission signals transmitted from the first and second transmitting antennas 11 and 12 of the transmitter 10, respectively. The second reception signal received with the second receiving antenna 32 is subjected to a predetermined process and then input to the guard interval removable unit 36.

The guard interval removable unit 36 removes guard interval durations from the received second reception signal and outputs the second reception signal remaining after the removable of guard interval durations to the Fourier transform unit 37.

[Fourier Transform Unit 37]

The Fourier transform unit 37 receives the second reception signal from the guard interval removable unit 36. The Fourier transform unit 37 applies the Fourier transform to each signal part carrying a useful symbol duration Tu thereby to carry out the OFDM demodulation. The Fourier transform unit 37 then outputs the second reception signal Y' 2($n$, $k$) obtained as a result of the OFDM demodulation to the signal separation & equalization unit 39 and also to channel separation & estimation unit 38.

[Channel Separation & Estimation Unit 38]

The channel separation & estimation unit 38 separates and estimates a channel response H' 21($n$, $k$) of the channel P21 and the channel response H' 22($n$, $k$) of the channel P22 with the sue of the second reception signal Y' 2($n$, $k$) received from the Fourier transform unit 37. The channel separation & estimation unit 38 then transmits the estimated channel responses H' 21($n$, $k$) and H' 22($n$, $k$) to the signal separation & equalization unit 39.

[Signal Separation & Equalization unit 39]

The signal separation & equalization unit 39 receives the first reception signal Y' 1($n$, $k$) from the Fourier transform unit 34 and also receives the second reception signal Y' 2($n$, $k$) from the Fourier transform unit 37. In addition, the signal separation & equalization unit 39 receives the channel responses H' 11($n$, $k$) and H' 12($n$, $k$) from the channel separation & estimation unit 35 and also receives the channel response H' 21($n$, $k$) and H' 22($n$, $k$) from the channel separation & estimation unit 38.

The signal separation & equalization unit 39 computes Equation 17 shown below, with the first reception signal Y' 1 (n, k), the second reception signal Y' 2($n$, $k$), and the channel responses H' 11($n$, $k$), H' 12($n$, $k$), H' 21($n$, $k$), and H' 22($n$, $k$), thereby separating and equalizing the first transmission signal X' 1($n$, $k$) and the second transmission signal X' 2($n$, $k$). The signal separation & equalization unit 39 then outputs the first transmission signal X' 1($n$, $k$) and the second transmission signal X' 2($n$, $k$). In Equation 17, notation H represent a matrix and the notation [ ]$^{-1}$ represents the inverse matrix of [ ].

$$\begin{bmatrix} X'1(n,k) \\ X'2(n,k) \end{bmatrix} = \begin{bmatrix} H'11(n,k) & H'12(n,k) \\ H'21(n,k) & H'22(n,k) \end{bmatrix}^{-1} \begin{bmatrix} Y'1(n,k) \\ Y'2(n,k) \end{bmatrix} \quad \text{[Equation 17]}$$

<Structures of Channel Separation & Estimation Units 35 and 38>

Figure 8:
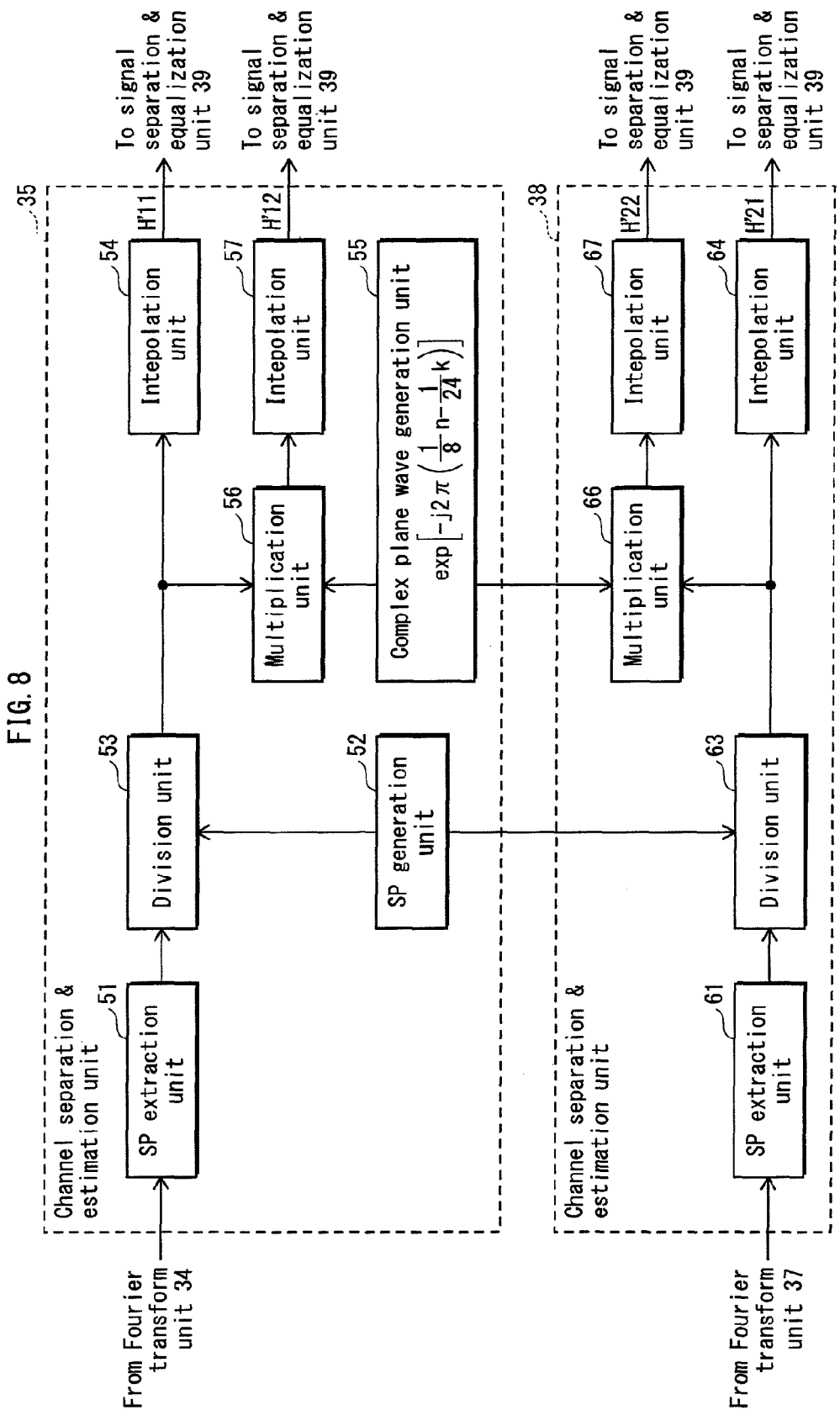
FIG. 8 is a diagram showing the structures of channel separation & estimation units 35 and 38 shown in FIG. 7.

The following describes the details of the channel separation & estimation units 35 and 38 shown in FIG. 7, with reference to FIG. 8. FIG. 8 is a diagram showing the structures of the channel separation & estimation units 35 and 38 shown in FIG. 7.

[Channel Separation & Estimation Unit 35]

The channel separation & estimation unit 35 includes an SP extraction unit 51, an SP generation unit 52, a division unit 53, an interpolation unit 54, a complex plane wave generation unit 55, a multiplication unit 56, and an interpolation unit 57.

(SP Extraction Unit 51)

With the use of Equation 1 described above, the SP extraction unit 51 extracts a first reception SP signal Y' 1 (n, $k_{SP}(n)$) from the first reception signal Y' 1(n, k) that is received from the Fourier transform unit 34. The SP extraction unit 51 then outputs the extracted first reception SP signal Y' 1 (n, $k_{SP}(n)$) to the division unit 53.

(SP Generation Unit 52)

The SP generation unit 52 generates a nominal SP signal Y (n, $k_{SP}(n)$), which is identical to the SP signal generated by the SP generation unit 13 of the transmitter 10. The SP generation unit 52 then outputs the generated nominal SP signal Y (n, $k_{SP}(n)$) to the division unit 53 and also to a later-described division unit 63, which is included in the channel separation & estimation unit 38.

(Division Unit 53)

The division unit 53 multiples the first reception SP signal Y' 1 (n, $k_{SP}(n)$) by the SP signal Y (n, $k_{SP}(n)$) and outputs the division result (hereinafter referred to as the "first mixed channel response") to the interpolation unit 54 and the multiplication unit 56.

(Interpolation Unit 54)

The interpolation unit 54 is provided with a low-pass filter. With the use of the low-pass filter, the interpolation unit 54 removes the channel response related to the second transmitting antenna 12 from the first mixed channel response that is received from the division unit 53, and interpolates the channel response related to the first transmitting antenna 11 on the k-n plane. In this way, the channel response H' 11(n, k) at every cell is estimated. Then, the interpolation unit 54 outputs the estimated channel response H' 11(n, k) to the signal separation & equalization unit 39. Note that the low-pass filter included in the interpolation unit 54 may be, for example, a low-pass filter having a transfer function from –Tu/6 to Tu/6 in the T axis direction and from –1/(16Ts) to 1/(16Ts) in the $f_D$ axis in the direction (see FIG. 4) or a low-pass filter with having a transfer function from –Tu/48 to Tu/48 in the τ axis direction and from –1/(2Ts) to 1/(2Ts) in the $f_D$ axis in the direction (see FIG. 5). In practice, it is desirable to employ a low-path filter having a bandwidth determined in a manner of allowing for margin of error expected in practical filters.

(Complex Plane Wave Generation Unit 55)

The complex plane wave generation unit 55 generates a complex plane wave expressed by Equation 18 shown below and outputs the generated complex plane wave to the multiplication unit 56 and a later-described multiplication unit 66 of the channel separation & estimation unit 38.

$$\exp\left[-j2\pi\left(\frac{1}{8}n - \frac{1}{24}k\right)\right] \quad \text{[Equation 18]}$$

Note in Equation 18, n represents the symbol number and k represents the carrier number.

(Multiplication Unit 56)

The multiplication unit 56 multiplies the division result received from the division unit 53 (the first mixed channel response) by the complex plane wave received from the complex plane wave generation unit 55 and outputs the result to the multiplication (hereinafter referred to as the "first shifted-and-mixed channel response") to the interpolation unit 57. Note that the multiplication performed by the multiplication unit 56 is equivalent to the process of shifting the first mixed channel response by –Tu/24 in the τ axis direction and by –1/(8Ts) in the $f_D$ axis direction on the τ-$f_D$ plane. It goes without saying that an SP signal and a complex plane wave used in a multiplication of that SP signal are of a pair having the same symbol number and the same carrier number.

(Interpolation Unit 57)

The interpolation unit 57 is provided with a low-pass filter. With the use of the low-pass filter, the interpolation unit 57 removes the channel response related to the first transmitting antenna 11 from the first shifted-and-mixed channel response that is received from the multiplication unit 56, and interpolates the channel response related to the second transmitting antenna 12 on the k-n plane. In this way, the channel response H'12(n, k) at every cell is estimated. Then, the interpolation unit 57 outputs the estimated channel response H' 12(n, k) to the signal separation & equalization unit 39. Note that the low-pass filter included in the interpolation unit 57 may be, for example, a low-pass filter having the same a transfer function as that of the low-pass filter included in the interpolation unit 54.

[Channel Separation & Estimation Unit 38]

The channel separation & estimation unit 38 includes an SP extraction unit 61, the division unit 63, an interpolation unit 64, the multiplication unit 66, and an interpolation unit 67. Note that the channel separation & estimation unit 38 may additionally include components equivalent to the SP generation unit 52 and the complex plane wave generation unit 55.

(SP Extraction Unit 61)

With the use of Equation 1 described above, the SP extraction unit 61 extracts a second reception SP signal Y'2 (n, $k_{SP}(n)$) from the second reception signal Y' 2(n, k) that is received from the Fourier transform unit 37. The SP extraction unit 61 then outputs the second reception SP signal Y' 2 (n, $k_{SP}(n)$) to the division unit 63.

(Division Unit 63)

The division unit 63 multiples the second reception SP signal Y' 2 (n, $k_{SP}(n)$) by the SP signal Y (n, $k_{SP}(n)$) and outputs the division result (hereinafter referred to as the "second mixed channel response") to the interpolation unit 64 and the multiplication unit 66.

(Interpolation Unit 64)

The interpolation unit 64 is provided with a low-pass filter. With the use of the low-pass filter, the interpolation unit 64 removes the channel response related to the second transmitting antenna 12 from the second mixed channel response that is received from the division unit 63, and interpolates the channel response related to the first transmitting antenna 11 on the k-n plane. In this way, the channel response H' 12(n, k) at every cell is estimated. Then, the interpolation unit 64 outputs the estimated channel response H' 12(n, k) to the signal separation & equalization unit 39. Note that the low-pass filter included in the interpolation unit 64 may be, for example, a low-pass filter having the same a transfer function as that of the low-pass filter included in the interpolation unit 54.

(Multiplication Unit 66)

The multiplication unit 66 multiples the division result (the second mixed channel response) received from the division unit 63, by the complex plane wave received from the complex plane wave generation unit 55 and outputs the result of the multiplication (hereinafter referred to as the "second shifted-and-mixed channel response") to the interpolation unit 67. Note that the multiplication performed by the multiplication unit 66 is equivalent to the process of shifting the second mixed channel response by $-Tu/24$ in the $\tau$ axis direction and $-1/(8Ts)$ in the $f_D$ axis direction on the $\tau$-$f_D$ plane. It goes without saying that a second mixed channel response and a complex plane wave used in a multiplication of that second mixed channel response are of a pair having the same symbol number and the same carrier number.

(Interpolation Unit 67)

The interpolation unit 67 is provided with a low-pass filter. With the use of the low-pass filter, the interpolation unit 67 removes the channel response related to the first transmitting antenna 11 from the second shifted-and-mixed channel response that is received from the multiplication unit 66 and interpolates the channel response related to the second transmitting antenna 12 on the k-n plane. In this way, the channel response H' 22 (n, k) at every cell is estimated. Then, the interpolation unit 67 outputs the estimated channel response H' 22($n, k$) to the signal separation & equalization unit 39. Note that the low-pass filter included in the interpolation unit 67 may be, for example, a low-pass filter having the same a transfer function as that of the low-pass filter included in the interpolation unit 54.

<Operations of Receiver 30>

The following describes operations of the receiver having the above-described structure, with reference to FIGS. 7 and 8.

The first reception signal received with the first receiving antenna 31 is subjected to the predetermine process and then input to the guard interval removable unit 33 where guard interval durations are removed. After the guard interval removable by the guard interval removable unit 33, the first reception signal is input to the Fourier transform unit 34 where the Fourier transform is applied symbol by symbol to the first reception signal from which guard interval durations have been removed. As a result, each signal part carrying a useful symbol duration Tu is converted into the first reception signal Y'1($n, k$) and the first reception signal Y'1($n, k$) is output to the signal separation & equalization unit 39 and also to the channel separation & estimation unit 35.

In the channel separation & estimation unit 35, a nominal SP signal Y(n, $k_{SP}$(n)) is generated by the SP generation unit 52, and a complex plane wave expressed by Equation 18 described above is generated by the complex plane wave generation unit 55.

The SP extraction unit 51 extracts the first reception SP signal Y'1 (n, $k_{SP}$(n)) from the first reception signal Y'1 (n, k) received from the Fourier transform unit 34 and outputs the extracted first reception SP signal Y' 1 (n, $k_{SP}$(n)) to the division unit 53. The division unit 53 divides the first reception SP signal Y'1 (n, $k_{SP}$(n)) received from the SP extraction unit 51, by the SP signal Y(n, $k_{SP}$(n)) generated by the SP generation unit 52. The division result (the first mixed channel response) is output to the interpolation unit 54 and the multiplication unit 56.

The interpolation unit 54 conducts the above-described process on the first mixed channel response received from the division unit 53, thereby estimating the channel response H' 11 (n, k) to all the cells and outputs the estimated channel response H'11($n, k$) to the signal separation & equalization unit 39.

The multiplication unit 56 multiplies the division result (the first mixed channel response) received from the division unit 53, by the complex plane wave received from the complex plane wave generation unit 55 and outputs the result of the multiplication (the first shifted-and-mixed channel response) to the interpolation unit 57. The interpolation unit 57 conducts the above-described process on the first shifted-and-mixed channel response received from the multiplication unit 56, thereby estimating the channel response H' 12($n, k$) at every cell. The estimated channel response H' 12($n, k$) is output to the signal separation & equalization unit 39.

In parallel with the above processing, the following processing is performed.

The second reception signal received with the second receiving antenna 32 is subjected to the predetermined process and then input to the guard interval removable unit 36 where guard interval durations are removed. After the guard interval removable by the guard interval removable unit 36, the second reception signal is input to the Fourier transform unit 37 where the Fourier transform is applied symbol by symbol to the second reception signal from which guard interval durations have been removed. As a result, each signal part carrying a useful symbol duration Tu is converted into the second reception signal Y' 2 (n, k) and the second reception signal Y' 2($n, k$) is output to the signal separation & equalization unit 39 and also to the channel separation & estimation unit 38.

In the channel separation & estimation unit 38, the SP extraction unit 61 extracts the second reception SP signal Y' 2 (n, $k_{SP}$(n)) from the second reception signal Y' 2($n, k$) received from the Fourier transform unit 37 and outputs the extracted second reception SP signal Y' 2 (n, $k_{SP}$(n)) to the division unit 63. The division unit 63 divides the second reception SP signal Y' 2 (n, $k_{SP}$(n)) received from the SP extraction unit 61, by the SP signal Y (n, $k_{SP}$(n)) generated by the SP generation unit 52. The division result (the second mixed channel response) is output to the interpolation unit 64 and also to the multiplication unit 66.

The interpolation unit 64 conducts the above-described process on the second mixed channel response received from the division unit 63, thereby estimating the channel response H' 21 (n, k) at every cell and outputs the estimated channel response H' 21 (n, k) to the signal separation & equalization unit 39.

The multiplication unit 66 multiplies the division result received from the division unit 63 (the second mixed channel response), by the complex plane wave generated by the complex plane wave generation unit 55 and outputs the result of the multiplication (the second shifted-and-mixed channel response) to the interpolation unit 67. The interpolation unit 67 conducts the above-described process on the second shifted-and-mixed channel response received from the multiplication unit 66, thereby estimating the channel response H' 22($n, k$) at every cell. The estimated channel response H' 22($n, k$) is output to the signal separation & equalization unit 39.

The signal separation & equalization unit 39 computes Equation 17 described above, with the first reception signal Y' 1($n, k$) and the second reception signal Y' 2($n, k$) that are received as a result of the above two processes performed in parallel, and also with the channel responses H' 11($n, k$), H' 12 (n, k), H' 21($n, k$), and H' 22($n, k$), thereby separating and equalizing the first transmission signal X' 1($n, k$) and the second transmission signal X' 2($n, k$). The signal separation & equalization unit 39 then outputs the first transmission signal X' 1($n, k$) and the second transmission signal X' 2($n, k$).

Second Embodiment

The following describes a second embodiment of the present invention with reference to the drawings. Similarly to the first embodiment, the present embodiment relates to an MIMO transmission system that includes: a transmitter 10a having two transmitting antennas 11 and 12; and a receiver 30a having two receiving antennas 31 and 32. Yet, SP signals transmitted from the second transmitting antenna 12 are different from those described in the first embodiment. In the following description of the present embodiment, the same components as those employed in the first embodiment are denoted by the same reference numerals, and the description thereof is omitted since the corresponding description given in the first embodiment is applicable.

<SP Signals>

Before the detailed description of the transmitter 10a and the receiver 30a according to the present embodiment, a description is given of the description of SP signals transmitted from the first transmitting antenna 11 and the second transmitting antenna 12 both of which are included in the transmitter 10a.

The SP signal transmitted from the first transmitting antenna 11 are arranged in the pattern shown in FIG. 17 described above. The complex number of each SP signal allocated to a cell is the same as the complex number of a typical SP signal allocated to the same cell according to the DVB-T and ISDB-T systems.

Figure 9:
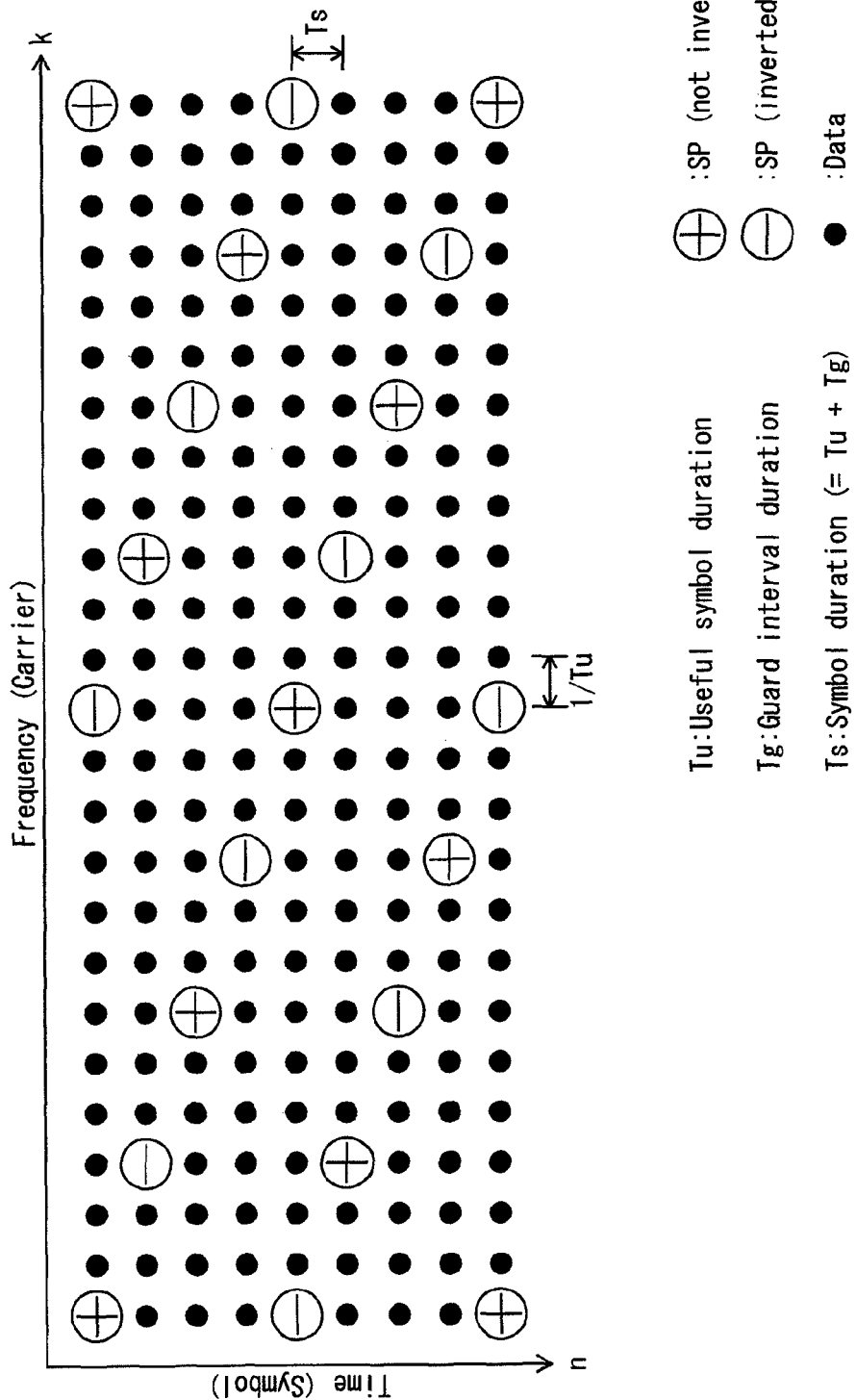
FIG. 9 is a schematic view showing the arrangement pattern and polarity reversal of SP signals transmitted from the second transmitting antenna 12 according to a second embodiment of the present invention.

In contrast, SP signals transmitted from the second transmitting antenna 12 are arranged in the pattern shown in FIG. 9. Note that a plus (+) sign in FIG. 9 indicates that the polarity of each SP signal transmitted from the second transmitting antenna 12 in a cell represented by a plus (+) sign is not inverted with respect to the polarity of an SP signal transmitted from the first transmitting antenna 11 in a corresponding cell having the same symbol number and the same carrier number. On the other hand, a minus (−) sign in FIG. 9 indicates that the polarity of each SP signal transmitted from the second transmitting antenna 12 in a cell represented by a minus (−) sign is inverted with respect to the polarity of an SP signal transmitted from the first transmitting antenna 11 in a corresponding cell having the same symbol number and the same carrier number.

As shown in FIGS. 17 and 9, the SP signals transmitted from the first transmitting antenna 11 are arranged in the same pattern as the SP signals transmitted from the second transmitting antenna 12. In addition, in both the patterns of the SP signal arrangement, each cell carrying an SP signal within a symbol having the symbol number n has a carrier number $k_{SP}(n)$ that satisfies Equation 1 described above.

The SP signals transmitted from the second transmitting antenna 12 in one symbol are alternately inverted and not inverted in polarity with respect to corresponding signals transmitted from the first transmitting antenna 11 in the same symbol. In the direction in which the symbol number is incremented by 3 and the carrier number is decremented by 3, the polarity of all the SP signals are inverted with respect to the polarity of corresponding SP signals transmitted from the first transmitting antenna 11.

The process of inverting and not inverting the polarity of SP signals transmitted from the first transmitting antenna 11 is equivalent to an arithmetic operation of multiplying individual SP signals transmitted from the first transmitting antenna 11, by the complex plane wave expressed by the left side of Equation 19 shown below. Here, the complex plane wave has an equi-phase line parallel to the k axis direction on the k-n plane, and the cycle in the n axis direction is equal to 8n and the cycle in the k axis direction is −8k.

$$\exp\left[j2\pi\left(\frac{1}{8}n + \frac{1}{8}k\right)\right] = \exp\left[j2\pi\left(\frac{1}{8Ts}t + \frac{Tu}{8}f\right)\right] \quad \text{[Equation 19]}$$

Note that in Equation 19, the right side is obtained by rewriting the left side using the relation n=(1/Ts)t and k=Tuf.

Accordingly, the response of each SP signal transmitted from the second transmitting antenna 12 is said to be shifted the response of a corresponding SP signal transmitted from the first transmitting antenna 11, by −Tu/8 in the τ axis direction and 1/(8Ts) in the $f_D$ axis direction on the τ-$f_D$ plane.

Figure 10:
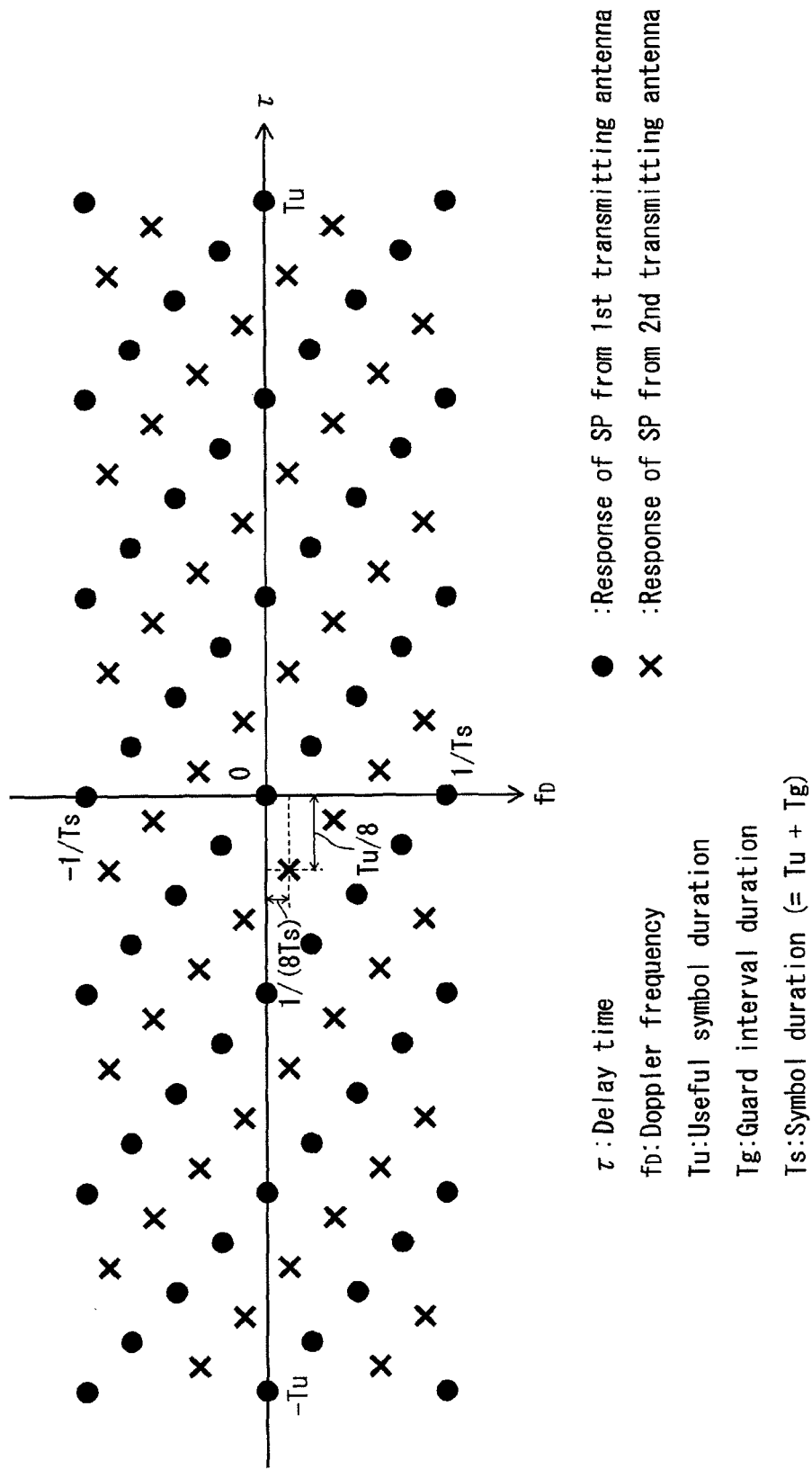
FIG. 10 is a schematic view showing, on a $\tau$-$f_D$ plane, responses of SP signals transmitted from the first transmitting antenna 11 and the second transmitting antenna 12 according to the second embodiment.

In view of the above, the responses of SP signals transmitted from the first transmitting antenna 11 and the responses of SP signal transmitted from the second transmitting antenna 12 are expressed on the same τ-$f_D$ plane as shown in FIG. 10. Note that a black dot in FIG. 10 represents a response of an SP signal transmitted from the first transmitting antenna 11, whereas a cross represents a response of an SP signal transmitted from the second transmitting antenna 12.

The receiver 30a divides each received SP signal by the nominal SP signal to obtain a mixed channel response which is a mixture of a channel response of the channel from the first transmitting antenna 11 to one of the receiving antennas (the first receiving antenna 31 or the second receiving antenna 32) and a channel response of the channel from the second transmitting antenna 12 to the one of the receiving antennas (the former channel response is referred as the "channel response related to the first transmitting antenna 11" and the latter is referred to as the "channel response related to the second transmitting antenna 12").

However, the channel response related to the first transmitting antenna 11 has the spreading from the black dots shown in FIG. 10, in accordance with the impulse response and Doppler spectrum. Similarly, the channel response related to the second transmitting antenna 12 has the spreading from the crosses shown in FIG. 10, in accordance with the impulse response and Doppler spectrum.

Figure 11:
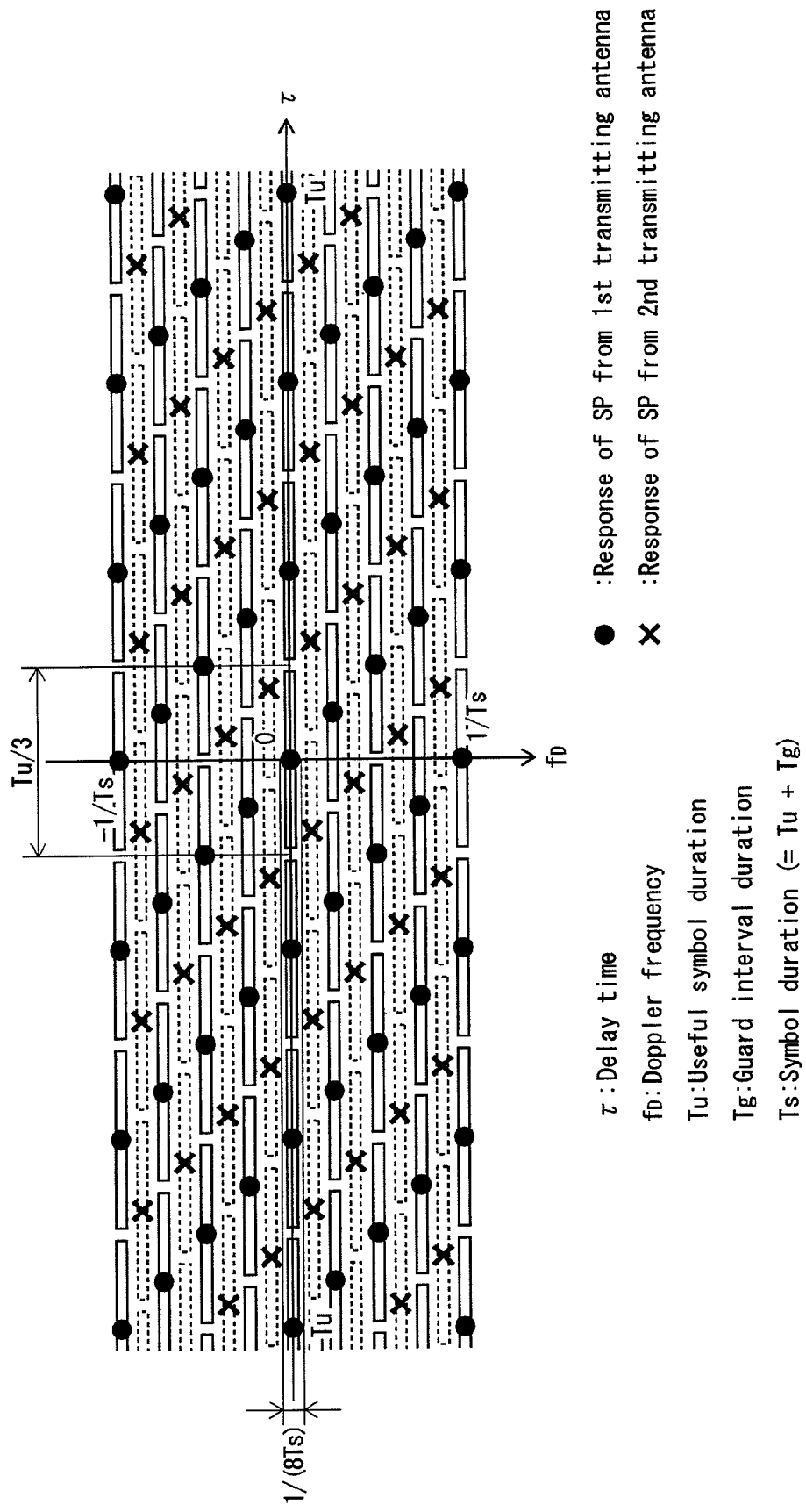
FIG. 11 is a schematic view showing a region in which the channel responses are separated and estimated, on condition that SP signals arranged in the patterns shown in FIGS. 17 and 9 are used.

FIG. 11 shows a region the τ-$f_D$ plane in which the respective channel responses related to the first and second transmitting antennas 11 and 12 are interpolated without causing aliasing distortion and separated from each other without causing crosstalk therebetween, on condition that the channel responses of SP signals are interpolated first in the n axis direction and then in the k axis direction on the k-n plane. In FIG. 11, a black dot represents a response of an SP signal transmitted from the first transmitting antenna 11, whereas a cross represents a response of an SP signal transmitted from the second transmitting antenna 12. In addition, a rectangular with a solid line represents the channel response related to the first transmitting antenna 11, whereas a rectangular with a broken line represents the response related to the second transmitting antenna 12.

From FIG. 11, it is known that a rectangular region having a width of Tu/3 in the τ axis direction and a width of 1/(8Ts) in the $f_D$ axis direction is what is hereinafter referred to as an "interpolatable & separable region". In the interpolatable & separable region, the channel response related to the first transmitting antenna 11 and the channel response related to the second transmitting antenna 12 are interoperated without causing aliasing distortion and separated without causing crosstalk therebetween.

From a comparison of FIG. 22 with FIG. 11, the following is noted. On condition that SP signals transmitted from the first transmitting antenna 11 are arranged in the pattern shown in FIG. 17, whereas SP signals transmitted from the second transmitting antenna 12 are arranged in the pattern shown in FIG. 9. Then, the width of the interpolatable & separable region in the τ axis direction is Tu/3, which is equal to the width of the interpolatable region in the τ axis direction shown in FIG. 17. As mentioned above, the interpolatable region shown in FIG. 17 is a region in which SP signals transmitted from a single transmitting antenna are interpolated without causing aliasing distortion. That is, the τ axis-direction width of the region in which correct estimation is ensured for both the channel responses related to the first and second transmitting antennas 11 and 12 falls within a range not impairing the tolerance to multi-path delay achieved by the insertion of guard intervals.

Figure 12:
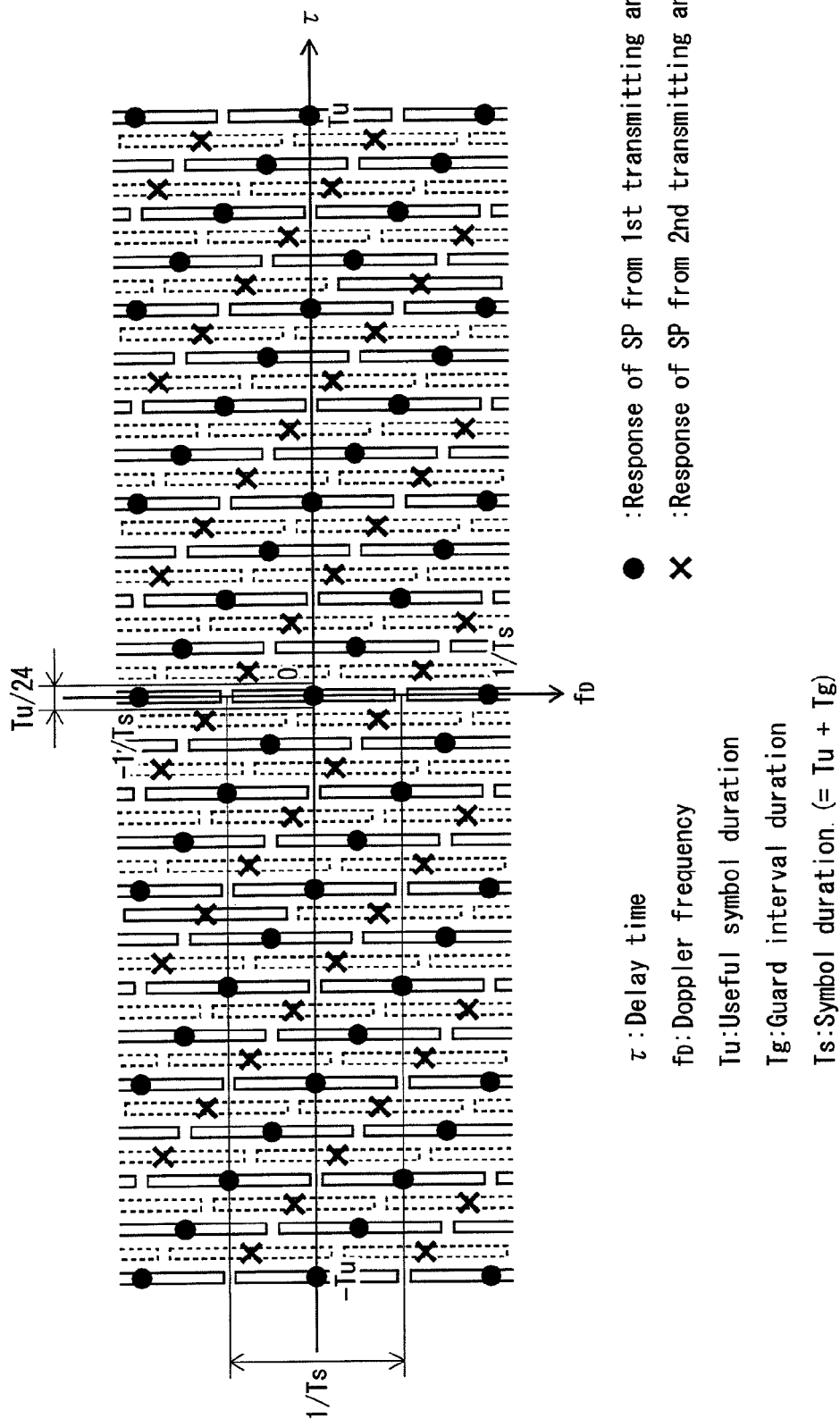
FIG. 12 is another schematic view showing a region in which the channel responses are separated and estimated, on condition that SP signals arranged in the patterns shown in FIGS. 17 and 9 are used.

FIG. 12 shows a region of the τ-$f_D$ plane in which the channel response related to the first transmitting antenna 11 and the channel response related to the second transmitting antenna 12 are interpolated without causing aliasing distortion and separated from each other without causing crosstalk therebetween, on condition that the channel response of SP signals are interpolated only in the k axis direction and not in the n axis direction on the k-n plane. In FIG. 12, a black dot represents a response of an SP signal transmitted from the first transmitting antenna 11, whereas a cross represents a response of an SP signal transmitted from the second transmitting antenna 12. In addition, a rectangular with a solid line represents the channel response related to the first transmitting antenna 11, whereas a rectangular with a broken line represents the channel response related to the second transmitting antenna 12.

From FIG. 12, it is known that a rectangular region having a width of Tu/24 in the τ axis direction and a width of 1/Ts in the $f_D$ axis direction is what is hereinafter referred to as an "interpolatable & separable region". In the interpolatable & separable region, the channel response related to the first transmitting antenna 11 and the channel response related to the second transmitting antenna 12 are interoperated without causing aliasing distortion and separated from each other without causing crosstalk therebetween.

From a comparison of FIG. 23 with FIG. 12, the following is noted on condition that SP signals transmitted from the first transmitting antenna 11 are arranged in the pattern shown in FIG. 17 and that SP signals transmitted from the second transmitting antenna 12 are arranged in the pattern shown in FIG. 9. That is, the width of the interpolatable & separable region in the $f_D$ axis direction is 1/Ts, which is equal to the width of the interpolatable region in the τ axis direction shown in FIG. 17. As mentioned above, the interpolatable region shown in FIG. 17 is a region in which the channel response of SP signals transmitted from a single transmitting antenna is interoperated without causing aliasing distortion. That is, the $f_D$-axis direction width of the region in which correct estimation is ensured for both the channel responses related to the first and second transmitting antennas 11 and 12 is not impaired at all. In other words, the ability of following the channel's time variability is not impaired.

Further, FIG. 24 and FIG. 10 are compared.

In FIG. 24, the responses appearing at the same Doppler frequency are a mixture of the responses of SP signals transmitted from the first transmitting antenna and the responses of SP signal transmitted from the second transmitting antenna. Therefore, the impulse responses of the respective channels share the same region in the τ axis direction. Also, the responses appearing at the same delay time are a mixture of the responses of SP signals transmitted from the first transmitting antenna and the responses of SP signals transmitted from the second transmitting antenna. Therefore, the Doppler spectrums of the respective channels share the same region in the $f_D$ axis direction.

In FIG. 10, in contrast, the responses appearing at the same Doppler frequency are exclusively of the responses of SP signals transmitted from either of the first transmitting antenna 11 and the second transmitting antenna 12. Therefore, the impulse responses of the respective channels are allowed to occupy mutually different regions in the τ axis direction. Also, the responses appearing at the same delay time are exclusively of the responses of SP signals transmitted from either of the first transmitting antenna 11 and the second transmitting antenna 12. Therefore, the Doppler spectrums of the respective channels are allowed to occupy mutually different regions in the $f_D$ axis direction.

As described above, according to the present embodiment that uses the two SP signal arrangements shown in FIGS. 17 and 9, the interpolatable & separable region is extended widthwise in the T or $f_D$ axis direction, as compared with the interpolatable & separable region in the conventional case where the two SP signal arrangements shown in FIGS. 17 and 20 are used. As described above, the interpolatable & separable region refers to a region in which the channel response related to the first transmitting antenna 11 and the channel response related to the second transmitting antenna 12 are interpolated without causing aliasing distortion and separated from each other without causing crosstalk therebetween.

<Structure of Transmitter 10a>

Figure 13:
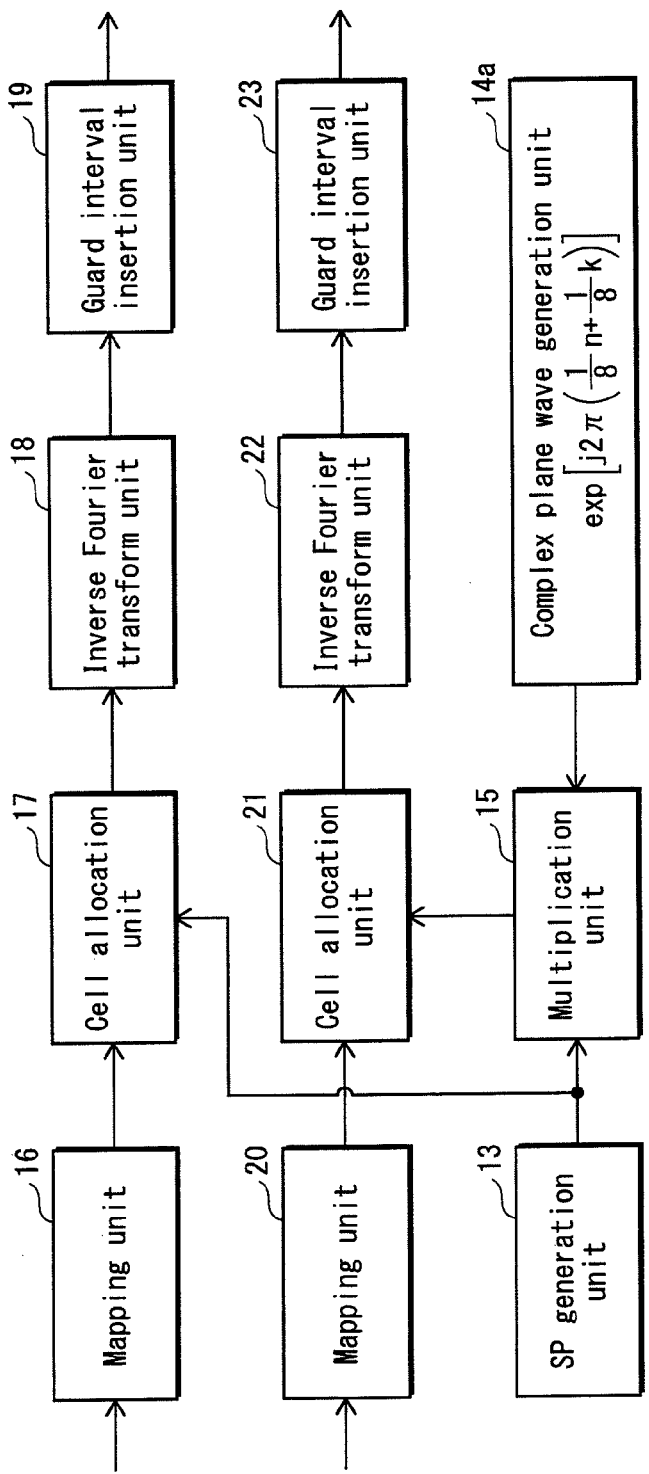
FIG. 13 is a diagram showing the structure of a transmitter 10a according to the second embodiment.

The following describes the structure of the transmitter 10a with reference to FIG. 13. FIG. 13 is a diagram showing the structure of the transmitter 10a according to the present embodiment.

The transmitter 10a includes a complex plane wave generation unit 14a, instead of the complex plane wave generation unit 14 included in the transmitter 10.

[Complex Plane Wave Generation Unit 14a]

The complex plane wave generation unit 14a generates a complex plane wave expressed by Equation 20 below and outputs the generated complex plane wave to the multiplication unit 15.

$$\exp\left[j2\pi\left(\frac{1}{8}n + \frac{1}{8}k\right)\right] \qquad \text{[Equation 20]}$$

In Equation 20, n represents the symbol number and k represents the carrier number.

Note that the multiplication unit 15 according to the present embodiment multiplies an SP signal received from the SP generation unit 13 by the complex plane wave received from the complex plane wave generation unit 14a, rather than by the complex plane wave received from the complex plane wave generation unit 14. The multiplication unit 15 then outputs the result of the multiplication to the cell allocation unit 21 where the received multiplication result is used as an SP signal to be transmitted from the second transmitting antenna 12. The process of the multiplication performed by the multiplication unit 15 is equivalent to the process of shifting the SP signal received from the SP generation unit 13, by −Tu/8 in the τ axis direction and by 1/(8Ts) in the $f_D$ axis direction on the τ-$f_D$ plane.

<Structure of Receiver 30a>

Figure 14:
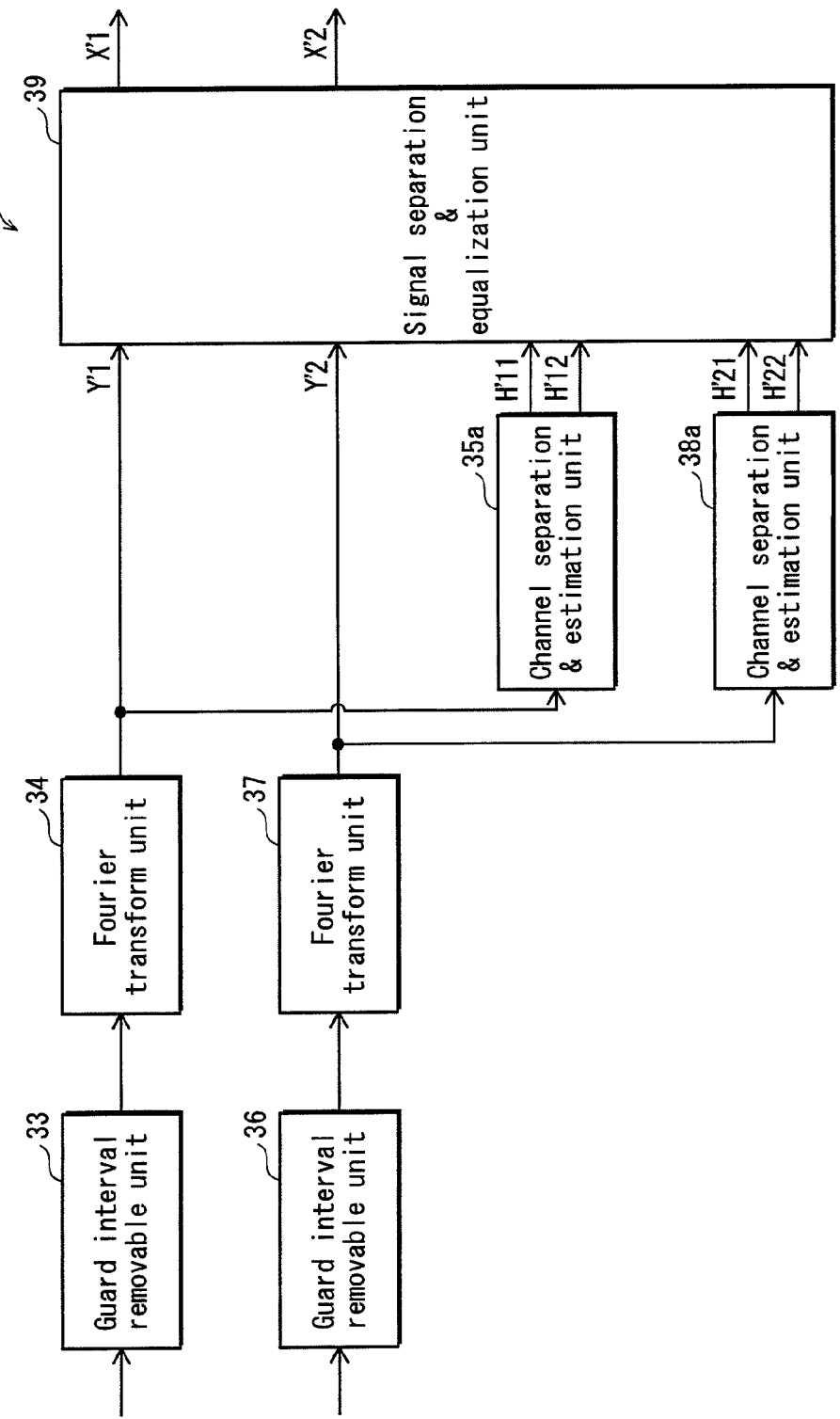
FIG. 14 is a diagram showing the structure of a receiver 30a according to the second embodiment.

The following describes the structure of the receiver 30a according to the present embodiment, with reference to FIG. 14. FIG. 14 is a diagram showing the structure of the receiver 30a according to the present embodiment.

The receiver 30a includes channel separation & estimation units 35a and 38a, instead of the channel separation & estimation units 35 and 38 included in the receiver 30.

[Channel Separation & Estimation Unit 35a]

The channel separation & estimation unit 35a separates and estimates the channel response H'11(n, k) of the channel P11 and the channel response H'12(n, k) of the channel P12, with the use of the first reception signal Y'1(n, k) received from the Fourier transform unit 34. The channel separation & estimation unit 35a then outputs the channel responses H'11 (n, k) and H'12(n, k) to the signal separation & equalization unit 39.

[Channel Separation & Estimation Unit 38a]

The channel separation & estimation unit 38a separates and estimates the channel response H'21(n, k) of the channel P21 and the channel response H'22(n, k) of the channel P22, with the use of the second reception signal Y'2(n, k) received from the Fourier transform unit 37. The channel separation & estimation unit 38a then outputs the channel responses H' 21 (n, k) and H'22(n, k) to the signal separation & equalization unit 39.

<Structures of Channel Separation & Estimation Units 35a and 38a>

Figure 15:
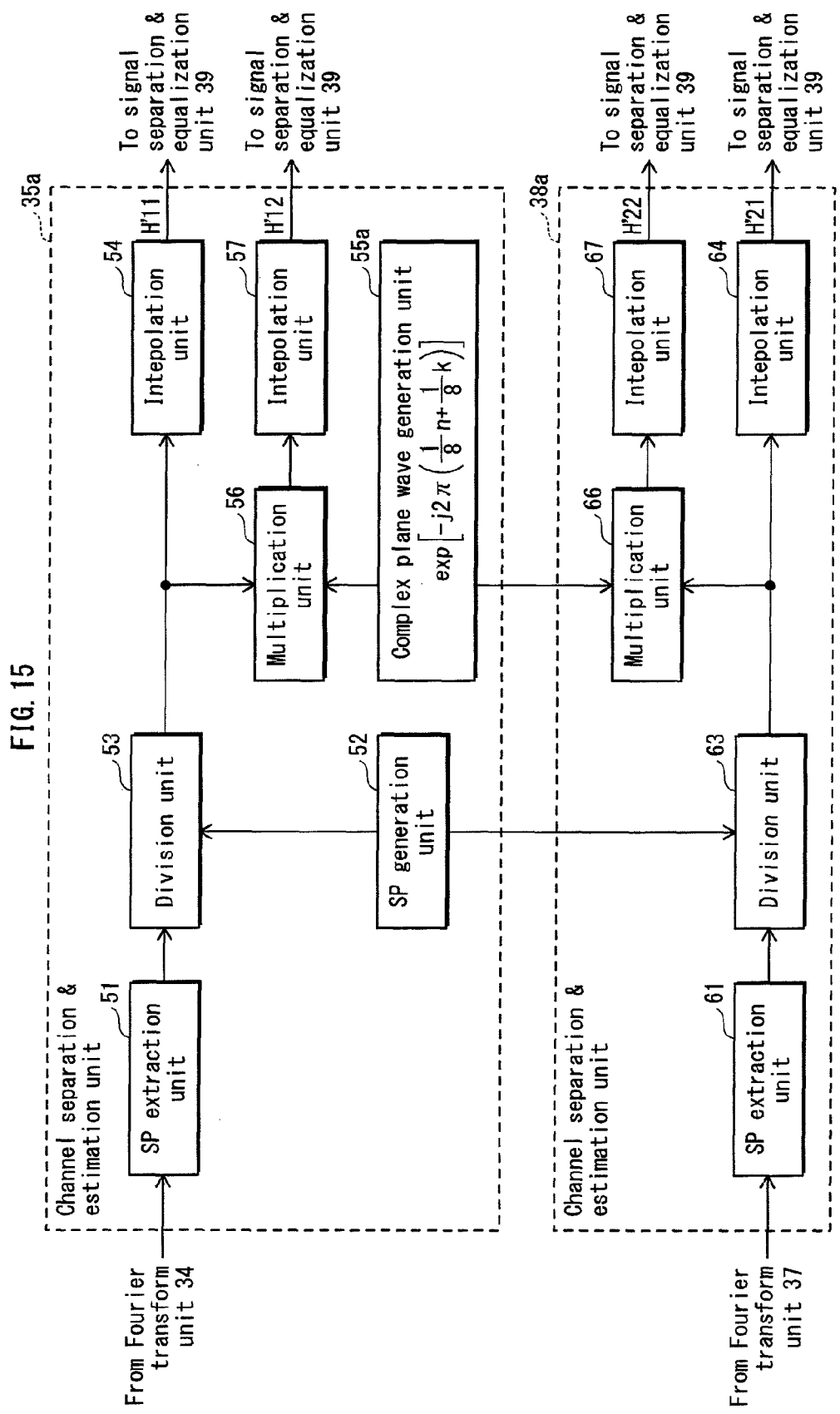
FIG. 15 is a diagram showing the structures of channel separation & estimation units 35a and 38a shown in FIG. 14.

The following describes the details of the channel separation & estimation units 35a and 38a shown in FIG. 14, with reference to FIG. 15. FIG. 15 is a diagram showing the structures of the channel separation & estimation units 35a and 38a shown in FIG. 14.

[Channel Separation & Estimation Unit 35a]

The channel separation & estimation unit 35a includes a complex plane wave generation unit 55a instead of the complex plane wave generation unit 55 included in the channel separation & estimation unit 35.

(Complex Plane Wave Generation Unit 55a)

The complex plane wave generation unit 55a generates a complex plane wave expressed by Equation 21 shown below and outputs the generated complex plane wave to the multiplication unit 56 and the multiplication unit 66 that is included in the channel separation & estimation unit 38a.

$$\exp\left[-j2\pi\left(\frac{1}{8}n + \frac{1}{8}k\right)\right] \qquad \text{[Equation 21]}$$

Note in Equation 21, n represents the symbol number and k represents the carrier number.

Note that the multiplication unit 56 according to the present embodiment multiplies the division result (the first mixed channel response) received from the division unit 53 by the complex plane wave received from the complex plane wave generation unit 55a, rather than by the complex plane wave received from the complex plane wave generation unit 55. The multiplication unit 56 then outputs the result of the multiplication (the first shifted and mixed channel response) to the interpolation unit 57. Note that the multiplication performed by the multiplication unit 56 is equivalent to the process of shifting the first mixed channel response by Tu/8 in the $\tau$ axis direction and by $-1/(8Ts)$ in the $f_D$ axis direction on the $\tau$-$f_D$ plane.

[Channel Separation & Estimation unit 38a]

The channel separation & estimation unit 38a is of the same structure as the channel separation & estimation unit 38. Note that the multiplication unit 66 according to the present embodiment multiplies the division result (the second mixed channel response) received from the division unit 63 by the complex plane wave received from the complex plane wave generation unit 55a, rather than by the complex plane wave received from the complex plane wave generation unit 55. The channel separation & estimation unit 38a then outputs the result of the multiplication unit (the second shifted and mixed channel response) to the interpolation unit 67. Note that the multiplication performed by the multiplication unit 66 is equivalent to the process of shifting the second mixed channel response by Tu/8 in the $\tau$ axis direction and $-1/(8Ts)$ in the $f_D$ axis direction on the $\tau$-$f_D$ plane.

<<Supplemental Note>>

The present invention is not limited to the specific embodiments described above. Various modifications including the following still falls within the scope of the present invention.

(1) The above embodiments are described using the term "SP signal", on the assumption that the DVB-T or ISDB-T system is employed. It should be noted, however, that the present invention is applicable to various other cases where a pilot signal having the amplitude and phase known to receivers are used.

(2) The first embodiment described above may be modified, so that the complex plane wave generation unit 14 generates a complex plane wave having a phase term calculated by multiplying the phase term of Equation 16 by −1, and that the complex plane wave generation unit 55 generates a complex plane wave having a phase term calculated by multiplying the phase term of Equation 18 by −1.

The second embodiment described above may be modified, so that the complex plane wave generation unit 14a generates a complex plane wave having a phase term calculated by multiplying the phase term of Equation 20 by −1, and that the complex plane wave generation unit 55a generates a complex plane wave having a phase term calculated by multiplying the phase term of Equation 21 by −1.

(3) The above embodiments are described on the assumption that the DVB-T or ISDB-T system is employed, so that the interval between SP signals within the same symbol is described as 12 carriers and the interval between SP signals within the same carrier is described as 4 symbols. Then, the carrier number $k_{SP}(n)$ of an SP signal satisfies Equation 1. Yet, the present invention is applicable to a case where the arrangement pattern of pilot signals (i.e., signals whose amplitude and phase are known to receivers) on the carrier-symbol plane is generalized as follows.

Let n denote the symbol number, k denote the carrier number, $\Delta k$ denote the interval between pilot signals in the same symbol, $\Delta n$ denote the interval between pilot signals in the same carrier, and p denote an integer greater than or equal to 0. Then, the carrier number $k_P(n)$ of a carrier transmitting a pilot signal satisfies Equation 22 shown below.

$$k_P(n) = \frac{\Delta k}{\Delta n} \times (n \bmod \Delta n) + \Delta k \times p \qquad \text{[Equation 22]}$$

In this case, the first or second embodiment may be modified in the following manner.

Figure 16:
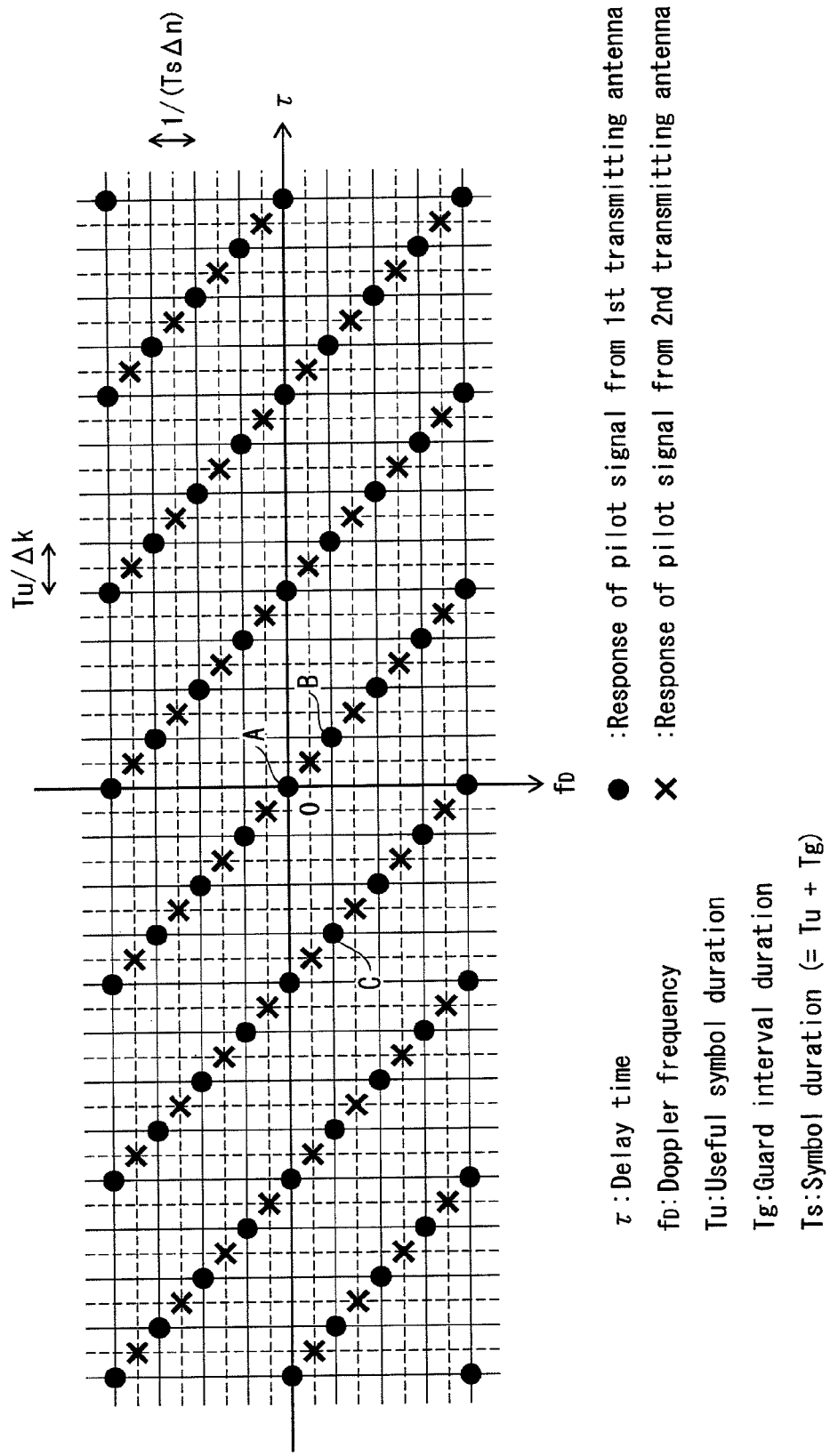
FIG. 16 is a view for illustrating a generalization of the complex plane waves used in the first and second embodiments.

(3-A) FIG. 16 shows the responses of SP signals transmitted from the first transmitting antenna in a generalized pattern of the SP signal arrangements satisfying Equation 22. In FIG. 16, the distance between points A and B is equal to Tu/$\Delta$k in the $\tau$ axis direction and to 1/(Ts$\Delta$n) in the $f_D$ axis direction. Each pilot signal to be transmitted from the second transmitting antenna is so adjusted to coincide with a midpoint between the points A and B.

Accordingly, pilot signals to be transmitted from the second transmitting antenna are generated by shifting the response of a corresponding pilot signal transmitted from the first transmitting antenna, by Tu/(2$\Delta$k) in the $\tau$ axis direction and 1/(2Ts$\Delta$n) in the $f_D$ axis direction.

In view of the above, the pilot signal generation unit provided within the transmitter is configured to generate reference pilot signals (i.e., signals whose amplitude and phase are known to receivers, and the same holds true for the following description) and use the thus generated reference pilot signals as pilot signals to be transmitted from the first transmitting antenna. In view of the above, in addition, the complex plane wave generation unit provided within the transmitter is configured to generate a complex plane wave expressed by the left side of Equation 23 shown below. The multiplication unit is configured to multiply each reference pilot signal by the thus generated complex plane wave and use the result of the multiplication as a pilot signal to be transmitted from the second transmitting antenna.

$$\exp\left[j2\pi\left(\frac{1}{2\Delta n}n - \frac{1}{2\Delta k}k\right)\right] = \exp\left[j2\pi\left(\frac{1}{2\Delta nTs}t - \frac{Tu}{2\Delta k}f\right)\right] \quad \text{[Equation 23]}$$

Note that in Equation 23, the right side is obtained by rewriting the left side using the relation n=(1/Ts)t and k=Tuf.

The receiver divides each pilot signal received with the receiving antenna (the first or e second receiving antenna), by the nominal pilot signal (a reference pilot signal generated by the transmitter, the same holds true for the following description). As a division result, the receiver obtains what is hereinafter referred to as a "mixed channel response". The mixed channel response is a mixture of the channel response of a channel from the first transmitting antenna to that receiving antenna (the channel response related to the first transmitting antenna) and the channel response of a channel from the second transmitting antenna to that receiving antenna (the channel response related to the second transmitting antenna). The interpolation unit provided for the first transmitting antenna estimates, with the use of a low-pass filter, the channel response at every cell and related to the first transmitting antenna from the mixed channel response. The complex plane wave generation unit provided within the receiver generates a complex plane wave expressed by the left side of Equation 24 shown below. The multiplication unit then multiples the mixed channel response by the thus generated complex plane wave. On the other hand, the interpolation unit provided for the second transmitting antenna estimates, with the use of a low-pass filter, the channel response related to the second transmitting antenna at every cell from the result of the multiplication by the multiplication unit.

$$\exp\left[-j2\pi\left(\frac{1}{2\Delta n}n - \frac{1}{2\Delta k}k\right)\right] = \exp\left[-j2\pi\left(\frac{1}{2\Delta nTs}t - \frac{Tu}{2\Delta k}f\right)\right] \quad \text{[Equation 24]}$$

Note that in Equation 24, the right side is obtained by rewriting the left side using the relation n=(1/Ts)t and k=Tuf.

Note that the complex plane wave generation unit included in the transmitter may be configured to generate a complex plane wave having the phase term calculated by multiplying the phase term of Equation 23 by −1. Then, the complex plane wave generation unit provided within the receiver may be configured to generate a complex plane wave having the phase term calculated by multiplying the phase term of Equation 24 by −1.

(3-B) With reference to FIG. 16 showing the response of pilot signals transmitted from the first transmitting antenna, the distance between points A and C is equal to 3Tu/Ak in the Taxis direction and to 1/(TsΔn) in the $f_D$ axis direction. Each pilot signal to be transmitted from the second transmitting antenna is so adjusted to coincide with a midpoint between the points A and C.

Such pilot signals to be transmitted from the second transmitting antenna are generated by shifting the response of a corresponding pilot signal transmitted from the first transmitting antenna, by −3Tu/(2Δk) in the τ axis direction and by 1/(2TsΔn) in the $f_D$ axis direction.

In view of the above, the pilot signal generation unit provided within the transmitter is configured to generate reference pilot signals and use the generated reference pilot signals as pilot signals to be transmitted from the first transmitting antenna. In view of the above, in addition, the complex plane wave generation unit provided within the transmitter is configured to generate a complex plane wave expressed by the left side of Equation 25 shown below. The multiplication unit is configured to multiply each reference pilot signal by the thus generated complex plane wave and use the result of the multiplication as a pilot signal to be transmitted from the second transmitting antenna.

$$\exp\left[j2\pi\left(\frac{1}{2\Delta n}n + \frac{3}{2\Delta k}k\right)\right] = \exp\left[j2\pi\left(\frac{1}{2\Delta nTs}t + \frac{3Tu}{2\Delta k}f\right)\right] \quad \text{[Equation 25]}$$

Note that in Equation 25, the right side is obtained by rewriting the left side using the relation n=(1/Ts)t and k=Tuf.

The receiver divides each pilot signal received with the receiving antenna (the first or second receiving antenna), by a nominal pilot signal. As a result of the division, the receiver obtains what is hereinafter referred to as a "mixed channel response". The mixed channel response is a mixture of the channel response of the channel from the first transmitting antenna to that receiving antenna (the channel response related to the first transmitting antenna) and the channel response of the channel from the second transmitting antenna to that receiving antenna (the channel response related to the second transmitting antenna). The interpolation unit provided for the first transmitting antenna estimates, with the use of a low-pass filter, the channel response at every cell and related to the first transmitting antenna from the mixed channel response. The complex plane wave generation unit provided within the receiver generates a complex plane wave expressed by the left side of Equation 26, and the multiplication unit multiplies each mixed channel response by the complex plane wave. The interpolation unit provided for the second transmitting antenna estimates, with the use of a low-pass filter, the channel response at every cell and related to the second transmitting antenna from the result of the multiplication calculated by the multiplication unit.

$$\exp\left[-j2\pi\left(\frac{1}{2\Delta n}n + \frac{3}{2\Delta k}k\right)\right] = \exp\left[-j2\pi\left(\frac{1}{2\Delta nTs}t + \frac{3Tu}{2\Delta k}f\right)\right] \quad \text{[Equation 26]}$$

Note that in Equation 26, the right side is obtained by rewriting the left side using the relation n=(1/Ts)t and k=Tuf.

Note that the complex plane wave generation unit provided within the transmitter may generate a complex plane wave having a phase term calculated by multiplying the phase term of Equation 25 by −1, and that the complex plane wave generation unit provided within the receiver may generate a complex plane wave having a phase term calculated by multiplying the phase term of Equation 26 by −1.

(4) According to the above embodiments, transmission signals are transmitted from the first transmitting antenna 11 and the second transmitting antenna 12. However, the transmitter may have M transmitting antennas (M is an integer greater than or equal to 2). Here, each of a set of pilot signals (signals whose amplitude and phase are known to receivers) transmitted from the m$^{th}$ transmitting antenna (m is an integer satisfying 1≤m≤M) is referred to as an m$^{th}$ pilot signal and arranged in the generalized pattern expressed by Equation 22 shown above.

In this case, the first or second embodiment described above may be modified in the following manner, for example.

(4-A) With reference to FIG. 16 showing the responses of SP signals transmitted from the first transmitting antenna, the distance between the points A and B is equal to Tu/Ak in the τ axis direction and to 1/(TsΔn) in the f$_D$ axis direction. Each of the m$^{th}$ pilot signals, which are pilot signals to be transmitted from the m$^{th}$ transmitting antenna (where 2≤m≤M), is so adjusted that the response of the pilot signal coincides with the (m−1)$^{th}$ point from the point A, out of (M−1) points determined by dividing the distance between the points A and B into M segments at even intervals.

Each of the m$^{th}$ pilot signals, which are pilot signals to be transmitted from the m$^{th}$ transmitting antenna (where 2≤m≤M), is generated by shifting the response of a corresponding first pilot signal transmitted from the first transmitting antenna, by (m−1) Tu/(MΔk) in the τ axis direction and (m−1)/(MTsΔn) in the f$_D$ axis direction.

In view of the above, the pilot signal generation unit provided within the transmitter is configured to generate reference pilot signals and use the thus generated reference pilot signals as first pilot signals to be transmitted from the first transmitting antenna. For each m$^{th}$ transmitting antenna were 2≤m≤M, the complex plane wave generation unit provided within the transmitter is configured in view of the above to generate a complex plane wave expressed by the left side of Equation 27. The multiplication unit is configured to multiply each reference pilot signal by the thus generated complex plane wave and use the result of the multiplication as an m$^{th}$ pilot signal to be transmitted from the m$^{th}$ transmitting antenna.

$$\exp\left[j2\pi\left(\frac{(m-1)}{M\Delta n}n - \frac{(m-1)}{M\Delta k}k\right)\right] = \exp\left[j2\pi\left(\frac{(m-1)}{M\Delta nTs}t - \frac{(m-1)Tu}{M\Delta k}f\right)\right]$$ [Equation 27]

Note that in Equation 27, the right side is obtained by rewriting the left side using the relation n=(1/Ts)t and k=Tuf.

The receiver divides each pilot signal received with the receiving antenna by the nominal pilot signal to obtain what is hereinafter referred to as a "mixed channel response". The mixed channel response is a mixture of the multiple channels from the multiple transmitting antennas to the receiving antenna. The interpolation unit provided for the first transmitting antenna estimates, with the use of a low-pass filter, the channel response at every cell and related to the first transmitting antenna, from the mixed channel response. For estimation of the response related to each m$^{th}$ transmitting antenna were 2≤m≤M, the complex plane wave generation unit provided within the receiver generates a complex plane wave expressed by the left side of Equation 28 shown below. The multiplication unit multiplies each reference pilot signal by the thus generated complex plane wave. The interpolation unit estimates, with the use of a low-pass filter, the channel response at every cell and related to the m$^{th}$ transmitting antenna from the result of the multiplication computed by the multiplication unit.

$$\exp\left[-j2\pi\left(\frac{(m-1)}{M\Delta n}n - \frac{(m-1)}{M\Delta k}k\right)\right] = \exp\left[-j2\pi\left(\frac{(m-1)}{M\Delta nTs}t - \frac{(m-1)Tu}{M\Delta k}f\right)\right]$$ [Equation 28]

Note that in Equation 28, the right side is obtained by rewriting the left side using the relation n=(1/Ts)t and k=Tuf.

The complex plane wave generation unit provided within the transmitter may be modified to generate a complex plane wave having the phase term calculated by multiplying the phase term of Equation 27 by −1. Then, the complex plane wave generation unit provided within the receiver may be modified to generate a complex plane wave having the phase term calculated by multiplying the phase term of Equation 28 by −1.

(4-B) With reference to FIG. 16 showing the responses of SP signals transmitted from the first transmitting antenna, the distance between the points A and C is equal to 3Tu/Ak in the τ axis direction and to 1/(TsΔn) in the f$_D$ axis direction. Each of a set of m$^{th}$ pilot signals to be transmitted from the m$^{th}$ transmitting antenna (where 2≤m≤M) is so adjusted that the response of the pilot signal coincides with the (m−1)$^{th}$ point from the point A, out of (M−1) points determined by dividing the distance between the points A and C into M segments at even intervals.

Each of the m$^{th}$ pilot signals, which are pilot signals to be transmitted from the m$^{th}$ transmitting antenna (where 2≤m≤M), is generated by shifting the response of a corresponding first pilot signal transmitted from the first transmitting antenna, by −3(m−1)Tu/(MΔk) in the τ axis direction and (m−1)/(MTsΔn) in the f$_D$ axis direction.

In view of the above, the pilot signal generation unit within the transmitter generates reference pilot signals and use the thus generated reference pilot signals as first pilot signals to be transmitted from the first transmitting antenna. In addition, the complex plane wave generation unit provided within the transmitter is configured in view of the above to generate a complex plane wave expressed by the left side of Equation 29 for each m$^{th}$ transmitting antenna, were 2≤m≤M. The multiplication unit multiplies each reference pilot signal by the thus generated complex plane wave and uses the result of the multiplication as an m$^{th}$ pilot signal to be transmitted from the m$^{th}$ transmitting antenna.

$$\exp\left[j2\pi\left(\frac{(m-1)}{M\Delta n}n + \frac{3(m-1)}{M\Delta k}k\right)\right] = \exp\left[j2\pi\left(\frac{(m-1)}{M\Delta nTs}t + \frac{3(m-1)Tu}{M\Delta k}f\right)\right]$$ [Equation 29]

Note that in Equation 29, the right side is obtained by rewriting the left side using the relation n=(1/Ts)t and k=Tuf.

The receiver divides each pilot signal received with the receiving antenna by the nominal pilot signal to obtain what is hereinafter referred to as a "mixed channel response". The mixed channel response is a mixture of the channel responses of the multiple channels from the multiple transmitting antennas to the receiving antenna. The interpolation unit provided for the first transmitting antenna estimates, with the use of a low-pass filter, the channel response at every cell and related to the first transmitting antenna, from the mixed channel response. For estimation of each $m^{th}$ transmitting antenna were 2≤m≤M, the complex plane wave generation unit provided within the receiver generates a complex plane wave expressed by the left side of Equation 30 shown below. The multiplication unit multiplies each reference pilot signal by the thus generated complex plane wave. The interpolation unit estimates, with the use of a low-pass filter, the channel response at every cell and related to the $m^{th}$ transmitting antenna from the result of the multiplication.

$$\exp\left[-j2\pi\left(\frac{(m-1)}{M\Delta n}n + \frac{3(m-1)}{M\Delta k}k\right)\right] = \exp\left[-j2\pi\left(\frac{(m-1)}{M\Delta nTs}t + \frac{3(m-1)Tu}{M\Delta k}f\right)\right]$$ [Equation 30]

Note that in Equation 30, the right side is obtained by rewriting the left side using the relation n=(1/Ts)t and k=Tuf.

The complex plane wave generation unit provided within the transmitter may be modified to generate a complex plane wave having the phase term calculated by multiplying the phase term of Equation 29 by −1. Then, the complex plane wave generation unit provided within the receiver may be modified to generate a complex plane wave having the phase term calculated by multiplying the phase term of Equation 30 by −1.

In addition, the modification described in (4-B) above requires that −3(m−1) is not equal to an integral multiple of M, where 2≤m≤M.

(5) With reference to FIG. 16, the following describes a further generalization of the SP signal transmission methods according to the embodiments described above. In FIG. 16, a black dot represents a response of a first pilot signal transmitted from the first transmitting antenna, whereas a cross represents the response of a second pilot signal transmitted from the second transmitting antenna. Here, let M denote the number of transmitting antennas (where M is an integer greater than or equal to 2). Then, a set of $M^{th}$ pilot signals transmitted from the $M^{th}$ transmitting antenna (where m is an integer satisfying 1≤m≤M) are arranged in the generalized pattern given by Equation 22 shown above.

In FIG. 16, solid straight lines extend in parallel to the T or $f_D$ axis to pass through the responses of first pilot signals. Similarly, doted straight lines extend in parallel to the T or $f_D$ axis to pass through the responses of second pilot signals.

The gist of the method for transmitting pilot signals from multiple transmitting antennas is to ensure that the responses of pilot signals transmitted from one transmitting antenna do not appear on the same lattice pattern with the responses of pilot signals transmitted from any other transmitting antenna.

The above signal arrangement is realized in the following manner. First, the distance between each adjacent lines in the lattice pattern of the responses of first pilot signals transmitted from the first transmitting antenna is divided by M to define M different lattice patterns. Then, sets of pilot signals transmitted from the respective transmitting antennas are so adjusted that their responses appear on mutually different lattice patterns.

In view of the above, the pilot signal generation unit provided within the transmitter is configured to generate reference pilot signals and use the thus generated reference pilot signals as first pilot signals to be transmitted from the first transmitting antenna. Also in view of the above, in addition, the complex plane wave generation unit provided within the transmitter is configured to generate a complex plane wave expressed by the left side of Equation 31 for each $m^{th}$ transmitting antenna (where 2≤m≤M). Then, the multiplication unit multiplies each reference pilot signal by the thus generated complex plane wave and the result of the multiplication is used as a $m^{th}$ pilot signal to be transmitted from the $m^{th}$ transmitting antenna.

$$\exp\left[j2\pi\left(\frac{(m-1)n_s}{M\Delta n}n - \frac{(m-1)k_s}{M\Delta k}k\right)\right] = \exp\left[j2\pi\left(\frac{(m-1)n_s}{M\Delta nTs}t - \frac{(m-1)k_sTu}{M\Delta k}f\right)\right]$$ [Equation 31]

Note that where 2≤m≤M, n, and k, are nonzero integers such that neither $(m-1)n_s$ nor $(m-1)k_s$ is an integral multiple of M.

In Equation 31 shown above, the right side is obtained by rewriting the left side using the relation n=(1/Ts)t and k=Tuf.

In addition, Equation 31 above is equivalent to a process of shifting first pilot signals to a different lattice pattern defined by the M-division of the original lattice pattern. In addition, the condition required by Equation 31 that $n_s$ and $k_s$ are nonzero integers such that neither $(m-1)_{ns}$ nor $(m-1)k_s$ is an integral multiple of M is to ensure that any of the lattice patterns of the pilot signal responses coincide with another.

The receiver divides each pilot signal received with the receiving antenna by a nominal pilot signal to obtain what is hereinafter referred to as a "mixed channel response". The mixed channel response is a mixture of the channel responses of the multiple channels from the multiple transmitting antennas to the receiving antenna. The interpolation unit provided for the first transmitting antenna estimates, with the use of a low-pass filter, the channel response at every cell and related to the first transmitting antenna, from the mixed channel response. For estimation of the response related to each $m^{th}$ transmitting antenna were 2≤m≤M, the complex plane wave generation unit provided within the receiver generates a complex plane wave expressed by the left side of Equation 32 shown below. The multiplication unit multiplies the mixed channel response by the thus generated complex plane wave. The interpolation unit then estimates, with the use of a low-pass filter, the channel responses at every cell and related to the $m^{th}$ transmitting antenna from the result of the multiplication computed by the multiplication unit.

$$\exp\left[-j2\pi\left(\frac{(m-1)n_s}{M\Delta n}n - \frac{(m-1)k_s}{M\Delta k}k\right)\right] = \exp\left[-j2\pi\left(\frac{(m-1)n_s}{M\Delta nTs}t - \frac{(m-1)k_sTu}{M\Delta k}f\right)\right]$$ [Equation 32]

Note that in Equation 32, the right side is obtained by rewriting the left side using the relation n=(1/Ts)t and k=Tuf.

(6) In the embodiments and modifications described above, the process of shifting the phase of a signal (SP signal, reception SP signal, or the result obtained by the division by a nominal SP signal) is carried out by generating a complex plane wave followed by multiplication of the signal by the thus generated complex plane wave. It is noted, however, this phase shift process is merely one example and without limitation. The phase shift may be carried out in the following manner, for example.

(6-A) Here, let M denote the number of transmitting antennas (M is an integer greater than or equal to 2) and a set of $m^{th}$ pilot signals transmitted from the $m^{th}$ transmitting antenna (where m is an integer satisfying 1≤m≤M) are arranged in the generalized pattern given by Equation 22 shown above.

The pilot signal generation unit provided within the transmitter generates reference pilot signals and use the thus generated reference pilot signals as first pilot signals to be transmitted from the first transmitting antenna. For each $m^{th}$ transmitting antenna where 2≤m≤M (M is an integer greater than or equal to 2), the phase generation unit provided within the transmitter generates the phase of any of the complex plane waves generated by the complex plane wave generation unit also provided within the transmitter mentioned above. Then, a phase rotation unit also provided within the transmitter rotates the phase of each reference pilot signal by the amount corresponding to the phase generated by the phase generation unit. The reference pilot signals after the phase rotation are used as $m^{th}$ pilot signals, which are a set of pilot signals to be transmitted from the $m^{th}$ transmitting antenna. Note that the phase rotation may be performed by employing a known algorithm such as CORDIC.

The receiver divides each pilot signal received with the receiving antenna by a nominal pilot signal to obtain what is hereinafter referred to as a "mixed channel response". The mixed channel response is a mixture of the channel responses of the multiple channels from the multiple transmitting antennas to the receiving antenna. The interpolation unit provided for the first transmitting antenna estimates, with the use of a low-pass filter, the channel response at every cell and related to the first transmitting antenna. For estimation each $m^{th}$ transmitting antenna where 2≤m≤M (M is an integer greater than or equal to 2), the phase generation unit provided within the receiver generates the phase of any of the complex plane waves generated by the complex plane wave generation unit that is also provided within the receiver and correspond to the phase generation unit provided within the transmitter. Then, the phase rotation unit also provided within the receiver rotates the phase of each reference pilot signal by the amount corresponding to the phase generated by the phase generation unit. The interpolation unit estimates, with the use of a low-pass filter, the channel response at every cell and related to the $m^{th}$ transmitting antenna from the mixed channel response after the phase rotation. Note that the phase rotation may be performed by employing a known algorithm such as CORDIC.

Regarding the transmitter, the complex plane wave generation unit and the multiplication unit are replaced by the phase generation unit and the phase rotation unit. Regarding the receiver, the complex plane wave generation unit and the multiplication unit are replaced by the phase generation unit and the phase rotation unit.

(6-B) The pilot signal generation unit provided within the transmitter generates reference pilot signals and uses the thus generated reference pilot signals as pilot signals to be transmitted from the first transmitting antenna. The transmitter is provided with a polarity inversion unit instead of the complex plane wave generation unit and the multiplication unit. The polarity inversion unit inverts and does not invert the polarity of every other reference pilot signal within the same symbol, thereby generating pilot signals to be transmitted from the second transmitting antenna.

(7) In the above description of the embodiments, SP signals transmitted from a transmitting antenna other than the first transmitting antenna are generated by the multiplication, phase rotation, and polarity reversal of a complex plane wave. However, this is merely one example and without limitation. SP signal transmitted from a transmitting antenna other than the first transmitting antenna may be generated in the following manner, for example.

Let M denote the number of transmitting antennas (where M is an integer greater than or equal to 2), and a set of $m^{th}$ pilot signals transmitted from the $m^{th}$ transmitting antenna (where m is an integer satisfying 1≤m≤M) are arranged in the generalized pattern given by Equation 22 shown above.

It is sufficient to provide a means for generating a plurality of $m^{th}$ pilot signals, which are a set of pilot signals to be transmitted from the $m^{th}$ transmitting antenna (where m is an integer satisfying 1≤m≤M), in a manner that the phase difference between each $m^{th}$ pilot signal and the reference pilot signal is equal to the value given by Equation 33 shown below.

$$j2\pi\left[\frac{(m-1)n_s}{M\Delta n}n - \frac{(m-1)k_s}{M\Delta k}k\right] \quad \text{[Equation 33]}$$

Mote that it is required that when 2≤m≤M, $n_s$ and $k_s$ are nonzero integers such that neither $(m-1)_{ns}$ nor $(m-1)k_s$ is equal to an integral multiple of M.

(8) In the above description, the transmitter has M transmitting antennas (where M is an integer greater than or equal to 2). Here, M is the maximum number of transmitting antennas that the transmitter may use for transmission. In practice, however, the number of transmitting antennas actually used may be equal to or smaller than the number M.

(9) According to the above-described embodiments, the receiver conducts the processing sequentially by the division units 53 and 63, the multiplication units 56 and 66, the low-pass filters included in the interpolation units 57 and 64, in the stated order. It should be noted, however, that the processing order is not limited to such. For example, the processing by the respective units may be conducted in the order of the division units 53 and 63, high-pass filters which are used as alternatives to low-pass filters, and the multiplication units 56 and 66.

(10) It is possible to provide the transmitter with a mechanism for selectively switching between the SP signal transmission method according to the above described embodiments and a conventional SP signal transmission method.

The following are examples in which the SP signal transmission method according to the above embodiments is to be selected and executed. One is the case where the guard interval duration that is longer than the useful symbol duration is selected (for example, Tu/4) and the impulse response of the channel has the delay to the same extent as the guard interval duration. Another is the case where the delay of the impulse response is relatively short and the ability to follow the channel's time variability is to be improved.

On the other hand, the following are examples in which a conventional SP signal transmission method is to be selected and executed. One is the case where the guard interval duration shorter than the useful symbol duration is selected. Another is the case where the delay spread of the impulse response and the channel's time variability are both relatively small.

Note that the transmitter may be modified to transmit control information, which is TPC in the case of the DVB-T system and TMCC in the case of the ISDB-T system, that includes information indicating the type of the complex plane wave. With this modification, the receiver is able to select, based on the control information, a complex plane wave corresponding to the complex plane wave used at the transmitter side, so that the subsequent processing is appropriately carried out.

In the case of the communications between one transmitter and one receiver, the receiver may observe the impulse response and the time variability of the channel to judge which transmission method is suitable and pass the judgment result to the transmitter. The transmitter may switch the SP signal transmission method to a different method according to the judgment result received from the receiver.

(11) In the above embodiments, the MIMO transmission system is described as an example. However, the present invention is applicable to a MIMO transmission system having two or more transmitting antennas and two or more receiving antennas as well as to MISO (Multiple Input Single Output) transmission system.

In addition, the present invention has been described above by way of an example in which a MIMO transmission system is used as a spatial multiplexing transmission system. Yet, the present invention is applicable to a transmission diversity system which employs a coding scheme, such as STC (Space Time Coding), STBC (Space Time Block Coding), and SFBC (Space Frequency Block Coding).

(12) The transmitters and receivers consistent with the embodiments above may each be realized as an LSI (Large Scale Integration), which is a type of integrated circuits. The individual circuits may be implemented on separate chips, or all or part of the circuits may be implemented on a single chip.

Although LSI is specifically mentioned herein, the same may also be referred to an IC (integrated circuit), a system LSI, a super LSI, or ultra LSI, depending on the packaging density.

The scheme employed for the circuit integration is not limited to LSI, and the integrated circuit may be implanted by a dedicated circuit or a general purpose processor. It is also possible to use an FPGA (Field Programmable Gate Array), which allows post manufacture programming of the LSI, or to use a reconfigurable processor, which allows reconfiguration of the connection between circuit cells within the LSI or setting of the circuit cells.

Furthermore, if the advance in the field of semiconductor technology or in another technology derived therefrom introduces a new integration technology that replaces the LSI, the new technology may be used to integrate the functional blocks. For example, the application of biotechnology is one possibility.

INDUSTRIAL APPLICABILITY

The present invention is applicable to a digital broadcasting that transmits the transmission parameter information. The present invention is also to digital communications which involves the use of mobile telephones, wireless LAN, power line communications, xDSL, and so on.

The invention claimed is:

1. A transmitter having first to $M^{th}$ transmitting antennas, where M is an integer equal to or greater than 2, and for transmitting an OFDM signal obtained by modulating a plurality of carriers per symbol duration,
the OFDM signal containing pilot signals scattered on a carrier-symbol plane,
on the carrier-symbol plane, k denoting a carrier number, n denoting a symbol number, $\Delta k$ denoting an interval between pilot signals in a same symbol, $\Delta n$ denoting an interval between pilot signals in a same carrier, and p denoting an integer greater than or equal to 0,
$n_S$ and $k_S$ each denoting a nonzero integer, and m denoting an integer satisfying $1 \leq m \leq M$,
when $2 \leq m \leq M$, neither $(m-1)n_s$ nor $(m-1)k_s$ being equal to an integral multiple of M,
the carrier number $k_P(n)$ of a carrier that transmits a pilot signal in a symbol with the symbol number n satisfying Equation 1, $$k_P(n) = \frac{\Delta k}{\Delta n} \times (n \bmod \Delta n) + \Delta k \times p, \quad \text{[Equation 1]}$$

the transmitter comprising:
a generating unit operable to generate the pilot signals as $m^{th}$ pilot signals for an $m^{th}$ antenna, where $1 \leq m \leq M$, such that a phase difference between a phase of each $m^{th}$ pilot signal and a phase of a reference pilot signal is equal to a value given by Equation 2, $$j2\pi\left[\frac{(m-1)n_s}{M\Delta n}n - \frac{(m-1)k_s}{M\Delta k}k\right]; \quad \text{[Equation 2]}$$

a transmitting unit operable to transmit, from the $m^{th}$ transmitting antenna, the OFDM signal containing the $m^{th}$ pilot signals generated by the generating unit.

2. The transmitter according to claim 1, wherein the generating unit includes:
a reference signal generating unit operable to generate a plurality of first pilot signals, each first pilot signal being the reference pilot signal; and
a multiplication unit operable to generate the $m^{th}$ pilot signals where $2 \leq m \leq M$, each $m^{th}$ pilot signal being generated by multiplying the reference pilot signal by a complex plane wave expressed by Equation 3 on the carrier-symbol plane, $$\exp\left\{j2\pi\left[\frac{(m-1)n_s}{M\Delta n}n - \frac{(m-1)k_s}{M\Delta k}k\right]\right\}. \quad \text{[Equation 3]}$$

3. The transmitter according to claim 1, wherein the generating unit includes:
a reference signal generating unit operable to generate a plurality of first pilot signals, each first pilot signal being the reference signal; and
a phase rotation unit operable to generate the $m^{th}$ pilot signals where $2 \leq m \leq M$, each $m^{th}$ pilot signal being generated by rotating the phase of the reference pilot signal by the value given by Equation 2.

4. The transmitter according to claim 1, wherein
M is equal to 2, and
the generating unit includes:
a reference signal generating unit operable to generate a plurality of first pilot signals, each first pilot signal being the reference signal; and
a polarity inversion unit operable to generate a plurality of second pilot signals such that polarities of the second pilot signals are each alternately inverted and not inverted in a carrier direction with respect to a polarity of a corresponding reference signal in a same symbol.

5. The transmitter according to claim 1, wherein
M is equal to 2,
$\Delta n$ is equal to 4,
$\Delta k$ is equal to 12,
$n_S$ is equal to 1, and
$k_S$ is equal to 1.

6. The transmitter according to claim 1, wherein
M is equal to 2,
Δn is equal to 4,
Δk is equal to 12,
$n_S$ is equal to 1, and
$k_S$ is equal to −3.

7. A receiver for receiving an OFDM signal transmitted from a transmitter having a plurality of first to $M^{th}$ transmitting antennas, where M is an integer greater than or equal to 2, the OFDM signal being obtained by modulating a plurality of carriers per symbol duration, the OFDM signal containing a plurality of pilot signals scattered on a carrier-symbol plane, on the carrier-symbol plane, k denoting a carrier number, n denoting a symbol number, Δk denoting an interval between pilot signals in a same symbol, Δn denoting an interval between pilot signals in a same carrier, and p denoting an integer greater than or equal to 0, $n_S$ and $k_S$ each denoting a nonzero integer, and m denoting an integer satisfying 1≤m≤M, when 2≤m≤M, neither $(m-1)n_s$ nor $(m-1)k_s$ being equal to an integral multiple of M, the carrier number $k_P(n)$ of a carrier that transmits a pilot signal in a symbol with the symbol number n satisfying Equation 1, $$k_P(n) = \frac{\Delta k}{\Delta n} \times (n \bmod \Delta n) + \Delta k \times p, \qquad \text{[Equation 1]}$$

the pilot signals transmitted from an $m^{th}$ one of the transmitting antennas, (where m is an integer satisfying 1≤m≤M, being $m^{th}$ pilot signals, such that a phase difference between a phase of each $m^{th}$ pilot signal and a phase of a reference pilot signal is equal to a value given by Equation 2, $$j2\pi\left[\frac{(m-1)n_s}{M\Delta n}n - \frac{(m-1)k_s}{M\Delta k}k\right], \qquad \text{[Equation 2]}$$

the receiver comprising:
a receiving antenna with which the OFDM signal from the transmitter is received;
a response estimation unit operable to estimate a channel response of each of first to $M^{th}$ channels respectively from the first to $M^{th}$ antennas to the receiving antenna, the estimation being carried out based on Equation 2 and pilot signals contained in the OFDM signal received with the receiving antenna; and
a signal estimation unit operable to estimate first to $M^{th}$ transmission signals based on the received OFDM signal and the estimated channel responses of the first to $M^{th}$ transmission channels, the first to $M^{th}$ transmission signals corresponding to first to $M^{th}$ OFDM signals transmitted respectively from the first to $M^{th}$ transmitting antennas.

8. The receiver according to claim 7, wherein
the response estimation unit is operable to extract pilot signals from the OFDM signal received with the receiving antenna, divide each extracted pilot signal by the reference pilot signal, and estimate the channel response of the first channel based on a result of each division, and further operable to estimate the channel response of $m^{th}$ channel where 2≤m≤M, based on the result of each division and Equation 2.

9. An OFDM transmission method for transmitting an OFDM signal from a transmitter having first to $M^{th}$ transmitting antennas, where M is an integer greater than or equal to 2, the OFDM signal being obtained by modulating a plurality of carriers per symbol duration, the OFDM signal containing pilot signals scattered on a carrier-symbol plane, on the carrier-symbol plane, k denoting a carrier number, n denoting a symbol number, Δk denoting an interval between pilot signals in a same symbol, Δn denoting an interval between pilot signals in a same carrier, and p denoting an integer greater than or equal to 0, $n_S$ and $k_S$ each denoting a nonzero integer, and m denoting an integer satisfying 1≤m≤M, when 2≤m≤M, neither $(m-1)n_s$ nor $(m-1)k_s$ being equal to an integral multiple of M, the carrier number $k_P(n)$ of a carrier that transmits a pilot signal in a symbol with the symbol number n satisfying Equation 1, $$k_P(n) = \frac{\Delta k}{\Delta n} \times (n \bmod \Delta n) + \Delta k \times p, \qquad \text{[Equation 1]}$$

the OFDM transmission method comprising the steps of:
generating a plurality of the pilot signals as $m^{th}$ pilot signals for an $m^{th}$ antenna, where 1≤m≤M, such that a phase difference between a phase of each $m^{th}$ pilot signal and a phase of a reference pilot signal is equal to a value given by Equation 2, $$j2\pi\left[\frac{(m-1)n_s}{M\Delta n}n - \frac{(m-1)k_s}{M\Delta k}k\right]; \qquad \text{[Equation 2]}$$

and
transmitting, from the $m^{th}$ transmitting antenna, an OFDM signal containing the $m^{th}$ pilot signals generated in the generating step.

\* \* \* \* \*